(12) United States Patent
Kumano et al.

(10) Patent No.: US 9,075,185 B2
(45) Date of Patent: Jul. 7, 2015

(54) HOLE-ASSISTED OPTICAL FIBER

(71) Applicants: FURUKAWA ELECTRIC CO., LTD., Tokyo (JP); NIPPON TELEGRAPH AND TELEPHONE CORPORATION, Chiyoda-ku (JP)

(72) Inventors: Naomi Kumano, Tokyo (JP); Iwao Shimotakahara, Tokyo (JP); Ryuichi Sugizaki, Tokyo (JP); Takeshi Yagi, Tokyo (JP); Tomoya Shimizu, Ibaraki (JP); Takashi Matsui, Ibaraki (JP); Yukihiro Goto, Ibaraki (JP); Toshio Kurashima, Ibaraki (JP); Kazuhide Nakajima, Ibaraki (JP)

(73) Assignees: FURUKAWA ELECTRIC CO., LTD., Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 351 days.

(21) Appl. No.: 13/754,963

(22) Filed: Jan. 31, 2013

(65) Prior Publication Data

US 2013/0136409 A1 May 30, 2013

Related U.S. Application Data

(63) Continuation of application No. PCT/JP2011/068073, filed on Aug. 8, 2011.

(30) Foreign Application Priority Data

Aug. 9, 2010 (JP) .................................. 2010-179058

(51) Int. Cl.
*G02B 6/032* (2006.01)
*G02B 6/02* (2006.01)
*G02B 6/036* (2006.01)

(52) U.S. Cl.
CPC ............ *G02B 6/032* (2013.01); *G02B 6/02333* (2013.01); *G02B 6/02366* (2013.01); *G02B 6/03627* (2013.01)

(58) Field of Classification Search
CPC .................................................. G02B 6/02333
See application file for complete search history.

(56) References Cited

U.S. PATENT DOCUMENTS

| 7,228,040 B2 | 6/2007 | Nakajima et al. | |
| 2010/0215329 A1* | 8/2010 | Bickham et al. | ............... 385/123 |

FOREIGN PATENT DOCUMENTS

| JP | 2004-226540 A | 8/2004 |
| JP | 3854627 B2 | 9/2006 |

OTHER PUBLICATIONS

International Search Report mailed Sep. 6, 2011 in PCT/JP2011/068073 filed Aug. 8, 2011 (with English translation).

(Continued)

*Primary Examiner* — Uyen Chau N Le
*Assistant Examiner* — Chad Smith
(74) *Attorney, Agent, or Firm* — Oblon, McClelland, Maier & Neustadt, L.L.P.

(57) ABSTRACT

A hole-assisted optical fiber includes a core portion and a cladding portion that includes an inner cladding layer, an outer cladding layer, and holes formed around the core portion. A diameter of the core portion is 3 μm to 9.8 μm, a relative refractive index difference of the core portion relative to the outer cladding layer is 0.11% to 0.45%, an outside diameter of the inner cladding layer is 53 μm or less, a relative refractive index difference of the inner cladding layer relative to the outer cladding layer is a negative value, −0.30% or more, a diameter of each hole is 2.4 μm to 4.0 μm, a hole occupancy rate is 17% to 48%, a bending loss at a wavelength of 1625 nm when bent at a radius of 5 mm is 1 dB/turn or less, and a cut-off wavelength is 1550 nm or less.

3 Claims, 49 Drawing Sheets

(56) References Cited

OTHER PUBLICATIONS

International Written Opinion mailed Sep. 6, 2011 in PCT/JP2011/068073 filed Aug. 8, 2011.
Kazuhide, Nakajima, et al., Single-Mode Hole-Assisted Fiber with Low Bending Loss Characteristics, Proc Int Wire Cable Symp, vol. 58, 2009, pp. 264-269.
Takatoshi Kato et al., "Dispersion Shifted Fiber for WDM Transmission", IEICE Technical Report OCS96-51 to 59, vol. 96, No. 335, Nov. 1, 1996, pp. 43-48 (with English translation).
Tomoyo Shimizu et al., "A Study on Cutoff Wavelength Characteristics in Hole-Assisted Fiber", Proceedings of the 2009 IEICE General Conference, Mar. 4, 2009, pp. 512, B-13-24 (with English translation).
Takashi Matsui et al., "A Study on Bending-Loss and Dispersion Properties of Hole-Assisted Fibers", Proceedings of the 2010 IEICE General Conference, Mar. 2, 2010, pp. 521, B-13-26 (with English translation).
M.-J. Li et al., Ultra-Low Bending Loss Single-Mode Fiber for FTTH, Journal of Lightwave Technology, vol. 27, No. 3, Feb. 18, 2009, pp. 376-382.

* cited by examiner

FIG. 55A

| Hole occupancy rate | S | % | 30.1 | 30.1 | 30.1 | 30.1 | 30.1 | 30.0 | 30.1 | 30.1 | 30.1 |
|---|---|---|---|---|---|---|---|---|---|---|---|
| Distance | L1 | μm | 10.40 | 11.23 | 12.06 | 12.89 | 13.86 | 10.40 | 11.23 | 12.06 | 12.9 |
| Hole diameter | d | μm | 2.50 | 2.70 | 2.90 | 3.10 | 3.33 | 2.50 | 2.70 | 2.90 | 3.10 |
| Core diameter | 2a | μm | 6.6 | 6.6 | 6.6 | 6.6 | 6.6 | 7.8 | 7.8 | 7.8 | 7.8 |
| Relative refractive index difference | Δ1 | % | 0.30 | 0.30 | 0.30 | 0.30 | 0.30 | 0.30 | 0.30 | 0.30 | 0.30 |
| Inner cladding layer diameter | 2b | μm | 36 | 36 | 36 | 36 | 36 | 36 | 36 | 36 | 36 |
| Relative refractive index difference | Δ2 | % | -0.05 | -0.05 | -0.05 | -0.05 | -0.05 | -0.05 | -0.05 | -0.05 | -0.05 |
| Chromatic dispersion | ps/nm/km | 1310nm | -1.30 | -2.14 | -2.96 | -3.41 | -3.90 | 0.98 | -0.18 | -0.33 | -0.65 |
| | | 1550nm | 18.69 | 17.51 | 16.32 | 15.44 | 14.56 | 20.26 | 19.24 | 18.20 | 17.55 |
| Zero-dispersion wavelength | | nm | 1318 | 1330 | 1338 | 1344 | 1351 | 1295 | 1304 | 1309 | 1312 |
| Zero-dispersion slope | | ps/nm²/km | 0.0952 | 0.0918 | 0.0883 | 0.0864 | 0.0829 | 0.0968 | 0.0939 | 0.0907 | 0.0887 |
| MFD | μm | 1310nm | 8.63 | 8.68 | 8.77 | 8.81 | 8.83 | 9.07 | 9.12 | 9.19 | 9.22 |
| | | 1550nm | 9.05 | 9.27 | 9.42 | 9.76 | 10.14 | 9.37 | 9.46 | 9.69 | 9.79 |
| Cut-off wavelength | | nm | 1055 | 1070 | 1080 | 1080 | 1075 | 1210 | 1230 | 1245 | 1250 |
| Bending loss | dB/turn | 1625nm r=5mm | 0.3 | 0.2 | 0.2 | 0.3 | 0.3 | 0.1 | 0.1 | 0.1 | 0.1 |
| Hole occupancy rate | S | % | 30.1 | 30.1 | 30.1 | 30.1 | 30.1 | 30.1 | 30.1 | 30.1 | 30.1 |
| Distance | L1 | μm | 13.9 | 12.06 | 12.06 | 12.06 | 12.06 | 12.06 | 12.06 | 13.86 | 13.9 |
| Hole diameter | d | μm | 3.33 | 2.90 | 2.90 | 2.90 | 2.90 | 2.90 | 2.90 | 3.33 | 3.33 |
| Core diameter | 2a | μm | 7.8 | 6.4 | 6.6 | 7 | 7.5 | 7.8 | 8 | 6.6 | 7.2 |
| Relative refractive index difference | Δ1 | % | 0.30 | 0.30 | 0.30 | 0.30 | 0.30 | 0.30 | 0.30 | 0.30 | 0.30 |
| Inner cladding layer diameter | 2b | μm | 36 | 36 | 36 | 36 | 36 | 36 | 36 | 36 | 36 |
| Relative refractive index difference | Δ2 | % | -0.05 | -0.05 | -0.05 | -0.05 | -0.05 | -0.05 | -0.05 | -0.05 | -0.05 |
| Chromatic dispersion | ps/nm/km | 1310nm | -0.98 | -2.96 | -2.96 | -2.14 | -1.32 | -0.33 |  | -3.90 | -2.28 |
| | | 1550nm | 16.83 | 16.02 | 16.32 | 16.79 | 17.98 | 18.20 | 18.52 | 14.56 | 15.71 |
| Zero-dispersion wavelength | | nm | 1316 | 1345 | 1338 | 1329 | 1316 | 1309 | 1303 | 1351 | 1332 |
| Zero-dispersion slope | | ps/nm²/km | 0.0866 | 0.0880 | 0.0883 | 0.0889 | 0.0905 | 0.0907 | 0.0909 | 0.0829 | 0.0842 |
| MFD | μm | 1310nm | 9.25 | 8.68 | 8.77 | 8.90 | 9.05 | 9.19 | 9.28 | 8.83 | 9.08 |
| | | 1550nm | 9.88 | 9.31 | 9.42 | 9.48 | 9.57 | 9.69 | 9.80 | 10.14 | 9.82 |
| Cut-off wavelength | | nm | 1255 | 1040 | 1080 | 1140 | 1216 | 1245 | 1260 | 1075 | 1165 |
| Bending loss | dB/turn | 1625nm r=5mm | 0.1 | 0.3 | 0.2 | 0.2 | 0.1 | 0.1 | 0.1 | 0.3 | 0.2 |

FIG.55B

| | | | | | | | | | | | |
|---|---|---|---|---|---|---|---|---|---|---|---|
| Hole occupancy rate | S | % | 30.1 | 30.1 | 30.1 | 30.1 | 30.1 | 30.0 | 30.1 | 30.1 | 30.1 |
| Distance | L1 | μm | 13.9 | 13.9 | 13.9 | 13.9 | 13.9 | 13.9 | 13.9 | 13.9 | 13.9 |
| Hole diameter | d | μm | 3.33 | 3.33 | 3.33 | 3.33 | 3.33 | 3.33 | 3.33 | 3.33 | 3.33 |
| Core diameter | 2a | μm | 7.5 | 7.8 | 8 | 8.13 | 8.4 | 8.8 | 9.0 | 9.3 | 9.5 |
| Relative refractive index difference | Δ1 | % | 0.30 | 0.30 | 0.30 | 0.30 | 0.30 | 0.30 | 0.30 | 0.30 | 0.30 |
| Inner cladding layer diameter | 2b | μm | 36 | 36 | 36 | 36 | 36 | 36 | 36 | 36 | 36 |
| Relative refractive index difference | Δ2 | % | -0.05 | -0.05 | -0.05 | -0.05 | -0.05 | -0.05 | -0.05 | -0.05 | -0.05 |
| Chromatic dispersion | ps/nm/km | 1310nm | -1.59 | -0.98 | -0.61 | -0.38 | 0.05 | 0.60 | 0.84 | 1.17 | 1.36 |
| | | 1550nm | 16.28 | 16.83 | 17.17 | 17.39 | 17.81 | 18.39 | 18.65 | 19.02 | 19.25 |
| Zero-dispersion wavelength | | nm | 1323 | 1316 | 1312 | 1309 | 1304 | 1298 | 1296 | 1292 | 1290 |
| Zero-dispersion slope | | ps/nm²/km | 0.0854 | 0.0866 | 0.0874 | 0.0880 | 0.0892 | 0.0907 | 0.0913 | 0.0924 | 0.0931 |
| MFD | μm | 1310nm | 9.18 | 9.25 | 9.29 | 9.32 | 9.43 | 9.58 | 9.67 | 9.79 | 9.85 |
| | | 1550nm | 9.62 | 9.88 | 9.86 | 9.84 | 9.97 | 10.07 | 10.13 | 10.22 | 10.25 |
| Cut-off wavelength | | nm | 1210 | 1255 | 1280 | 1296 | 1330 | 1380 | 1403 | 1445 | 1470 |
| Bending loss | dB/turn | 1625nm r=5mm | 0.1 | 0.1 | 0.1 | 0.1 | 0.1 | 0.1 | 0.1 | 0.0 | 0.0 |
| Hole occupancy rate | S | % | 30.1 | 30.1 | 30.1 | 30.1 | 30.1 | 30.1 | 30.1 | 30.1 | 30.1 |
| Distance | L1 | μm | 13.9 | 13.9 | 13.9 | 13.9 | 13.9 | 13.9 | 13.9 | 13.9 | 13.9 |
| Hole diameter | d | μm | 3.33 | 3.3 | 3.3 | 3.3 | 3.3 | 3.3 | 3.3 | 3.3 | 3.3 |
| Core diameter | 2a | μm | 9.8 | 9.0 | 8.0 | 8.0 | 8.0 | 8.0 | 9.0 | 8.0 | 9.8 |
| Relative refractive index difference | Δ1 | % | 0.30 | 0.30 | 0.35 | 0.38 | 0.41 | 0.43 | 0.30 | 0.45 | 0.30 |
| Inner cladding layer diameter | 2b | μm | 36 | 20 | 36 | 36 | 36 | 36 | 45 | 36 | 36 |
| Relative refractive index difference | Δ2 | % | -0.05 | -0.05 | -0.05 | -0.05 | -0.05 | -0.05 | -0.05 | -0.05 | -0.05 |
| Chromatic dispersion | ps/nm/km | 1310nm | 1.63 | 0.77 | -0.34 | -0.16 | 0.02 | 0.14 | 0.84 | 0.25 | 1.63 |
| | | 1550nm | 19.56 | 18.55 | 17.08 | 17.12 | 17.21 | 17.28 | 18.66 | 17.37 | 19.56 |
| Zero-dispersion wavelength | | nm | 1287 | 1297 | 1309 | 1307 | 1305 | 1303 | 1296 | 1302 | 1287 |
| Zero-dispersion slope | | ps/nm²/km | 0.0940 | 0.091 | 0.087 | 0.087 | 0.088 | 0.088 | 0.091 | 0.088 | 0.094 |
| MFD | μm | 1310nm | 10.04 | 9.73 | 8.91 | 8.73 | 8.57 | 8.47 | 9.71 | 8.38 | 10.04 |
| | | 1550nm | 10.44 | 11.23 | 10.39 | 10.15 | 9.94 | 9.81 | 11.19 | 9.69 | 11.44 |
| Cut-off wavelength | | nm | 1505 | 1295 | 1355 | 1395 | 1440 | 1470 | 1475 | 1500 | 1505 |
| Bending loss | dB/turn | 1625nm r=5mm | 0.0 | 0.1 | 0.0 | 0.0 | 0.0 | 0.0 | 0.0 | 0.0 | 0.0 |

FIG. 55C

| | | | | | | | | | | | | |
|---|---|---|---|---|---|---|---|---|---|---|---|---|
| Hole occupancy rate | S | % | 35.7 | 35.7 | 35.7 | 35.7 | 35.7 | 35.7 | 35.7 | 35.7 | 35.7 | 35.7 |
| Distance | L1 | μm | 9.10 | 9.10 | 9.10 | 9.10 | 9.10 | 9.45 | 9.45 | 9.45 | 9.45 | 9.45 |
| Hole diameter | d | μm | 2.60 | 2.60 | 2.60 | 2.60 | 2.60 | 2.70 | 2.70 | 2.70 | 2.70 | 2.70 |
| Core diameter | 2a | μm | 6.0 | 6.4 | 6.6 | 6.8 | 7.1 | 6.2 | 6.4 | 6.6 | 6.6 | 6.8 |
| Relative refractive index difference | Δ1 | % | 0.30 | 0.30 | 0.30 | 0.30 | 0.30 | 0.30 | 0.30 | 0.30 | 0.30 | 0.30 |
| Inner cladding layer diameter | 2b | μm | 36 | 36 | 36 | 36 | 36 | 36 | 36 | 36 | 36 | 36 |
| Relative refractive index difference | Δ2 | % | -0.05 | -0.05 | -0.05 | -0.05 | -0.05 | -0.05 | -0.05 | -0.05 | -0.05 | -0.05 |
| Chromatic dispersion | ps/nm/km | 1310nm | 0.38 | 0.94 | 1.50 | 2.11 | 2.76 | -0.76 | -0.21 | 0.36 | 0.92 | |
| | | 1550nm | 21.41 | 21.76 | 22.01 | 22.35 | 22.67 | 20.22 | 20.87 | 21.46 | 22.24 | |
| Zero-dispersion wavelength | | nm | 1311 | 1304 | 1300 | 1297 | 1292 | 1318 | 1314 | 1310 | 1306 | |
| Zero-dispersion slope | | ps/nm²/km | 0.1042 | 0.104 | 0.1038 | 0.1036 | 0.1034 | 0.0982 | 0.0979 | 0.0976 | 0.0973 | |
| MFD | μm | 1310nm | 8.82 | 8.83 | 8.84 | 8.90 | 9.00 | 8.86 | 8.90 | 8.95 | 9.01 | |
| | | 1550nm | 9.53 | 9.50 | 9.47 | 9.61 | 9.81 | 9.57 | 9.61 | 9.69 | 9.67 | |
| Cut-off wavelength | | nm | 1010 | 1070 | 1095 | 1125 | 1175 | 1050 | 1090 | 1125 | 1155 | |
| Bending loss | dB/turn | 1625nm r=5mm | 0.2 | 0.2 | 0.1 | 0.1 | 0.1 | 0.1 | 0.1 | 0.1 | 0.1 | |
| Hole occupancy rate | S | % | 35.7 | 35.7 | 35.7 | 35.7 | 35.7 | 35.7 | 35.7 | 35.7 | 35.7 | |
| Distance | L1 | μm | 9.45 | 10.15 | 10.15 | 10.15 | 10.15 | 10.15 | 10.15 | 9.45 | 9.45 | |
| Hole diameter | d | μm | 2.70 | 2.90 | 2.90 | 2.90 | 2.90 | 2.90 | 2.90 | 2.40 | 2.60 | |
| Core diameter | 2a | μm | 7.0 | 6.15 | 6.4 | 6.6 | 6.8 | 7.1 | 7.4 | 6.6 | 6.6 | |
| Relative refractive index difference | Δ1 | % | 0.30 | 0.30 | 0.30 | 0.30 | 0.30 | 0.30 | 0.30 | 0.30 | 0.30 | |
| Inner cladding layer diameter | 2b | μm | 36 | 36 | 36 | 36 | 36 | 36 | 36 | 36 | 36 | |
| Relative refractive index difference | Δ2 | % | -0.05 | -0.05 | -0.05 | -0.05 | -0.05 | -0.05 | -0.05 | -0.05 | -0.05 | |
| Chromatic dispersion | ps/nm/km | 1310nm | 1.48 | -1.48 | -0.92 | -0.42 | 0.11 | 0.55 | 1.50 | 3.41 | 1.50 | |
| | | 1550nm | 22.81 | 19.34 | 19.65 | 19.81 | 20.13 | 20.42 | 21.87 | 22.14 | 22.01 | |
| Zero-dispersion wavelength | | nm | 1301 | 1329 | 1324 | 1319 | 1315 | 1309 | 1300 | 1283 | 1300 | |
| Zero-dispersion slope | | ps/nm²/km | 0.0970 | 0.102 | 0.099 | 0.0982 | 0.098 | 0.0985 | 0.0984 | 0.109 | 0.1038 | |
| MFD | μm | 1310nm | 9.12 | 8.90 | 8.98 | 9.05 | 9.12 | 9.24 | 9.33 | 8.68 | 8.84 | |
| | | 1550nm | 9.92 | 9.70 | 9.78 | 9.87 | 9.95 | 10.02 | 10.14 | 9.05 | 9.47 | |
| Cut-off wavelength | | nm | 1185 | 1060 | 1115 | 1155 | 1190 | 1230 | 1270 | 1050 | 1095 | |
| Bending loss | dB/turn | 1625nm r=5mm | 0.1 | 0.1 | 0.1 | 0.1 | 0.1 | 0.1 | 0.1 | 0.1 | 0.1 | |

FIG.55D

| Hole occupancy rate | S | % | 35.7 | 35.7 | 35.7 | 35.7 | 35.7 | 35.7 | 35.7 | 35.7 | 35.7 |
|---|---|---|---|---|---|---|---|---|---|---|---|
| Distance | L1 | μm | 10.15 | 11.55 | 14.0 | 11.55 | 11.55 | 11.55 | 11.55 | 14.0 | 14.0 |
| Hole diameter | d | μm | 2.90 | 3.30 | 4.00 | 3.30 | 3.30 | 3.30 | 3.30 | 4.0 | 4.0 |
| Core diameter | 2a | μm | 6.6 | 6.6 | 6.6 | 6.4 | 6.6 | 6.8 | 7.1 | 6.6 | 7.0 |
| Relative refractive index difference | Δ1 | % | 0.30 | 0.30 | 0.30 | 0.30 | 0.30 | 0.30 | 0.30 | 0.30 | 0.30 |
| Inner cladding layer diameter | 2b | μm | 36 | 36 | 36 | 36 | 36 | 36 | 36 | 36 | 36 |
| Relative refractive index difference | Δ2 | % | -0.05 | -0.05 | -0.05 | -0.05 | -0.05 | -0.05 | -0.05 | -0.05 | -0.05 |
| Chromatic dispersion | ps/nm/km | 1310nm | -0.42 | -1.64 | -3.78 | -3.88 | -2.89 | -2.02 | -1.06 | -3.78 | -2.68 |
| | | 1550nm | 19.81 | 17.53 | 14.84 | 16.25 | 16.88 | 17.51 | 18.23 | 14.84 | 15.57 |
| Zero-dispersion wavelength | nm | | 1319 | 1337 | 1359 | 1338 | 1333 | 1329 | 1326 | 1359 | 1346 |
| Zero-dispersion slope | ps/nm²/km | | 0.0982 | 0.092 | 0.084 | 0.091 | 0.092 | 0.0922 | 0.0923 | 0.084 | 0.084 |
| MFD | μm | 1310nm | 9.05 | 9.22 | 9.44 | 9.10 | 9.22 | 9.30 | 9.39 | 9.44 | 9.52 |
| | | 1550nm | 9.87 | 10.26 | 10.73 | 10.25 | 10.30 | 10.34 | 10.38 | 10.73 | 10.78 |
| Cut-off wavelength | nm | | 1155 | 1195 | 1230 | 1145 | 1195 | 1230 | 1290 | 1230 | 1295 |
| Bending loss | dB/turn | 1625nm r=5mm | 0.1 | 0.1 | 0.1 | 0.1 | 0.1 | 0.1 | 0.1 | 0.1 | 0.1 |

| Hole occupancy rate | S | % | 35.7 | 35.7 | 35.7 | 35.7 | 35.7 | 35.7 | 35.7 | | |
|---|---|---|---|---|---|---|---|---|---|---|---|
| Distance | L1 | μm | 14.0 | 14.0 | 8.40 | 9.10 | 10.15 | 11.03 | 11.55 | | |
| Hole diameter | d | μm | 4.0 | 4.0 | 2.40 | 2.60 | 2.90 | 3.15 | 3.30 | | |
| Core diameter | 2a | μm | 8.0 | 8.4 | 7.1 | 7.1 | 7.1 | 7.1 | 7.1 | | |
| Relative refractive index difference | Δ1 | % | 0.30 | 0.30 | 0.30 | 0.30 | 0.30 | 0.30 | 0.30 | | |
| Inner cladding layer diameter | 2b | μm | 36 | 36 | 36 | 36 | 36 | 36 | 36 | | |
| Relative refractive index difference | Δ2 | % | -0.05 | -0.05 | -0.05 | -0.05 | -0.05 | -0.05 | -0.05 | | |
| Chromatic dispersion | ps/nm/km | 1310nm | -0.54 | 0.11 | 3.93 | 2.26 | 0.55 | -0.26 | -1.06 | | |
| | | 1550nm | 17.39 | 17.99 | 24.29 | 22.35 | 20.42 | 19.36 | 18.23 | | |
| Zero-dispersion wavelength | nm | | 1321 | 1314 | 1277 | 1292 | 1309 | 1321 | 1326 | | |
| Zero-dispersion slope | ps/nm²/km | | 0.088 | 0.090 | 0.1087 | 0.0996 | 0.0985 | 0.0944 | 0.0923 | | |
| MFD | μm | 1310nm | 9.75 | 9.93 | 8.82 | 9.00 | 9.24 | 9.33 | 9.39 | | |
| | | 1550nm | 10.61 | 10.95 | 9.29 | 9.63 | 10.02 | 10.21 | 10.38 | | |
| Cut-off wavelength | nm | | 1455 | 1530 | 1120 | 1175 | 1230 | 1265 | 1290 | | |
| Bending loss | dB/turn | 1625nm r=5mm | 0.0 | 0.0 | 0.1 | 0.1 | 0.1 | 0.1 | 0.1 | | |

FIG.55E

| Hole occupancy rate | S | % | 38.0 | 38.0 | 38.0 | 38.0 | 38.0 | 38.0 |
|---|---|---|---|---|---|---|---|---|
| Distance | L1 | μm | 8.88 | 8.88 | 8.88 | 8.88 | 8.88 | 8.88 |
| Hole diameter | d | μm | 2.7 | 2.7 | 2.7 | 2.7 | 2.7 | 2.7 |
| Core diameter | 2a | μm | 6.2 | 6.4 | 6.6 | 6.8 | 7.0 | 7.4 |
| Relative refractive index difference | Δ1 | % | 0.30 | 0.30 | 0.30 | 0.30 | 0.30 | 0.30 |
| Inner cladding layer diameter | 2b | μm | 36 | 36 | 36 | 36 | 36 | 36 |
| Relative refractive index difference | Δ2 | % | -0.05 | -0.05 | -0.05 | -0.05 | -0.05 | -0.05 |
| Chromatic dispersion | ps/nm/km | 1310nm | 1.62 | 1.98 | 2.27 | 2.56 | 2.93 | 3.54 |
|  |  | 1550nm | 22.23 | 22.56 | 22.87 | 23.14 | 23.30 | 23.72 |
| Zero-dispersion wavelength | nm |  | 1306 | 1302 | 1298 | 1295 | 1292 | 1286 |
| Zero-dispersion slope | ps/nm²/km |  | 0.105 | 0.105 | 0.106 | 0.106 | 0.106 | 0.107 |
| MFD | μm | 1310nm | 8.65 | 8.73 | 8.80 | 8.88 | 8.95 | 9.01 |
|  |  | 1550nm | 9.21 | 9.30 | 9.38 | 9.46 | 9.51 | 9.46 |
| Cut-off wavelength | nm |  | 1080 | 1105 | 1130 | 1156 | 1185 | 1240 |
| Bending loss | dB/turn | 1625nm r=5mm | 0.1 | 0.1 | 0.1 | 0.1 | 0.1 | 0.1 |
| Hole occupancy rate | S | % | 38.0 | 38.0 | 38.0 | 38.0 | 38.0 | 38.0 |
| Distance | L1 | μm | 8.55 | 8.88 | 9.21 | 9.52 | 10.065 | 8.22 |
| Hole diameter | d | μm | 2.6 | 2.7 | 2.8 | 2.9 | 3.06 | 2.50 |
| Core diameter | 2a | μm | 7.0 | 7.0 | 7.0 | 7.0 | 7.0 | 6.6 |
| Relative refractive index difference | Δ1 | % | 0.30 | 0.30 | 0.30 | 0.30 | 0.30 | 0.30 |
| Inner cladding layer diameter | 2b | μm | 36 | 36 | 36 | 36 | 36 | 36 |
| Relative refractive index difference | Δ2 | % | -0.05 | -0.05 | -0.05 | -0.05 | -0.05 | -0.05 |
| Chromatic dispersion | ps/nm/km | 1310nm | 3.61 | 2.93 | 2.23 | 1.48 | 0.70 | 3.45 |
|  |  | 1550nm | 24.10 | 23.30 | 22.51 | 21.80 | 20.73 | 24.21 |
| Zero-dispersion wavelength | nm |  | 1283 | 1292 | 1298 | 1305 | 1313 | 1284 |
| Zero-dispersion slope | ps/nm²/km |  | 0.107 | 0.106 | 0.104 | 0.102 | 0.099 | 0.110 |
| MFD | μm | 1310nm | 8.80 | 8.95 | 9.04 | 9.13 | 9.22 | 8.60 |
|  |  | 1550nm | 9.43 | 9.51 | 9.66 | 9.82 | 9.99 | 9.12 |
| Cut-off wavelength | nm |  | 1148 | 1185 | 1215 | 1250 | 1280 | 1080 |
| Bending loss | dB/turn | 1625nm r=5mm | 0.1 | 0.1 | 0.1 | 0.1 | 0.0 | 0.1 |

FIG.55F

| Hole occupancy rate | S | % | 38.0 | 38.0 | 38.0 | 38.0 | 38.0 | 38.0 |
|---|---|---|---|---|---|---|---|---|
| Distance | L1 | μm | 8.88 | 9.54 | 10.52 | 11.5 | 12.50 | 9.54 |
| Hole diameter | d | μm | 2.7 | 2.9 | 3.2 | 3.5 | 3.8 | 2.9 |
| Core diameter | 2a | μm | 6.6 | 6.6 | 6.6 | 6.6 | 6.6 | 6.4 |
| Relative refractive index difference | Δ1 | % | 0.30 | 0.30 | 0.30 | 0.30 | 0.30 | 0.30 |
| Inner cladding layer diameter | 2b | μm | 36 | 36 | 36 | 36 | 36 | 36 |
| Relative refractive index difference | Δ2 | % | -0.05 | -0.05 | -0.05 | -0.05 | -0.05 | -0.05 |
| Chromatic dispersion | ps/nm/km | 1310nm | 2.27 | 0.87 | -0.76 | -1.97 | -2.86 | 1.98 |
| | | 1550nm | 22.87 | 21.33 | 19.41 | 17.84 | 16.51 | 22.56 |
| Zero-dispersion wavelength | nm | | 1298 | 1311 | 1328 | 1341 | 1351 | 1314 |
| Zero-dispersion slope | ps/nm²/km | | 0.106 | 0.102 | 0.097 | 0.093 | 0.089 | 0.102 |
| MFD | μm | 1310nm | 8.80 | 8.96 | 9.13 | 9.24 | 9.31 | 8.84 |
| | | 1550nm | 9.38 | 9.67 | 10.01 | 10.27 | 10.47 | 9.54 |
| Cut-off wavelength | nm | | 1130 | 1180 | 1250 | 1315 | 1355 | 1141 |
| Bending loss | dB/turn | 1625nm r=5mm | 0.1 | 0.1 | 0.1 | 0.0 | 0.0 | 0.1 |

| Hole occupancy rate | S | % | 38.0 | 38.0 | 38.0 | 38.0 |
|---|---|---|---|---|---|---|
| Distance | L1 | μm | 9.54 | 9.54 | 9.54 | 9.54 |
| Hole diameter | d | μm | 2.9 | 2.9 | 2.9 | 2.9 |
| Core diameter | 2a | μm | 6.6 | 6.8 | 7.0 | 7.3 |
| Relative refractive index difference | Δ1 | % | 0.30 | 0.30 | 0.30 | 0.30 |
| Inner cladding layer diameter | 2b | μm | 36 | 36 | 36 | 36 |
| Relative refractive index difference | Δ2 | % | -0.05 | -0.05 | -0.05 | -0.05 |
| Chromatic dispersion | ps/nm/km | 1310nm | 0.87 | -0.14 | -1.20 | -2.31 |
| | | 1550nm | 21.33 | 20.18 | 18.97 | 17.73 |
| Zero-dispersion wavelength | nm | | 1311 | 1308 | 1305 | 1298 |
| Zero-dispersion slope | ps/nm²/km | | 0.102 | 0.103 | 0.103 | 0.104 |
| MFD | μm | 1310nm | 8.96 | 9.04 | 9.13 | 9.25 |
| | | 1550nm | 9.67 | 9.75 | 9.86 | 9.99 |
| Cut-off wavelength | nm | | 1180 | 1215 | 1250 | 1282 |
| Bending loss | dB/turn | 1625nm r=5mm | 0.1 | 0.1 | 0.1 | 0.0 |

FIG.55G

| Hole occupancy rate | S | % | 42.0 | 42.0 | 42.0 | 42.0 | 42.0 | 42.0 | 42.0 |
|---|---|---|---|---|---|---|---|---|---|
| Distance | L1 | μm | 8.63 | 8.63 | 8.63 | 8.63 | 9.52 | 9.52 | 9.52 |
| Hole diameter | d | μm | 2.9 | 2.9 | 2.9 | 2.9 | 3.2 | 3.2 | 3.2 |
| Core diameter | 2a | μm | 5.6 | 5.8 | 6.0 | 6.2 | 5.7 | 6.0 | 6.4 |
| Relative refractive index difference | Δ1 | % | 0.30 | 0.30 | 0.30 | 0.30 | 0.30 | 0.30 | 0.30 |
| Inner cladding layer diameter | 2b | μm | 28.8 | 28.8 | 28.8 | 28.8 | 28.8 | 28.8 | 28.8 |
| Relative refractive index difference | Δ2 | % | -0.05 | -0.05 | -0.05 | -0.05 | -0.05 | -0.05 | -0.05 |
| Chromatic dispersion | ps/nm/km | 1310nm | 1.73 | 2.06 | 2.39 | 2.82 | -0.38 | 0.24 | 1.00 |
| | | 1550nm | - | 22.90 | 23.35 | 23.84 | 21.01 | 21.32 | 21.70 |
| Zero-dispersion wavelength | nm | | 1309 | 1306 | 1303 | 1300 | 1329 | 1323 | 1315 |
| Zero-dispersion slope | ps/nm²/km | | 0.110 | 0.109 | 0.109 | 0.108 | 0.104 | 0.104 | 0.104 |
| MFD | μm | 1310nm | 8.49 | 8.53 | 8.60 | 8.65 | 8.78 | 8.86 | 8.95 |
| | | 1550nm | 9.05 | 9.18 | 9.15 | 9.18 | 9.53 | 9.58 | 9.63 |
| Cut-off wavelength | nm | | 1200 | 1230 | 1260 | 1275 | 1300 | 1350 | 1405 |
| Bending loss | dB/turn | 1625nm r=5mm | 0.1 | 0.1 | 0.1 | 0.1 | 0.1 | 0.0 | 0.0 |
| Hole occupancy rate | S | % | 42.0 | 42.0 | 42.0 | 42.0 | 42.0 | 42.0 | 42.0 |
| Distance | L1 | μm | 9.52 | 9.52 | 9.52 | 8.33 | 9.52 | 9.52 | 10.77 |
| Hole diameter | d | μm | 3.2 | 3.2 | 3.2 | 2.8 | 3.2 | 3.2 | 3.62 |
| Core diameter | 2a | μm | 6.4 | 6.8 | 6.8 | 5.7 | 7.0 | 7.0 | 7.0 |
| Relative refractive index difference | Δ1 | % | 0.33 | 0.30 | 0.33 | 0.30 | 0.30 | 0.33 | 0.30 |
| Inner cladding layer diameter | 2b | μm | 28.8 | 30.6 | 30.6 | 28.8 | 31.5 | 31.5 | 31.5 |
| Relative refractive index difference | Δ2 | % | -0.05 | -0.05 | -0.05 | -0.05 | -0.05 | -0.05 | -0.05 |
| Chromatic dispersion | ps/nm/km | 1310nm | 0.47 | 1.72 | 1.29 | 3.09 | 2.06 | 1.67 | 0.04 |
| | | 1550nm | 21.04 | 22.12 | 21.56 | 23.84 | 22.35 | 21.82 | 19.92 |
| Zero-dispersion wavelength | nm | | 1320 | 1308 | 1312 | 1280 | 1305 | 1308 | 1325 |
| Zero-dispersion slope | ps/nm²/km | | 0.102 | 0.104 | 0.102 | 0.089 | 0.097 | 0.102 | 0.097 |
| MFD | μm | 1310nm | 8.77 | 9.04 | 8.87 | 8.85 | 9.09 | 8.93 | 9.32 |
| | | 1550nm | 9.47 | 9.68 | 9.53 | 9.57 | 9.71 | 9.57 | 10.15 |
| Cut-off wavelength | nm | | 1440 | 1455 | 1490 | 1360 | 1475 | 1510 | 1600 |
| Bending loss | dB/turn | 1625nm r=5mm | 0.0 | 0.0 | 0.0 | 0.0 | 0.0 | 0.0 | 0.0 |

FIG.55H

| | | | | | | | | | |
|---|---|---|---|---|---|---|---|---|---|
| Hole occupancy rate | S | % | 42.0 | 42.0 | 42.0 | 42.0 | 42.0 | 42.0 | 42.0 |
| Distance | L1 | μm | 10.77 | 11.6 | 11.6 | 12.2 | 12.2 | 12.79 | 12.79 |
| Hole diameter | d | μm | 3.62 | 3.9 | 3.9 | 4..1 | 4.1 | 4.3 | 4.3 |
| Core diameter | 2a | μm | 7.0 | 7.0 | 7.0 | 7.0 | 7.0 | 7.0 | 7.0 |
| Relative refractive index difference | Δ1 | % | 0.33 | 0.30 | 0.33 | 0.30 | 0.33 | 0.30 | 0.33 |
| Inner cladding layer diameter | 2b | μm | 31.5 | 31.5 | 31.5 | 31.5 | 31.5 | 31.5 | 31.5 |
| Relative refractive index difference | Δ2 | % | -0.05 | -0.05 | -0.05 | -0.05 | -0.05 | -0.05 | -0.05 |
| Chromatic dispersion | ps/nm/km | 1310nm | -0.24 | -0.91 | -1.11 | -1.45 | -1.58 | -1.88 | -1.94 |
| | | 1550nm | 19.38 | 18.63 | 18.10 | 17.83 | 17.33 | 17.14 | 16.67 |
| Zero-dispersion wavelength | nm | | 1328 | 1335 | 1337 | 1341 | 1342 | 1346 | 1346 |
| Zero-dispersion slope | ps/nm²/km | | 0.095 | 0.094 | 0.092 | 0.091 | 0.089 | 0.089 | 0.087 |
| MFD | μm | 1310nm | 9.11 | 9.38 | 9.18 | 9.42 | 9.19 | 9.48 | 9.24 |
| | | 1550nm | 9.95 | 10.33 | 10.12 | 10.44 | 10.18 | 10.59 | 10.30 |
| Cut-off wavelength | nm | | 1630 | 1670 | 1700 | 1700 | 1730 | 1720 | 1755 |
| Bending loss | dB/turn | 1625nm r=5mm | 0.0 | 0.0 | 0.0 | 0.0 | 0.0 | 0.0 | 0.0 |
| Hole occupancy rate | S | % | 42.0 | 42.0 | 42.0 | 42.0 | | | |
| Distance | L1 | μm | 8 | 8.63 | 9.52 | 10.12 | | | |
| Hole diameter | d | μm | 2.69 | 2.9 | 3.2 | 3.4 | | | |
| Core diameter | 2a | μm | 6.0 | 6.0 | 6.0 | 6.0 | | | |
| Relative refractive index difference | Δ1 | % | 0.30 | 0.30 | 0.30 | 0.30 | | | |
| Inner cladding layer diameter | 2b | μm | 28.8 | 28.8 | 28.8 | 28.8 | | | |
| Relative refractive index difference | Δ2 | % | -0.05 | -0.05 | -0.05 | -0.05 | | | |
| Chromatic dispersion | ps/nm/km | 1310nm | 4.12 | 2.39 | 0.24 | -1.87 | | | |
| | | 1550nm | 25.10 | 23.35 | 21.32 | 19.34 | | | |
| Zero-dispersion wavelength | nm | | 1283 | 1303 | 1323 | 1334 | | | |
| Zero-dispersion slope | ps/nm²/km | | 0.113 | 0.109 | 0.104 | 0.102 | | | |
| MFD | μm | 1310nm | 8.35 | 8.60 | 8.86 | 8.98 | | | |
| | | 1550nm | 8.73 | 9.15 | 9.58 | 9.97 | | | |
| Cut-off wavelength | nm | | 1185 | 1260 | 1350 | 1385 | | | |
| Bending loss | dB/turn | 1625nm r=5mm | 0.1 | 0.1 | 0.0 | 0.0 | | | |

FIG.56

| | | | | | | | | | |
|---|---|---|---|---|---|---|---|---|---|
| Hole occupancy rate | S | % | 35.7 | 35.7 | 35.7 | 30.1 | 35.7 | 30.1 | 35.7 | 30.1 |
| Distance | L1 | μm | 14.0 | 14.0 | 14.0 | 13.9 | 14.0 | 13.9 | 14.0 | 13.9 |
| Hole diameter | d | μm | 4.0 | 4.0 | 4.0 | 3.3 | 4.0 | 3.3 | 4.0 | 3.3 |
| Core diameter | 2a | μm | 6.6 | 8.0 | 7.0 | 9.0 | 8.0 | 8.0 | 8.0 | 8.0 |
| Relative refractive index difference | Δ1 | % | 0.30 | 0.30 | 0.30 | 0.30 | 0.21 | 0.35 | 0.25 | 0.38 |
| Inner cladding layer diameter | 2b | μm | 36 | 16 | 36 | 20 | 36 | 36 | 36 | 36 |
| Relative refractive index difference | Δ2 | % | -0.05 | -0.05 | -0.05 | -0.05 | -0.05 | -0.05 | -0.05 | -0.05 |
| Chromatic dispersion | | ps/nm/km 1310nm | -3.78 | -0.91 | -2.68 | 0.77 | -0.55 | -0.34 | -0.65 | -0.16 |
| | | 1550nm | 14.84 | 17.01 | 15.57 | 18.55 | 18.41 | 17.08 | 17.79 | 17.12 |
| Zero-dispersion wavelength | | nm | 1354 | 1320 | 1341 | 1302 | 1316 | 1314 | 1317 | 1312 |
| Zero-dispersion slope | | ps/nm²/km | 0.084 | 0.087 | 0.084 | 0.091 | 0.092 | 0.087 | 0.090 | 0.087 |
| MFD | | μm 1310nm | 8.44 | 8.87 | 8.52 | 9.23 | 9.72 | 8.41 | 9.24 | 8.23 |
| | | 1550nm | 9.73 | 10.01 | 9.78 | 10.23 | 10.97 | 9.39 | 10.41 | 9.15 |
| Cut-off wavelength | | nm | 1270 | 1310 | 1335 | 1335 | 1340 | 1395 | 1415 | 1435 |
| Bending loss | | dB/turn 1625nm r=5mm | 0.1 | 0.1 | 0.1 | 0.1 | 0.2 | 0.0 | 0.1 | 0.0 |
| Hole occupancy rate | S | % | 35.7 | 30.1 | 35.7 | 30.1 | 30.1 | | | |
| Distance | L1 | μm | 14.0 | 13.9 | 14.0 | 13.9 | 13.9 | | | |
| Hole diameter | d | μm | 4.0 | 3.3 | 4.0 | 3.3 | 3.3 | | | |
| Core diameter | 2a | μm | 8.0 | 8.0 | 9.0 | 8.0 | 9.8 | | | |
| Relative refractive index difference | Δ1 | % | 0.41 | 0.43 | 0.30 | 0.45 | 0.30 | | | |
| Inner cladding layer diameter | 2b | μm | 36 | 36 | 20 | 36 | 36 | | | |
| Relative refractive index difference | Δ2 | % | -0.05 | -0.05 | -0.05 | -0.05 | -0.05 | | | |
| Chromatic dispersion | | ps/nm/km 1310nm | 0.02 | 0.14 | 0.83 | 0.25 | 1.63 | | | |
| | | 1550nm | 17.21 | 17.28 | 18.72 | 17.37 | 19.56 | | | |
| Zero-dispersion wavelength | | nm | 1310 | 1308 | 1301 | 1307 | 1292 | | | |
| Zero-dispersion slope | | ps/nm²/km | 0.088 | 0.088 | 0.091 | 0.088 | 0.094 | | | |
| MFD | | μm 1310nm | 8.07 | 7.97 | 9.23 | 7.88 | 9.54 | | | |
| | | 1550nm | 8.94 | 8.81 | 10.21 | 8.69 | 10.44 | | | |
| Cut-off wavelength | | nm | 1480 | 1510 | 1495 | 1540 | 1545 | | | |
| Bending loss | | dB/turn 1625nm r=5mm | 0.0 | 0.0 | 0.0 | 0.0 | 0.0 | | | |

FIG.57

| Hole occupancy rate | S | % | 30.1 | 30.1 | 30.1 | 30.3 | 24.1 |
|---|---|---|---|---|---|---|---|
| Distance | L1 | μm | 13.86 | 13.86 | 13.86 | 13.19 | 13.50 |
| Hole diameter | d | μm | 3.33 | 3.33 | 3.33 | 3.19 | 2.60 |
| Core diameter | 2a | μm | 8.1 | 8.0 | 8.1 | 7.6 | 8.1 |
| Relative refractive index difference | Δ1 | % | 0.30 | 0.23 | 0.30 | 0.30 | 0.30 |
| Inner cladding layer diameter | 2b | μm | 16 | 36 | 20 | 33 | 36 |
| Relative refractive index difference | Δ2 | % | -0.05 | -0.05 | -0.05 | -0.05 | -0.05 |
| Chromatic dispersion | ps/nm/km | 1310nm | -0.77 | -0.76 | -0.48 | -1.18 | -0.41 |
| | | 1550nm | 17.00 | 17.81 | 17.26 | 16.93 | 17.31 |
| Zero-dispersion wavelength | nm | | 1319 | 1318 | 1315 | 1323 | 1315 |
| Zero-dispersion slope | ps/nm²/km | | 0.0867 | 0.0900 | 0.0876 | 0.0872 | 0.0877 |
| MFD | μm | 1310nm | 8.92 | 9.48 | 8.86 | 8.63 | 8.79 |
| | | 1550nm | 10.07 | 10.73 | 9.95 | 9.73 | 9.84 |
| Cut-off wavelength | nm | | 1195 | 1195 | 1210 | 1235 | 1235 |
| Bending loss | dB/turn | 1625nm r=5mm | 0.2 | 0.3 | 0.2 | 0.1 | 0.2 |
| Hole occupancy rate | S | % | 30.1 | 30.1 | 26.0 | 30.1 | 29.8 |
| Distance | L1 | μm | 13.86 | 13.86 | 13.22 | 13.86 | 13.86 |
| Hole diameter | d | μm | 3.33 | 3.33 | 2.75 | 3.33 | 3.30 |
| Core diameter | 2a | μm | 8.0 | 8.1 | 8.2 | 8.1 | 7.8 |
| Relative refractive index difference | Δ1 | % | 0.25 | 0.30 | 0.30 | 0.30 | 0.30 |
| Inner cladding layer diameter | 2b | μm | 36 | 24 | 35 | 28 | 34 |
| Relative refractive index difference | Δ2 | % | -0.05 | -0.05 | -0.05 | -0.05 | -0.05 |
| Chromatic dispersion | ps/nm/km | 1310nm | -0.76 | -0.39 | -0.23 | -0.39 | -0.98 |
| | | 1550nm | 17.55 | 17.37 | 17.64 | 17.38 | 16.81 |
| Zero-dispersion wavelength | nm | | 1319 | 1314 | 1313 | 1314 | 1321 |
| Zero-dispersion slope | ps/nm²/km | | 0.0888 | 0.0880 | 0.0886 | 0.0880 | 0.0866 |
| MFD | μm | 1310nm | 9.25 | 8.90 | 8.80 | 8.89 | 8.70 |
| | | 1550nm | 10.45 | 10.00 | 9.84 | 9.99 | 9.81 |
| Cut-off wavelength | nm | | 1235 | 1236 | 1255 | 1260 | 1260 |
| Bending loss | dB/turn | 1625nm r=5mm | 0.2 | 0.1 | 0.2 | 0.1 | 0.1 |

HOLE-ASSISTED OPTICAL FIBER

CROSS-REFERENCE TO RELATED APPLICATIONS

This application is a continuation of PCT International Application No. PCT/JP2011/068073 filed on Aug. 8, 2011 which claims the benefit of priority from Japanese Patent Application No. 2010-179058 filed on Aug. 9, 2010, the entire contents of which are incorporated herein by reference.

BACKGROUND

1. Technical Field

The disclosure relates to a hole-assisted optical fiber.

2. Related Art

Conventionally, an optical fiber compliant with ITU-T G.652 (made by International Telecommunication Union) has been used for optical communications. In the ITU-T G.652, as optical fiber characteristics, a mode field diameter at a wavelength of 1310 nm is specified as in a range of 8.6 to 9.5 (±0.6) μm, a cut-off wavelength by a 22 m method defined in ITU-T G.650 is specified as equal to or less than 1260 nm, and a zero-dispersion wavelength is specified as in a range of 1300 to 1324 nm.

A hole-assisted optical fiber (HAF) is an optical fiber having a constitution such that holes are provided in a cladding portion formed around a core portion to which germanium or the like is added, the core being high in refraction index (see Japanese Patent No. 3854627 and Japanese Patent Application Laid-open No. 2004-226540). The hole-assisted optical fiber is provided with the holes to intensify the confinement of light to the core portion thus being characterized by a decrease in bending loss. Therefore, bending loss characteristics further more excellent than that specified in the ITU-T G.657B can be realized and hence, the hole-assisted optical fiber has come to attention as an optical fiber used in place of the above-mentioned conventional optical fiber compliant with the ITU-T G.652.

In addition, in the ITU-T G.652, the value of the bending loss when bent at a radius of 7.5 mm is specified as equal to or less than 1 dB/turn for a wavelength of 1625 nm and equal to or less than 0.5 dB/turn for a wavelength of 1550 nm. Here, "dB/turn" is a unit expressing the increase in transmission loss per one turn in decibels when an optical fiber is wound by one around (one turn) at a predetermined radius.

Here, when the hole-assisted optical fiber is used as an optical communications-use optical fiber compliant with ITU-T G.652, it is necessary to realize single-mode transmission at a wavelength (1556 nm, for example) used for optical communications. Furthermore, at the same time, in order to improve productivity, the hole-assisted optical fiber preferably has a large design margin for achieving desired properties thereof.

SUMMARY

In accordance with some embodiments, a hole-assisted optical fiber includes a core portion and a cladding portion. The cladding portion includes an inner cladding layer formed around an outer periphery of the core portion and having a refractive index lower than that of the core portion, an outer cladding layer formed around an outer periphery of the inner cladding layer and having a refractive index higher than that of the inner cladding layer and lower than that of the core portion, and a plurality of holes formed around the core portion. A diameter of the core portion is in a range of 3 μm to 9.8 μm. A relative refractive index difference of the core portion relative to the outer cladding layer is in a range of 0.11% to 0.45%. An outside diameter of the inner cladding layer is equal to or less than 53 μm. A relative refractive index difference of the inner cladding layer relative to the outer cladding layer is a negative value equal to or more than −0.30%. A diameter of each of the plurality of holes is in a range of 2.4 μm to 4.0 μm. A hole occupancy rate is in a range of 17% to 48%. A bending loss at a wavelength of 1625 nm when bent at a radius of 5 mm is equal to or less than 1 dB/turn. A cut-off wavelength is equal to or less than 1550 nm. The hole occupancy rate S (%) is defined by the following expression (1):

$$S = N\pi(d/2)^2 / [\pi(R+d)^2 - \pi R^2] \qquad (1)$$

where N is the number of the plurality of holes, d (μm) is the diameter of each of the plurality of holes, and R (μm) is a radius of an inscribed circle which is brought into internal contact with each of the plurality of holes.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 55A is a view illustrating a relationship between the combination of the structural parameters and optical properties when the hole occupancy rate S is 30.1%;

FIG. 55B is a view illustrating a relationship between the combination of the structural parameters and optical properties when the hole occupancy rate S is 30.1%;

FIG. 55C is a view illustrating a relationship between the combination of the structural parameters and the optical properties when the hole occupancy rate S is 35.7%;

FIG. 55D is a view illustrating a relationship between the combination of the structural parameters and the optical properties when the hole occupancy rate S is 35.7%;

FIG. 55E is a view illustrating a relationship between the combination of the structural parameters and the optical properties when the hole occupancy rate S is 38.0%;

FIG. 55F is a view illustrating a relationship between the combination of the structural parameters and the optical properties when the hole occupancy rate S is 38.0%;

FIG. 55G is a view illustrating a relationship between the combination of the structural parameters and the optical properties when the hole occupancy rate S is 42.0%;

FIG. 55H is a view illustrating a relationship between the combination of the structural parameters and the optical properties when the hole occupancy rate S is 42.0%;

FIG. 56 is a view illustrating a relationship between the combination of the hole occupancy rate and other design parameters, and the optical properties; and FIG. 57 is a view illustrating a relationship between another combination of the hole occupancy rate and other design parameters, and the optical properties.

DETAILED DESCRIPTION

Figure 1:
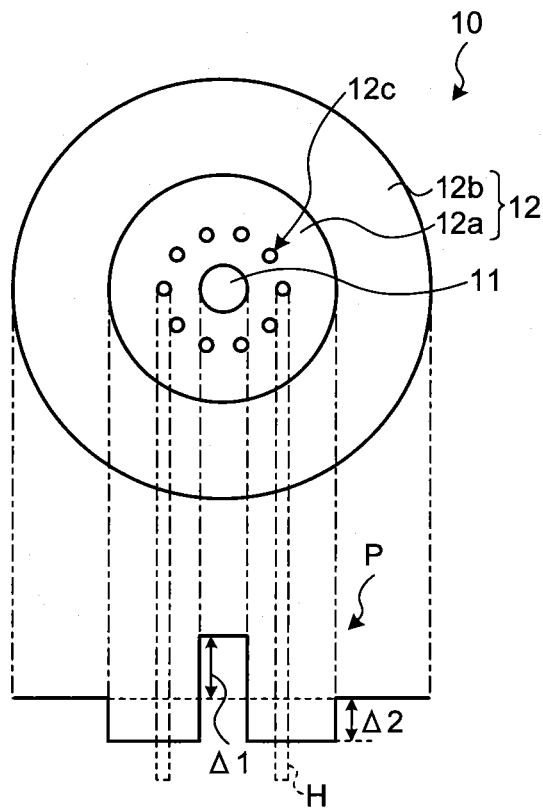
FIG. 1 is a view illustrating a schematic cross section of a hole-assisted optical fiber according to a first embodiment and a refractive index profile corresponding thereto.

Hereinafter, with reference to the drawings, embodiments of a hole-assisted optical fiber according to the present invention are explained in detail. Here, the present invention is not limited to the embodiments. Furthermore, in the drawings, identical parts or parts corresponding to each other are properly given same numerals. Furthermore, unless otherwise specified, the value of a bending loss is specified at a wavelength of 1625 nm when bent at a radius of 5 mm, and the value of a mode field diameter (MFD) is specified at a wavelength of 1310 nm. In addition, terms that are not defined in this specification conform to definitions or measurement methods described in ITU-T G.650.1.

First Embodiment

FIG. 1 is a view illustrating a schematic cross section of a hole-assisted optical fiber 10 according to a first embodiment of the present invention and a refractive index profile corresponding thereto. As illustrated in FIG. 1, the hole-assisted optical fiber 10 includes a core portion 11 and a cladding portion having an inner cladding layer 12a formed around an outer periphery of the core portion 11, an outer cladding layer 12b formed around an outer periphery of the inner cladding layer 12a, and ten holes 12c formed around the core portion 11. The holes 12c are arranged so that the distances between the holes 12c and the center of the core portion 11 are equal to each other and central angles are equal to each other.

The core portion 11 is made of silica based glass to which dopant for improving a refraction index, such as germanium (Ge), is added. The inner cladding layer 12a is, for example, made of silica based glass to which dopant for lowering the refractive index, such as fluorine (F), is added. The outer cladding layer 12b is, for example, made of pure silica glass in which dopant for adjusting the refractive index is not contained. Therefore, as illustrated by the refraction index profile P, the inner cladding layer 12a has a refractive index lower than that of the core portion 11. Furthermore, the outer cladding layer 12b has a refractive index higher than that of the inner cladding layer 12a and lower than that of the core portion 11. Here, a broken line H indicates the positions of the holes 12c.

The design parameters of the hole-assisted optical fiber 10 are specified. First of all, as a parameter for the refractive index out of the design parameters, as illustrated in FIG. 1, the relative refractive index difference of the core portion 11 to the outer cladding layer 12b is Δ1, and the relative refractive index difference of the inner cladding layer 12a to the outer cladding layer 12b is Δ2.

Figure 2:
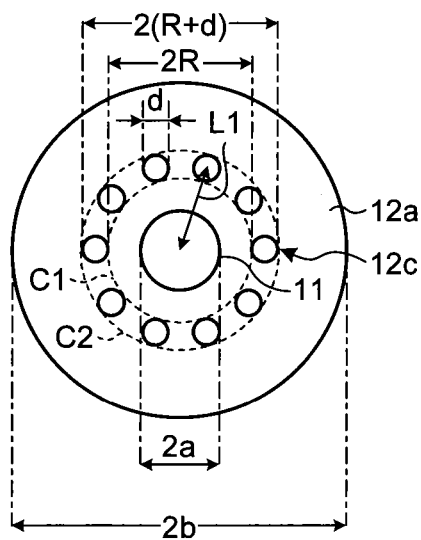
FIG. 2 is an explanatory view for explaining structural parameters of the hole-assisted optical fiber illustrated in FIG. 1.

Next, structural parameters out of the design parameters of the hole-assisted optical fiber 10 are explained. FIG. 2 is an explanatory view for explaining structural parameters of the hole-assisted optical fiber 10 illustrated in FIG. 1. As illustrated in FIG. 2, the diameter of the core portion 11 (a core diameter) is expressed as 2a [μm], the outside diameter of the inner cladding layer 12a (an inner cladding layer outside diameter) is expressed as 2b [μm], the diameter of the hole 12c (a hole diameter) is expressed as d [μm], the distance from the center of the core portion 11 to the center of the hole 12c is expressed as L1 [μm], and the minimum distance from the center of the core portion 11 to the outer edge of the hole 12c; that is, the radius of an inscribed circle C1 brought into internal contact with each hole 12c with the center of the core portion 11 as the center is expressed as R [μm].

Here, a core diameter 2a is defined as a diameter at a position where the relative refractive index difference $\Delta 1$ becomes 0% on the border between the core portion 11 and the inner cladding layer 12a. Furthermore, an inner cladding layer outside diameter 2b is defined as a diameter at a position where a relative refractive index difference becomes one-half of the relative refractive index difference $\Delta 2$ on the border between the inner cladding layer 12a and the outer cladding layer 12b.

Furthermore, the number of the holes 12c is expressed as N, and the following expression (1) defines a hole occupancy rate S [%].

$$S = N\pi(d/2)^2 / [\pi(R+d)^2 - \pi R^2] \quad (1)$$

The hole occupancy rate S indicates a ratio of an area occupied by the holes 12c to the area of an annular region whose radius is (R+d), the annular region being formed between a circumscribed circle C2 and the inscribed circle C1 of each hole 12c.

Furthermore, in FIGS. 1 and 2, the holes 12c are positioned in the inner cladding layer 12a. However, the position of each hole 12c is not limited in particular. That is, a large and small relationship between the distance L1 and the inner cladding layer outside diameter 2b is arbitrarily changed. Therefore, the holes 12c may be positioned in the outer cladding layer 12b, and may be positioned so that the holes 12c are arranged in an area extending over the inner cladding layer 12a and the outer cladding layer 12b.

Next, in the hole-assisted optical fiber 10 according to the present embodiment, the characteristics of the cut-off wavelength and the bending loss with respect to the hole occupancy rate S are explained. Hereinafter, the core diameter 2a is set to 8 μm, the inner cladding layer outside diameter 2b is set to 36 μl, the relative refractive index difference $\Delta 1$ is set to 0.3%, and the relative refractive index difference $\Delta 2$ is set to −0.05%. Furthermore, as a comparative embodiment, in the structure of the hole-assisted optical fiber 10 illustrated in FIG. 1, the core diameter 2a is set to 8 μm, the inner cladding layer outside diameter 2b is set to 36 and the relative refractive index difference $\Delta 1$ is set to 0.3%. Here, the relative refractive index difference $\Delta 2$ is 0%, and the characteristics of a hole assisted optical fiber substantially having a structure with no inner cladding layer are explained.

Figure 3A:
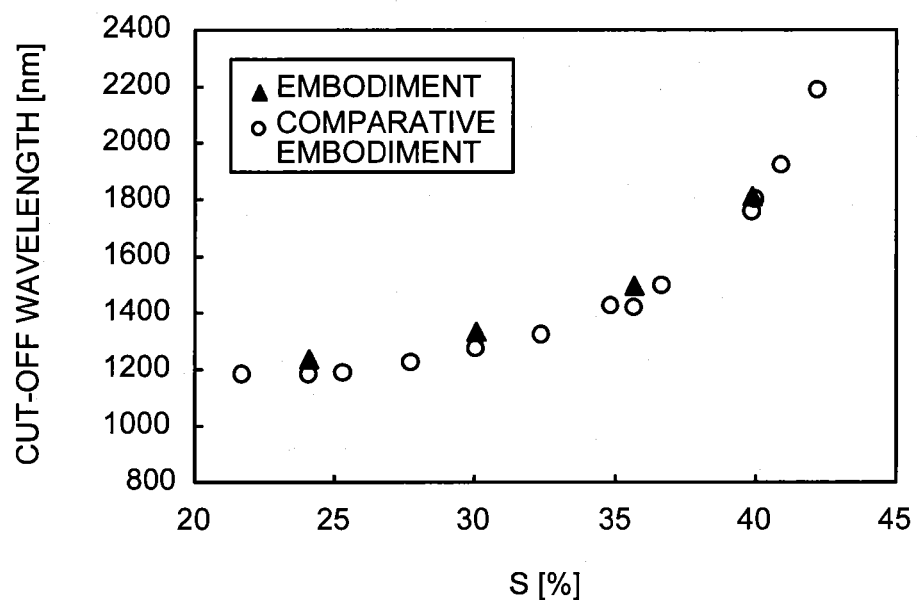
FIG. 3A is a view illustrating a relationship between a hole occupancy rate S and a cut-off wavelength for the hole-assisted optical fiber according to the first embodiment and a hole-assisted optical fiber according to a comparative embodiment.

FIG. 3A is a view illustrating a relationship between the hole occupancy rate S and the cut-off wavelength for the hole-assisted optical fiber 10 according to the first embodiment and the hole-assisted optical fiber according to the comparative embodiment. Furthermore, FIG. 3B is a view illustrating a relationship between the hole occupancy rate S and the bending loss for the hole-assisted optical fiber according to the first embodiment and the hole-assisted optical fiber according to the comparative embodiment.

As illustrated in FIG. 3A, the hole-assisted optical fiber 10 according to the first embodiment and the hole-assisted optical fiber according to the comparative embodiment each has a cut-off wavelength in the similar range with respect to the same hole occupancy rate S. For example, when the cut-off wavelength is set to equal to or less than 1550 nm, the hole occupancy rate S in both the first embodiment and the comparative embodiment may be set to equal to or less than 37.5%.

Figure 3B:
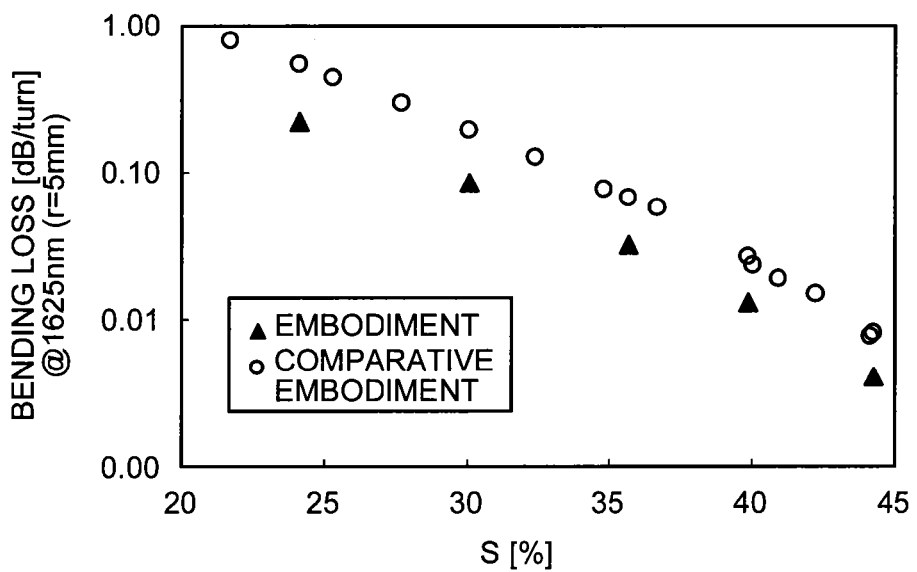
FIG. 3B is a view illustrating a relationship between the hole occupancy rate S and a bending loss for the hole-assisted optical fiber according to the first embodiment and the hole-assisted optical fiber according to the comparative embodiment.

On the other hand, as illustrated in FIG. 3B, with respect to the bending loss, the hole-assisted optical fiber 10 according to the first embodiment is further excellent in bending loss characteristics with respect to the same hole occupancy rate S thus realizing further small bending loss. For example, the bending loss when the cut-off wavelength is 1260 nm is 0.196 dB/turn in the comparative embodiment, and as small as 0.085 dB/turn in the first embodiment. Furthermore, when the bending loss is set to equal to or less than 0.1 dB/turn, it is necessary to set the hole occupancy rate S to equal to or more than 33% in the comparative embodiment. On the other hand, in the first embodiment, the hole occupancy rate S may be set to equal to or more than 28.5% thus realizing a bending loss of equal to or less than 0.1 dB/turn with respect to the hole occupancy rate S in a wider range.

Furthermore, the hole-assisted optical fiber 10 according to the first embodiment is further excellent in bending loss characteristics and hence, when a hole-assisted optical fiber with bending loss characteristics equivalent to that of the hole-assisted optical fiber according to the comparative embodiment is designed, the cut-off wavelength can be set shorter. As a result, a wavelength bandwidth in which a single-mode transmission can be realized becomes wider. For example, a cut-off wavelength when the bending loss is 0.1 dB/turn is 1270 nm in the comparative embodiment and 1170 nm in the first embodiment.

Next, in the hole-assisted optical fiber 10 according to the first embodiment and the hole-assisted optical fiber according to the comparative embodiment, a cut-off wavelength, a bending loss, a mode field diameter (MFD), a zero-dispersion wavelength, and a zero-dispersion slope when the hole occupancy rate S is 30.1%, 35.7%, or 39.9%, and the inner cladding layer outside diameter 2b is changed are explained. Here, the zero-dispersion slope means the gradient of chromatic dispersion at the zero-dispersion wavelength. Hereinafter, the core diameter 2a is 8 μm, the relative refractive index difference $\Delta 1$ is 0.3%, and the relative refractive index difference $\Delta 2$ is −0.05%.

Figure 4A:
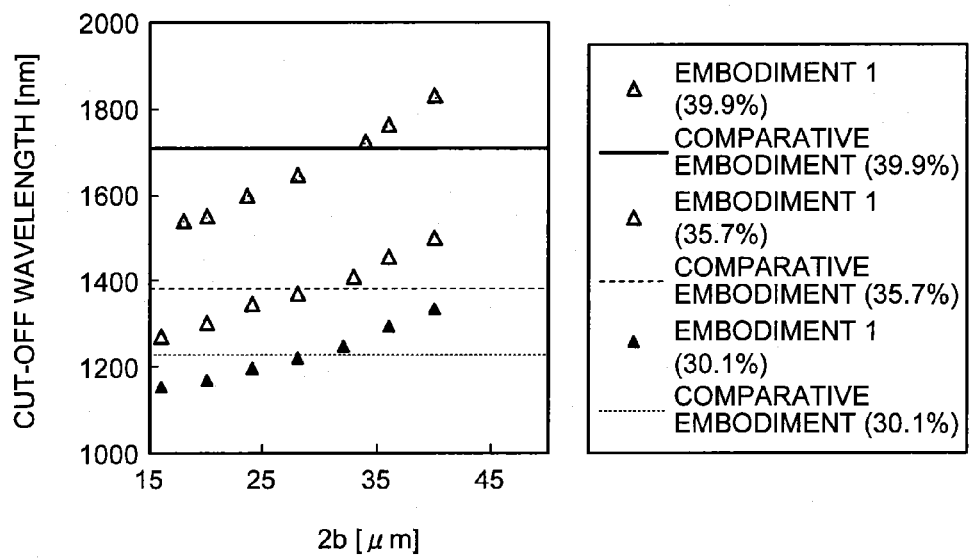
FIG. 4A is a view illustrating a relationship between an inner cladding layer outside diameter 2b and a cut-off wavelength for a hole-assisted optical fiber 10 according to the first embodiment and the hole-assisted optical fiber according to the comparative embodiment.
Figure 4B:
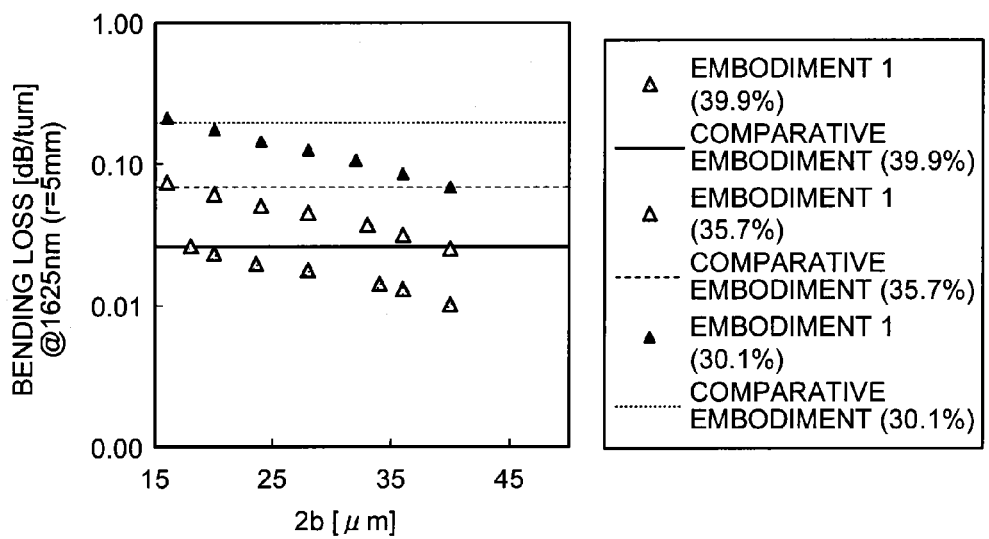
FIG. 4B is a view illustrating a relationship between the inner cladding layer outside diameter 2b and the bending loss for the hole-assisted optical fiber according to the first embodiment and the hole-assisted optical fiber according to the comparative embodiment.
Figure 4C:
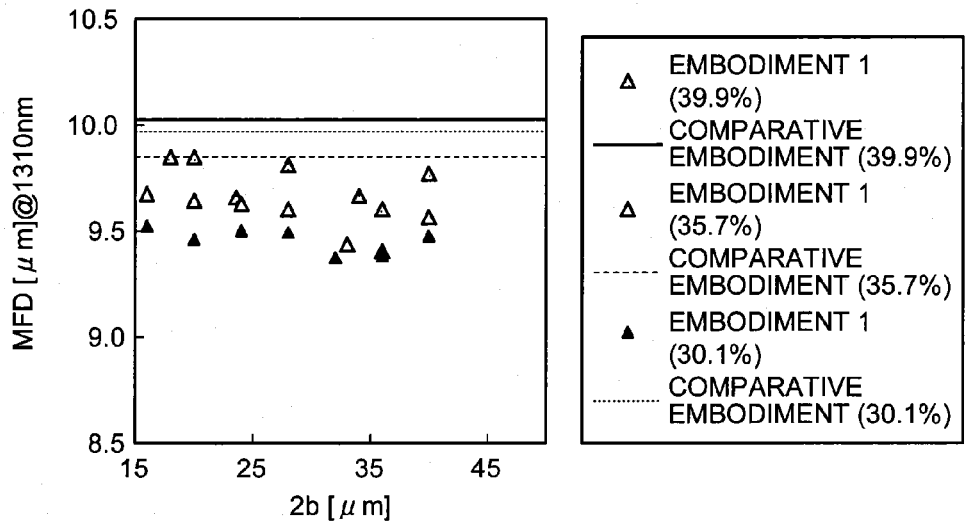
FIG. 4C is a view illustrating a relationship between the inner cladding layer outside diameter 2b and an MFD for the hole-assisted optical fiber according to the first embodiment and the hole-assisted optical fiber according to the comparative embodiment.
Figure 4D:
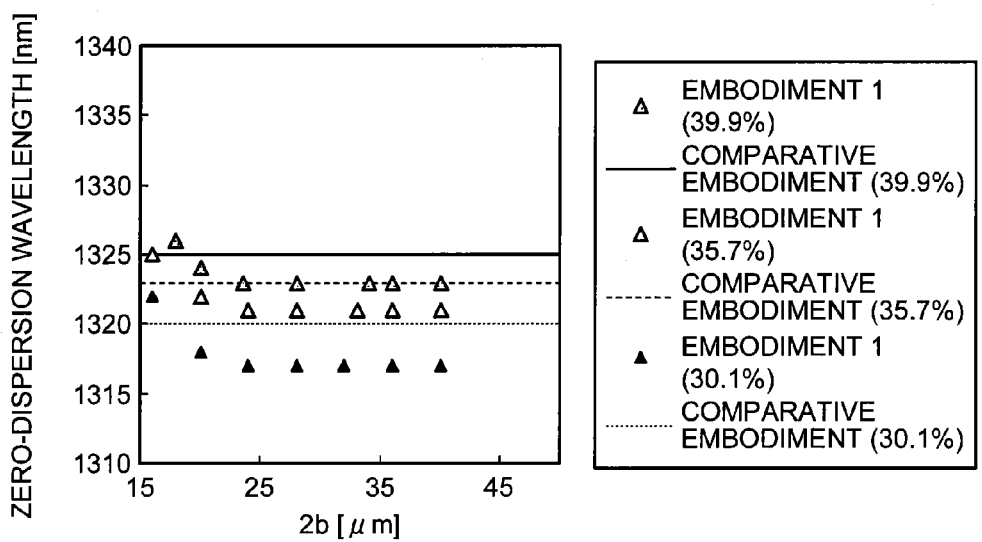
FIG. 4D is a view illustrating a relationship between the inner cladding layer outside diameter 2b and a zero-dispersion wavelength for the hole-assisted optical fiber according to the first embodiment and the hole-assisted optical fiber according to the comparative embodiment.
Figure 4E:
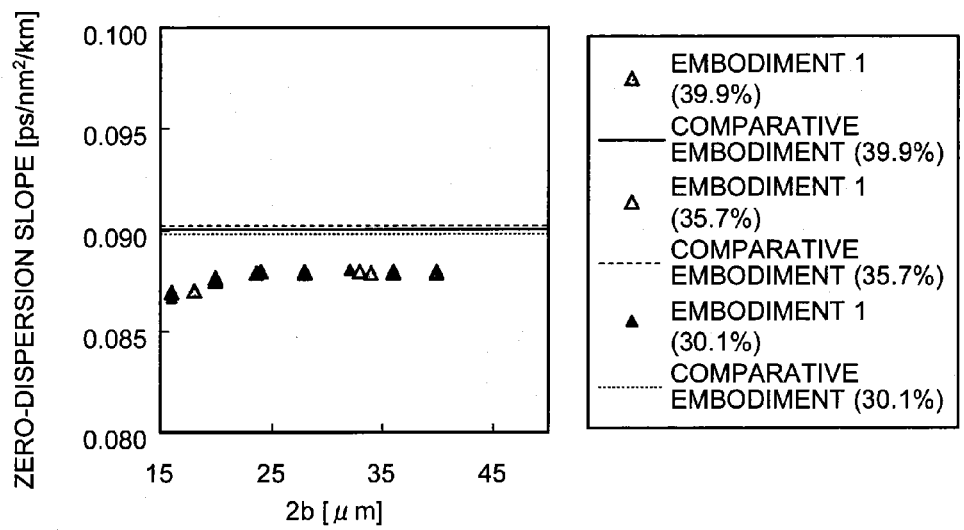
FIG. 4E is a view illustrating a relationship between the inner cladding layer outside diameter 2b and a zero-dispersion slope for the hole-assisted optical fiber according to the first embodiment and the hole-assisted optical fiber according to the comparative embodiment.

FIG. 4A is a view illustrating a relationship between the inner cladding layer outside diameter 2b and the cut-off wavelength for the hole-assisted optical fiber 10 according to the first embodiment and the hole-assisted optical fiber according to the comparative embodiment. FIG. 4B is a view illustrating a relationship between the inner cladding layer outside diameter 2b and the bending loss for the hole-assisted optical fiber according to the first embodiment and the hole-assisted optical fiber according to the comparative embodiment. FIG. 4C is a view illustrating a relationship between the inner cladding layer outside diameter 2b and an MFD for the hole-assisted optical fiber according to the first embodiment and the hole-assisted optical fiber according to the comparative embodiment. FIG. 4D is a view illustrating a relationship between the inner cladding layer outside diameter 2b and the zero-dispersion wavelength for the hole-assisted optical fiber according to the first embodiment and the hole-assisted optical fiber according to the comparative embodiment. Furthermore, FIG. 4E is a view illustrating a relationship between the inner cladding layer outside diameter 2b and the zero-dispersion slope for the hole-assisted optical fiber according to the first embodiment and the hole-assisted optical fiber according to the comparative embodiment.

As illustrated in FIGS. 4A to 4E, in the hole-assisted optical fiber according to the comparative embodiment, the inner cladding layer 12a does not exist and hence, the characteristics thereof; that is, the cut-off wavelength, the bending loss, the MFD, the zero-dispersion wavelength, and the zero-dispersion slope have constant values. On the other hand, the hole-assisted optical fiber 10 according to the first embodiment is provided with the inner cladding layer 12a and the inner cladding layer outside diameter 2b is adjusted thus adjusting the above-mentioned characteristics over the wide range. That is, in the hole-assisted optical fiber 10 according to the first embodiment, the combination of the other design parameters and the inner cladding layer outside diameter 2b can further increase the degree of freedom in the setting of the design parameter.

Here, as illustrated in FIG. 4A, the cut-off wavelength of the hole-assisted optical fiber 10 according to the first embodiment turns into a long wavelength along with the increase of the hole occupancy rate S or the increase of the inner cladding layer outside diameter 2b. For example, if the hole occupancy rate S is 39.9%, when the inner cladding layer outside diameter 2b is larger than approximately 35 µm, the cut-off wavelength of the first embodiment becomes longer than that of the comparative embodiment. In the same manner as above, if the hole occupancy rate S is 35.7%, when the inner cladding layer outside diameter 2b is larger than approximately 28 µm, the cut-off wavelength of the first embodiment becomes longer than that of the comparative embodiment. If the hole occupancy rate S is 30.1%, when the inner cladding layer outside diameter 2b is larger than approximately 27 µm, the cut-off wavelength of the first embodiment becomes longer than that of the comparative embodiment.

Furthermore, as illustrated in FIG. 4B, the bending loss of the hole-assisted optical fiber 10 according to the first embodiment turns into a low loss along with the increase of the hole occupancy rate S and the increase of the inner cladding layer outside diameter 2b. Furthermore, to consider also any case out of the cases where the hole occupancy rate S is 39.9%, 35.7%, and 30.1%, when the inner cladding layer outside diameter 2b is larger than approximately 15 µm to 16 µm, the bending loss of the first embodiment becomes lower than that of the comparative embodiment.

Furthermore, as illustrated in FIGS. 4C to 4E, the MFD, the zero-dispersion wavelength, and the zero-dispersion slope are less dependent on the inner cladding layer outside diameter 2b. Particularly, the zero-dispersion slope is also less dependent on the hole occupancy rate S. However, in the hole-assisted optical fiber 10 according to the first embodiment, any characteristics of the MFD, the zero-dispersion wavelength, and the zero-dispersion slope thereof can also be made smaller than those of the hole-assisted optical fiber according to the comparative embodiment.

That is, the hole-assisted optical fiber 10 according to the first embodiment is provided with the inner cladding layer 12a whereby the degree of freedom in design margin and design for realizing desired characteristics is large compared with the case of the hole-assisted optical fiber according to the comparative embodiment. As a result, a load in designing is reduced and the permissible amount of a manufacture error becomes large thus further improving productivity.

Furthermore, the hole-assisted optical fiber 10 according to the first embodiment has the core diameter 2a set in a range of 3 µm to 9.8 a relative refractive index difference Δ1 set in a range of 0.11% to 0.45%, the inner cladding layer outside diameter 2b set to a value larger than a core diameter 2a of equal to or less than 53 a relative refractive index difference Δ2 set to a negative value of equal to or more than −0.30%, a hole diameter d set in a range of 2.7 µm to 4.0 µm, and a hole occupancy rate S set in a range of 17% to 48% thus realizing characteristics such that the bending loss is equal to or less than 1 dB/turn being smaller than a value specified in ITU-T G.657B and the cut-off wavelength is equal to or less than 1550 nm.

Furthermore, the core diameter 2a is set in a range of 6.0 µm to 8.4 µm, the relative refractive index difference Δ1 is set in a range of 0.23% to 0.32%, the inner cladding layer outside diameter 2b is set to a value larger than a core diameter 2a of equal to or less than 50 µm, the relative refractive index difference Δ2 is set to a negative value of equal to or more than −0.15%, the hole diameter d is set in a range of 2.2 µm to 3.4 µm, and the hole occupancy rate S is set to equal to or less than 42% thus realizing characteristics such that the bending loss is equal to or less than 1 dB/turn, the cut-off wavelength is equal to or less than 1260 nm, the mode field diameter is in a range of 8.6 µm to 9.5 µm, and the zero-dispersion wavelength is in a range of 1300 nm to 1324 nm, the characteristics, which is compliant with the ITU-T G.652.

In addition, the core diameter 2a is set in a range of 6.0 µm to 8.4 µm, the relative refractive index difference Δ1 is set in a range of 0.23% to 0.32%, the inner cladding layer outside diameter 2b is set to a value larger than a core diameter 2a of equal to or less than 50 µm, the relative refractive index difference Δ2 is set to a negative value of equal to or more than −0.15%, the hole diameter d is set in a range of 2.7 µm to 3.4 µm, and the hole occupancy rate S is set to equal to or less than 42% thus realizing characteristics that is compliant with the ITU-T G.652 and the bending loss is as small as equal to or less than 0.1 dB/turn.

Hereinafter, based on the results of simulation calculations, in the hole-assisted optical fiber 10 according to the first embodiment, a relationship between the preferable ranges of design parameters such as the above-mentioned hole occupancy rate S, the core diameter 2a, relative refractive index differences Δ1 and Δ2, the inner cladding layer outside diameter 2b, and hole diameter d and optical properties realized by the design parameters, such as the cut-off wavelength, the bending loss, the mode field diameter (MFD), and the zero-dispersion wavelength is explained.

Relationship between hole occupancy rate and optical properties

First of all, relationships between the hole occupancy rate S and optical properties are explained. Here, with respect to the other design parameters, the core diameter 2a is fixedly set to 8 µm, the inner cladding layer outside diameter 2b is fixedly set to 36 µm, the relative refractive index difference Δ1 is fixedly set to 0.30%, and the relative refractive index difference Δ2 is fixedly set to −0.05%.

Figure 5:
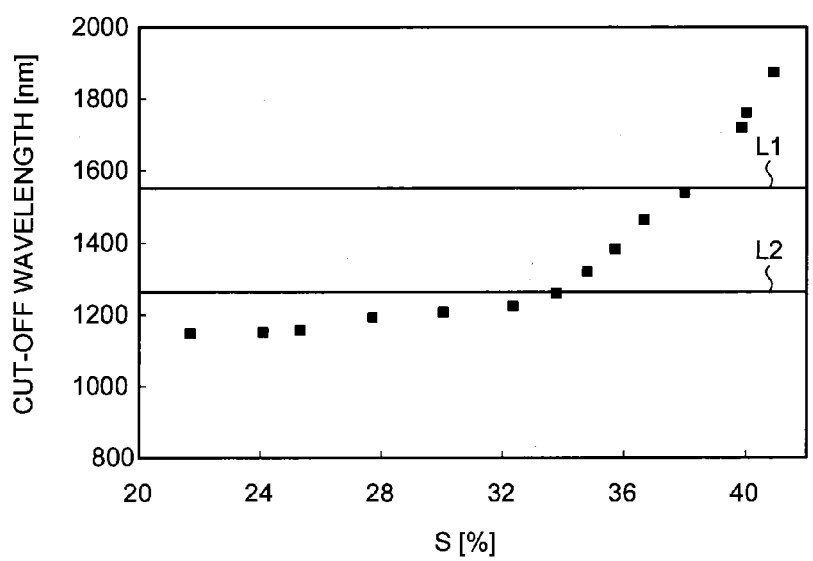
FIG. 5 is a view illustrating a relationship between the hole occupancy rate S and the cut-off wavelength.

FIG. 5 is a view illustrating a relationship between the hole occupancy rate S and the cut-off wavelength. Here, lines L1 and L2 indicate positions at which the cut-off wavelengths are 1550 nm and 1260 nm, respectively. As illustrated in FIG. 5, when the hole occupancy rate S is equal to or less than 38%, the cut-off wavelength can be set to equal to or less than 1550 nm. When the hole occupancy rate S is equal to or less than 34%, the cut-off wavelength can be set to equal to or less than 1260 nm, which is compliant with the ITU-T G.652.

Figure 6:
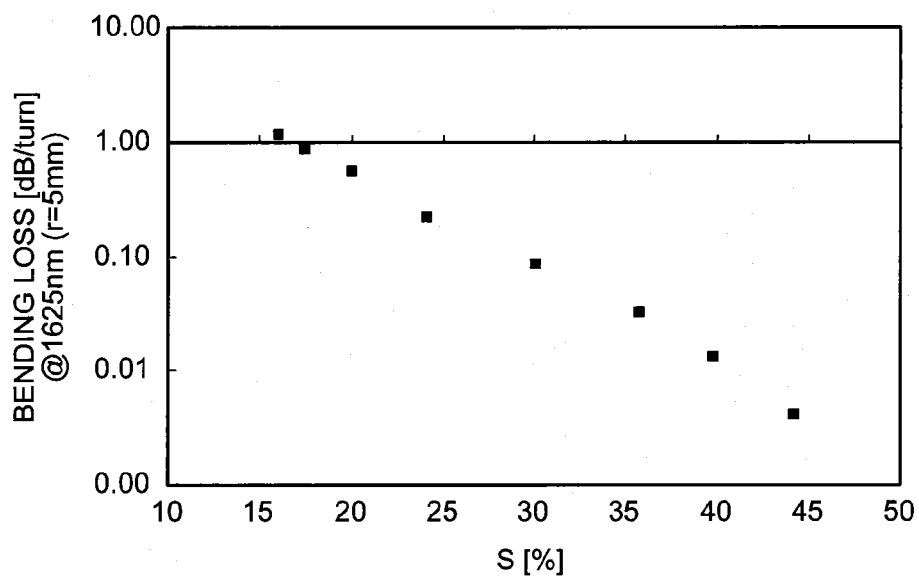
FIG. 6 is a view illustrating a relationship between the hole occupancy rate S and the bending loss.

FIG. 6 is a view illustrating a relationship between the hole occupancy rate S and the bending loss. As illustrated in FIG. 6, when the hole occupancy rate S is 17%, the bending loss is 1 dB/turn. Therefore, when the hole occupancy rate S is set to equal to or more than 17%, the bending loss can be set to equal to or less than 1 dB/turn.

Figure 7:
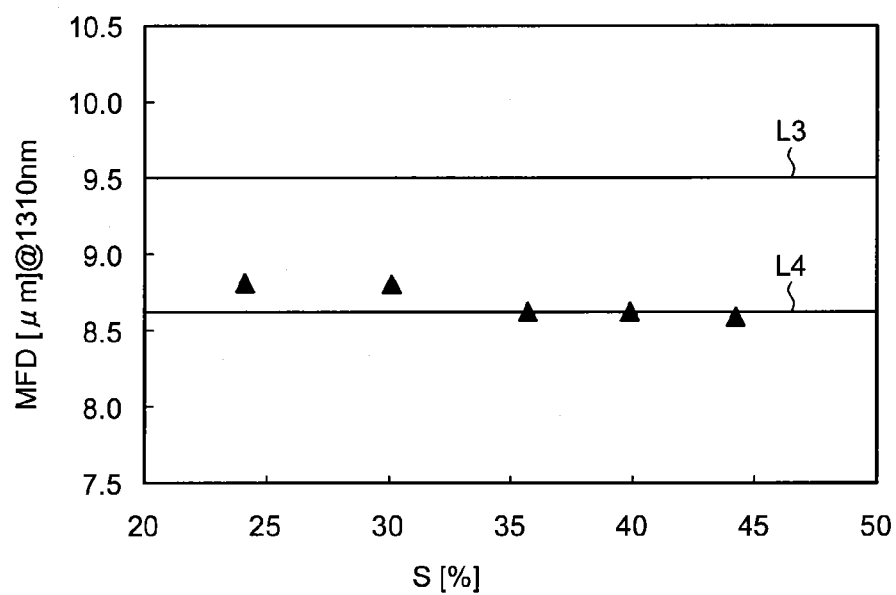
FIG. 7 is a view illustrating a relationship between the hole occupancy rate S and a MFD.

FIG. 7 is a view illustrating a relationship between the hole occupancy rate S and the MFD. Here, lines L3 and L4 indicate positions at which the MFDs are 8.6 μm and 9.5 μm, respectively. As illustrated in FIG. 7, when the hole occupancy rate S is equal to or less than 45%, the MFD can be set in a range of 8.6 μm to 9.5 μm, which is compliant with the ITU-T G.652. For example, when the hole occupancy rate S is equal to or less than 33%, the MFD can be set to equal to or more than 8.7 μm.

Figure 8:
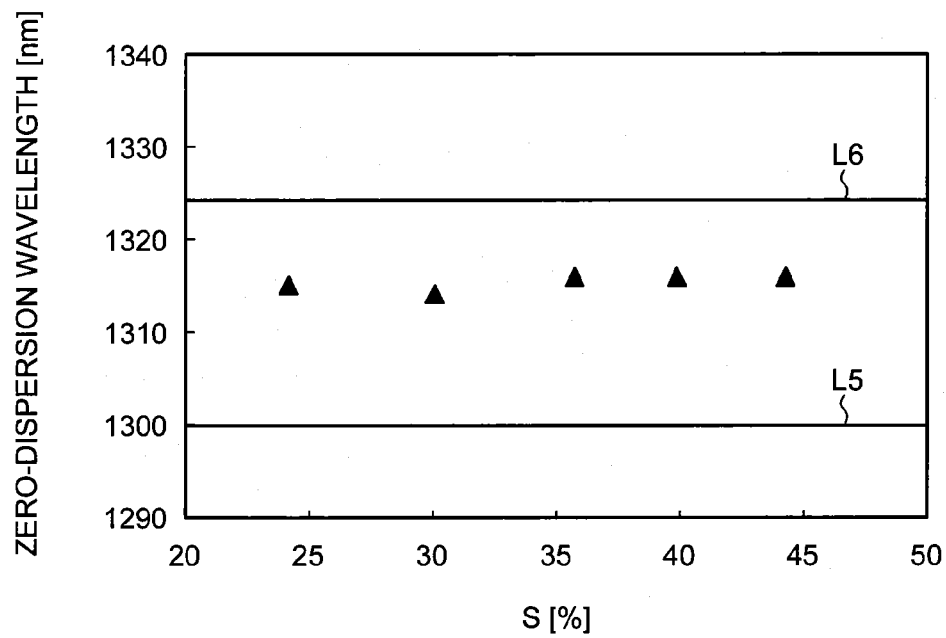
FIG. 8 is a view illustrating a relationship between the hole occupancy rate S and the zero-dispersion wavelength.

FIG. 8 is a view illustrating a relationship between the hole occupancy rate S and the zero-dispersion wavelength. Here, lines L5 and L6 indicate positions at which the zero-dispersion wavelengths are 1300 nm and 1324 nm, respectively. As illustrated in FIG. 8, the zero-dispersion wavelength hardly depends on the hole occupancy rate S and hence, the hole occupancy rate S is set to equal to or less than 45% and the zero-dispersion wavelength can be set in a range of 1300 nm to 1324 nm, which is compliant with the ITU-T G.652.

Relationship between core diameter and optical properties

Next, relationships between the core diameter 2a and optical properties are explained. Here, with respect to the other design parameters, the hole occupancy rate S is fixedly set to 30.1%, the inner cladding layer outside diameter 2b is fixedly set to 36 μm, the relative refractive index difference Δ1 is fixedly set to 0.30%, and the relative refractive index difference Δ2 is fixedly set to −0.05%.

Figure 9:
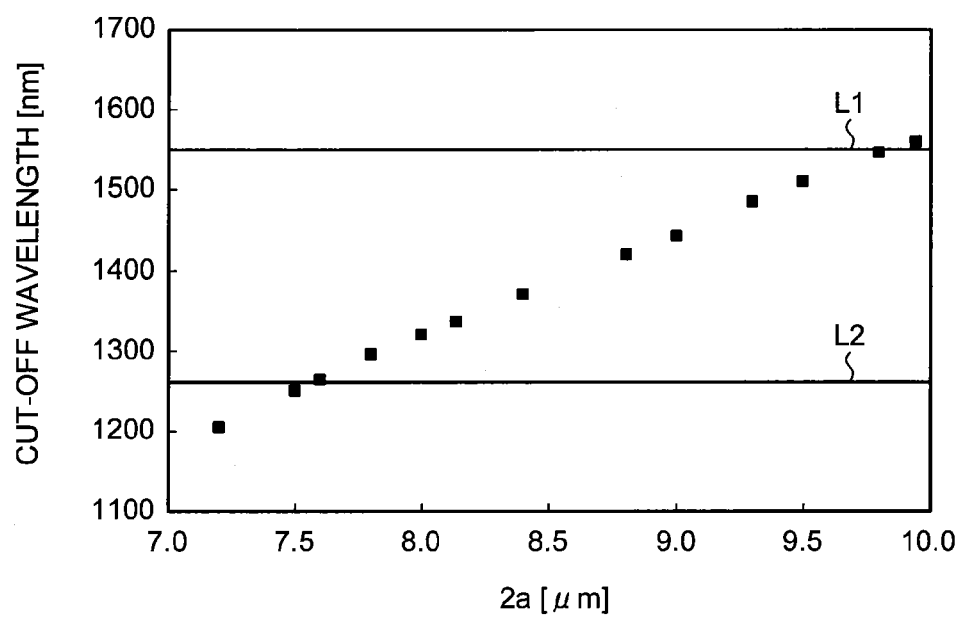
FIG. 9 is a view illustrating a relationship between a core diameter 2a and the cut-off wavelength.

FIG. 9 is a view illustrating a relationship between the core diameter 2a and the cut-off wavelength. Here, lines L1 and L2 indicate positions at which the cut-off wavelengths are 1550 nm and 1260 nm, respectively. As illustrated in FIG. 9, when the core diameter 2a is equal to or less than 9.8 μm, the cut-off wavelength can be set to equal to or less than 1550 nm. When the core diameter 2a is equal to or less than 7.5 μm, it is possible to confirm that the cut-off wavelength can be set to equal to or less than 1260 nm compliant with the ITU-T G.652.

Figure 10:
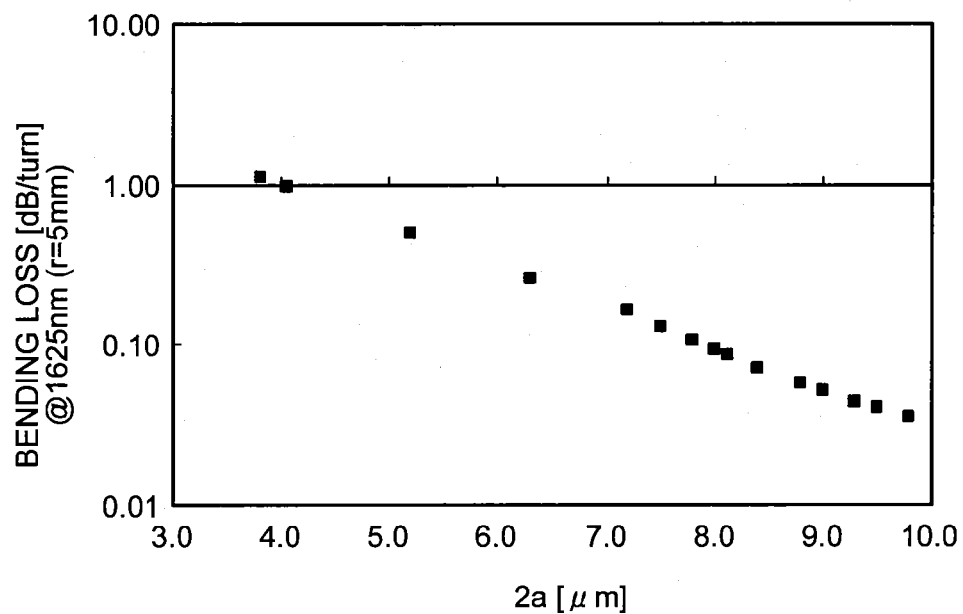
FIG. 10 is a view illustrating a relationship between the core diameter 2a and the bending loss.

FIG. 10 is a view illustrating a relationship between the core diameter 2a and the bending loss. As illustrated in FIG. 10, when the core diameter 2a is 4 μm, the bending loss is 1 dB/turn. Therefore, when the core diameter 2a is set to equal to or more than 4 μm, the bending loss can be set to equal to or less than 1 dB/turn.

Figure 11:
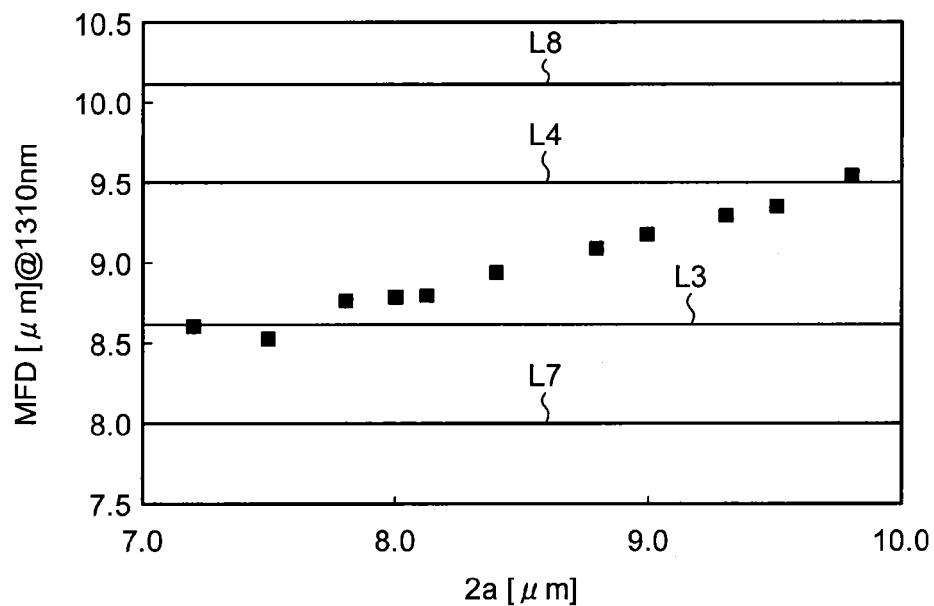
FIG. 11 is a view illustrating a relationship between the core diameter 2a and the MFD.

FIG. 11 is a view illustrating a relationship between the core diameter 2a and the MFD. Here, lines L3 and L4 indicate positions at which the MFDs are 8.6 μm and 9.5 μm, respectively. Furthermore, lines L7 and L8 indicate positions such that the MFDs are 8.0 μm and 10.1 μm, respectively. When data points illustrated in FIG. 11 are linearly approximated, it is possible to confirm that, when the core diameter 2a is in a range of 7.4 μm to 9.8 μm, the MFD can be set in a range of 8.6 μm to 9.5 μm, which is compliant with the ITU-T G.652.

Figure 12:
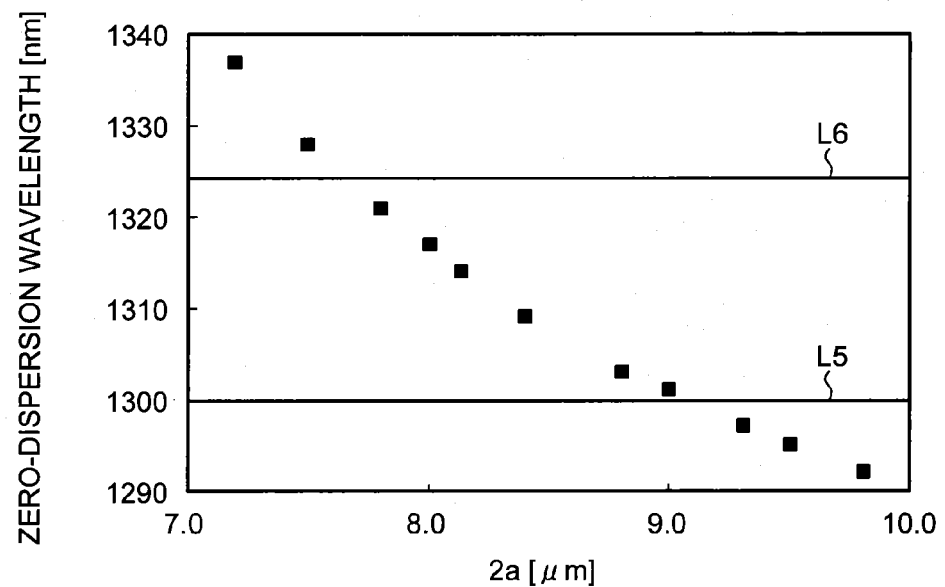
FIG. 12 is a view illustrating a relationship between the core diameter 2a and the zero-dispersion wavelength.

FIG. 12 is a view illustrating a relationship between the core diameter 2a and the zero-dispersion wavelength. Here, lines L5 and L6 indicate positions at which the zero-dispersion wavelengths are 1300 nm and 1324 nm, respectively. When data points illustrated in FIG. 12 are approximated by a quaternary polynomial, it is possible to confirm that, when the core diameter 2a is in a range of 7.4 μm to 9 μm, the zero-dispersion wavelength can be set in a range of 1300 nm to 1324 nm, which is compliant with the ITU-T G.652.

Next, the case that only the hole occupancy rate S is changed to 35.7%, and the other design parameters are as follows without change; that is, the inner cladding layer outside diameter 2b, the relative refractive index difference Δ1, and the relative refractive index difference Δ2 are fixedly set to 36 μm, 0.30%, and −0.05%, respectively, is explained.

Figure 13:
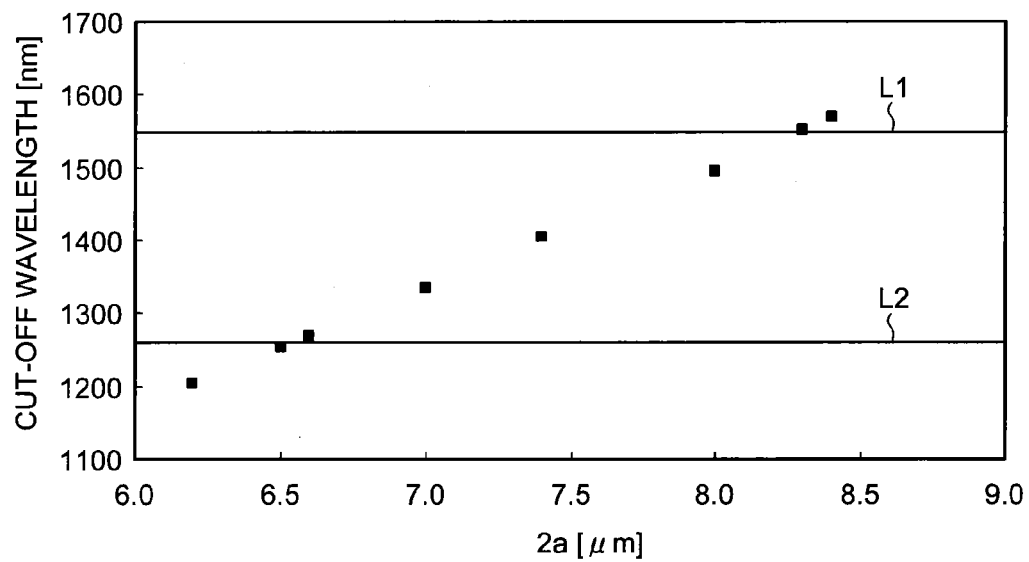
FIG. 13 is a view illustrating a relationship between the core diameter 2a and the cut-off wavelength.

FIG. 13 is a view illustrating a relationship between the core diameter 2a and the cut-off wavelength. Here, lines L1 and L2 indicate positions at which the cut-off wavelengths are 1550 nm and 1260 nm, respectively. As illustrated in FIG. 13, it is possible to confirm that, when the core diameter 2a is equal to or less than 8.3 μm, the cut-off wavelength can be set to equal to or less than 1550 nm, and When the core diameter 2a is equal to or less than 6.5 μm, the cut-off wavelength can be set to equal to or less than 1260 nm, which is compliant with the ITU-T G.652.

Figure 14:
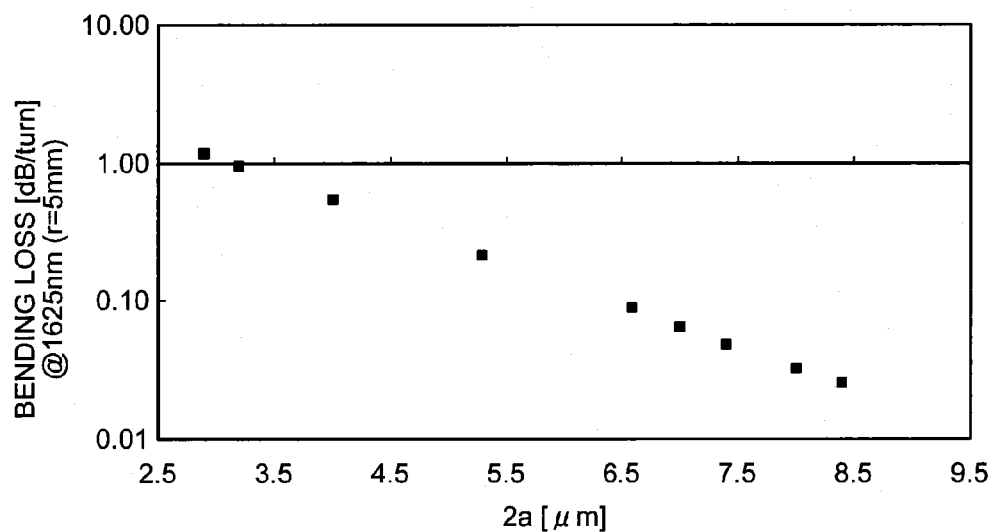
FIG. 14 is a view illustrating a relationship between the core diameter 2a and the macrobendng loss.

FIG. 14 is a view illustrating a relationship between the core diameter 2a and the macrobendng loss. As illustrated in FIG. 14, when the core diameter 2a is 3 μm, the bending loss is 1 dB/turn. Therefore, when the core diameter 2a is set to equal to or more than 3 μm, the bending loss can be set to equal to or less than 1 dB/turn.

Figure 15:
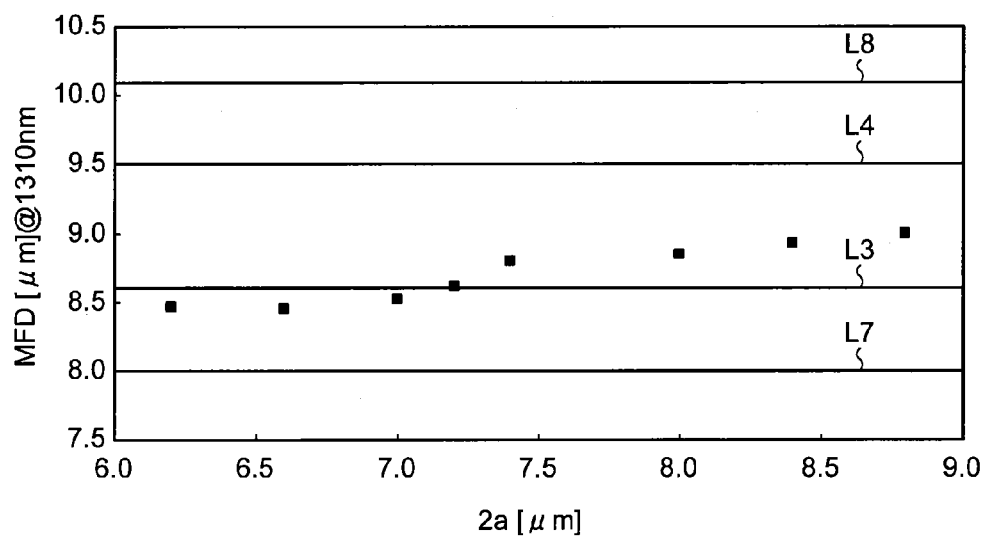
FIG. 15 is a view illustrating a relationship between the core diameter 2a and the MFD.

FIG. 15 is a view illustrating a relationship between the core diameter 2a and the MFD. Here, lines L3 and L4 indicate positions at which the MFDs are 8.6 μm and 9.5 μm, respectively. Furthermore, lines L7 and L8 indicate positions such that the MFDs are 8.0 μm and 10.1 μm, respectively. When data points illustrated in FIG. 15 are linearly approximated to be extrapolated, it is possible to confirm that, when the core diameter 2a is equal to or more than 7.2 μm, the MFD can be set in a range of 8.6 μm to 9.5 μm, which is compliant with the ITU-T G.652.

Figure 16:
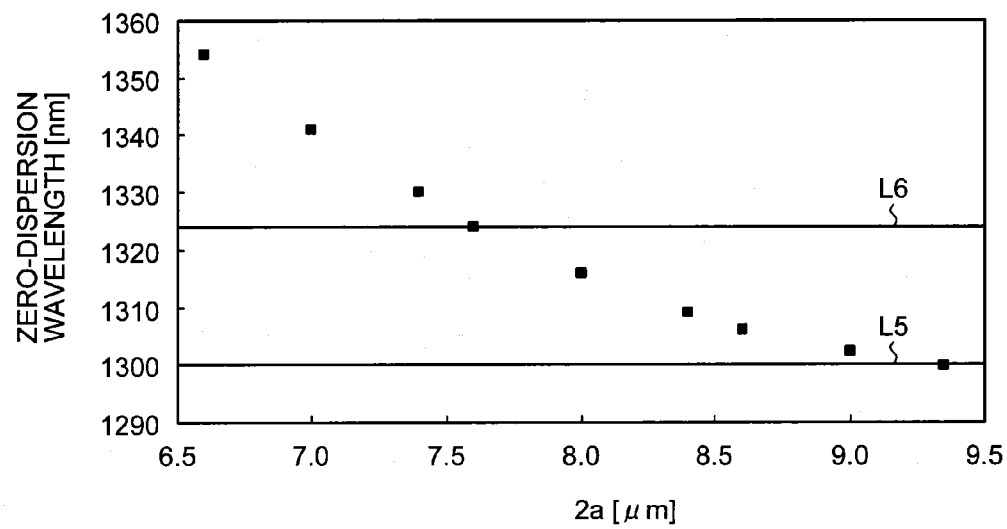
FIG. 16 is a view illustrating a relationship between the core diameter 2a and the zero-dispersion wavelength.

FIG. 16 is a view illustrating a relationship between the core diameter 2a and the zero-dispersion wavelength. Here, lines L5 and L6 indicate positions at which the zero-dispersion wavelengths are 1300 nm and 1324 nm, respectively. As illustrated in FIG. 16, it is possible to confirm that, when the core diameter 2a is in a range of 7.6 μm to 9.0 μm, the zero-dispersion wavelength can be set in a range of 1300 nm to 1324 nm, which is compliant with the ITU-T G.652.

Relationship between relative refractive index difference Δ1 and optical properties Next, relationships between the relative refractive index difference Δ1 and optical properties are explained. Here, with respect to the other design parameters, the hole occupancy rate S is fixedly set to 30.1%, the core diameter 2a is fixedly set to 8 μm, the inner cladding layer outside diameter 2b is fixedly set to 36 μm, and the relative refractive index difference Δ2 is fixedly set to −0.05%.

Figure 17:
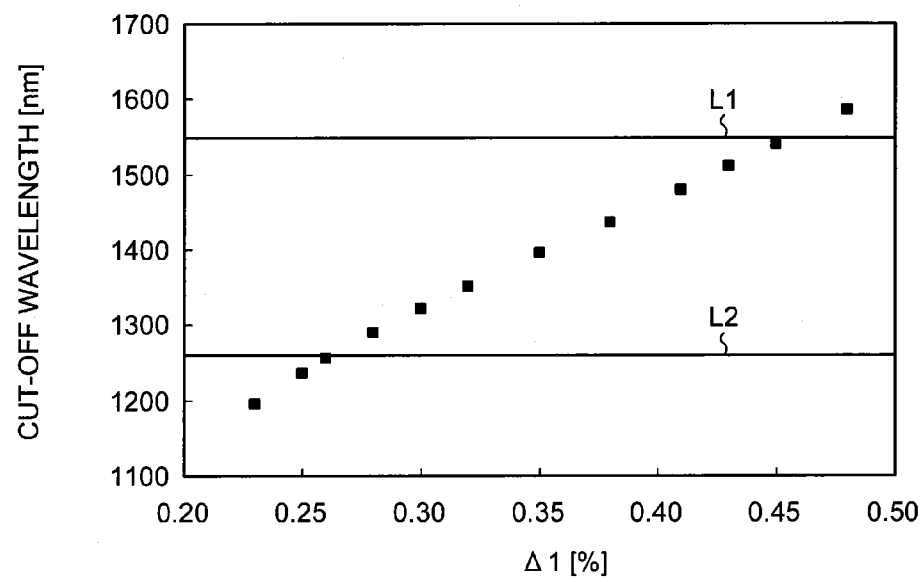
FIG. 17 is a view illustrating a relationship between a relative refractive index difference Δ1 and the cut-off wavelength.

FIG. 17 is a view illustrating a relationship between the relative refractive index difference Δ1 and the cut-off wavelength. Here, lines L1 and L2 indicate positions at which the cut-off wavelengths are 1550 nm and 1260 nm, respectively. As illustrated in FIG. 17, it is possible to confirm that, when the relative refractive index difference Δ1 is equal to or less than 0.45%, the cut-off wavelength can be set to equal to or less than 1550 nm, and when the relative refractive index difference Δ1 is equal to or less than 0.26%, the cut-off wavelength can be set to equal to or less than 1260 nm, which is compliant with the ITU-T G.652.

Figure 18:
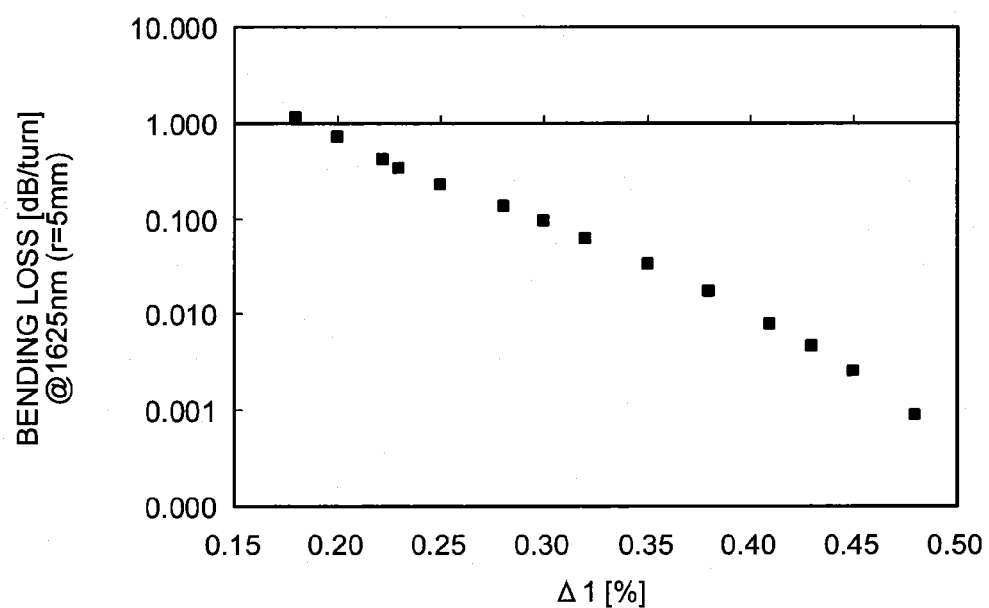
FIG. 18 is a view illustrating a relationship between the relative refractive index difference Δ1 and the bending loss.

FIG. 18 is a view illustrating a relationship between the relative refractive index difference Δ1 and the bending loss. As illustrated in FIG. 18, when the relative refractive index difference Δ1 is 0.19%, the bending loss becomes 1 dB/turn. Therefore, when the relative refractive index difference Δ1 is set to equal to or more than 0.19%, the bending loss can be set to equal to or less than 1 dB/turn.

Figure 19:
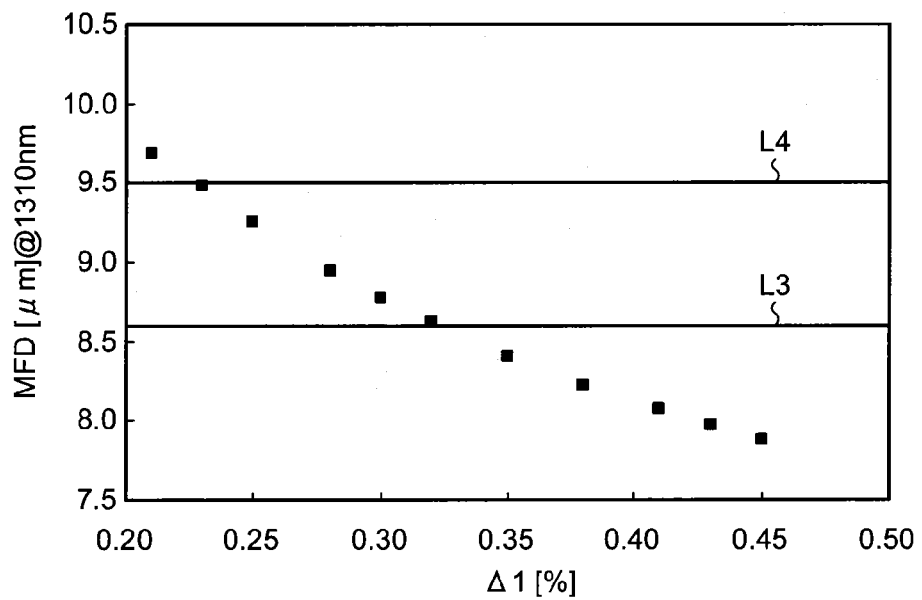
FIG. 19 is a view illustrating a relationship between the relative refractive index difference Δ1 and the MFD.

FIG. 19 is a view illustrating a relationship between the relative refractive index difference Δ1 and the MFD. Here, lines L3 and L4 indicate positions at which the MFDs are 8.6 μm and 9.5 μm, respectively. As illustrated in FIG. 19, it is possible to confirm that, when the relative refractive index difference Δ1 is in a range of 0.23% to 0.32%, the MFD can be set in a range of 8.6 μm to 9.5 μm, which is compliant with the ITU-T G.652.

Figure 20:
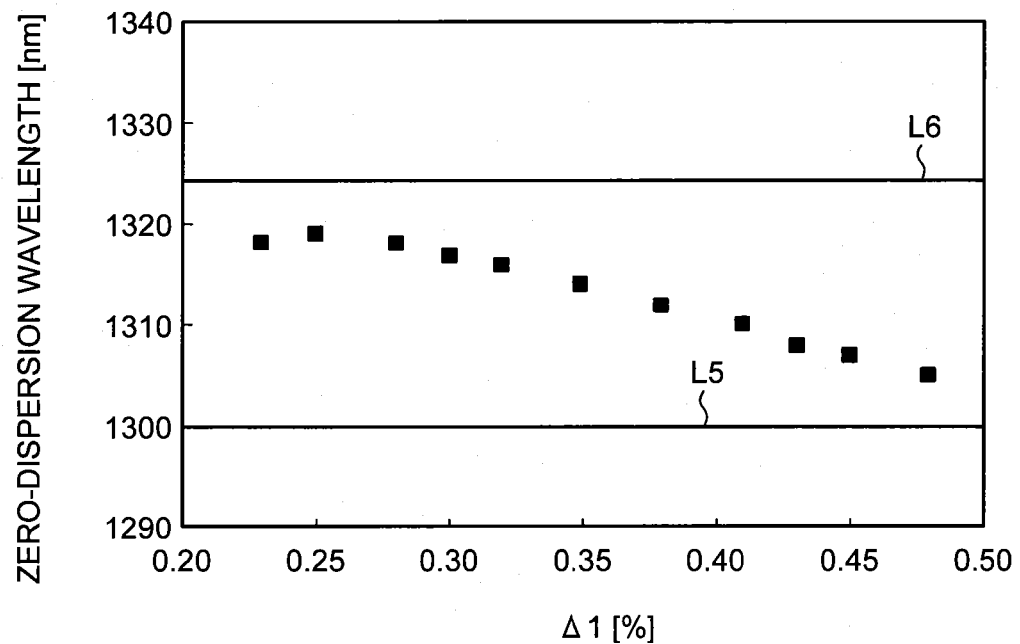
FIG. 20 is a view illustrating a relationship between the relative refractive index difference Δ1 and the zero-dispersion wavelength.

FIG. 20 is a view illustrating a relationship between the relative refractive index difference Δ1 and the zero-dispersion wavelength. Here, lines L5 and L6 indicate positions at which the zero-dispersion wavelengths are 1300 nm and 1324 nm, respectively. When data points illustrated in FIG. 20 are approximated by a quaternary polynomial, it is possible to confirm that, when the relative refractive index difference Δ1 is equal to or less than 0.6%, the zero-dispersion wavelength can be set in a range of 1300 nm to 1324 nm, which is compliant with the ITU-T G.652.

Next, the case that only the hole occupancy rate S is changed to 35.7% and the other design parameters, which are the core diameter 2a, the inner cladding layer outside diameter 2b, and the relative refractive index difference Δ2, are fixedly set to 8 μm, 36 μm, and −0.05%, respectively, without change is explained.

Figure 21:
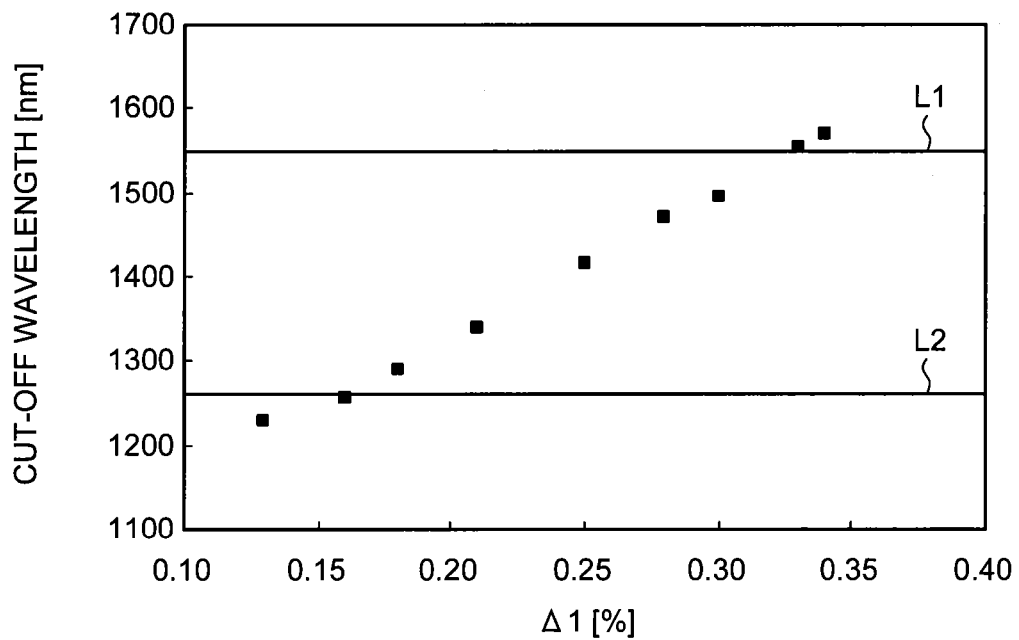
FIG. 21 is a view illustrating a relationship between the relative refractive index difference Δ1 and the cut-off wavelength.

FIG. 21 is a view illustrating a relationship between the relative refractive index difference Δ1 and the cut-off wavelength. Here, lines L1 and L2 indicate positions at which the cut-off wavelengths are 1550 nm and 1260 nm, respectively. As illustrated in FIG. 21, it is possible to confirm that, when the relative refractive index difference Δ1 is equal to or less than 0.33%, the cut-off wavelength can be set to equal to or less than 1550 nm, and when the relative refractive index difference Δ1 is equal to or less than 0.16%, the cut-off wavelength can be set to equal to or less than 1260 nm, which is compliant with the ITU-T G.652.

Figure 22:
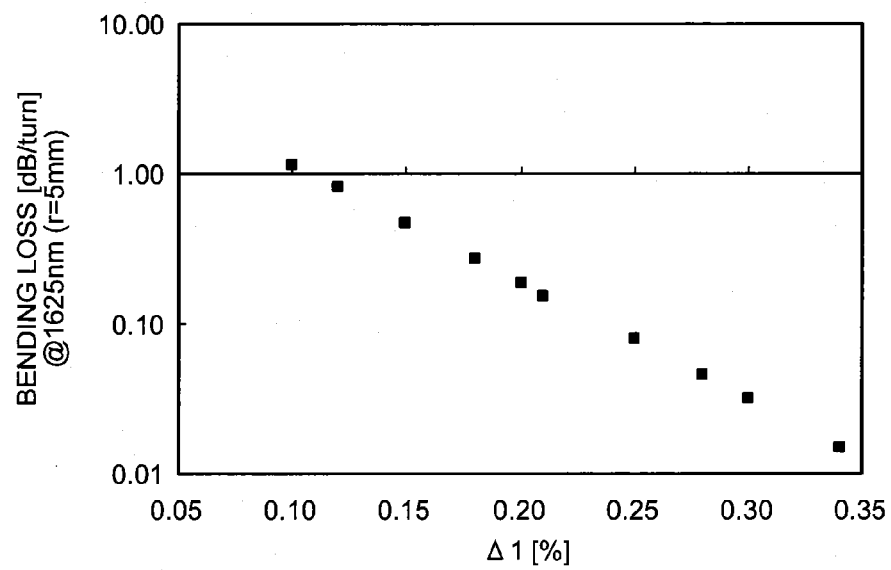
FIG. 22 is a view illustrating a relationship between the relative refractive index difference Δ1 and the bending loss.

FIG. 22 is a view illustrating a relationship between the relative refractive index difference Δ1 and the bending loss. As illustrated in FIG. 22, when the relative refractive index difference Δ1 is 0.11%, the bending loss is 1 dB/turn. Therefore, when the relative refractive index difference Δ1 is set to equal to or more than 0.11%, the bending loss can be set to equal to or less than 1 dB/turn.

Figure 23:
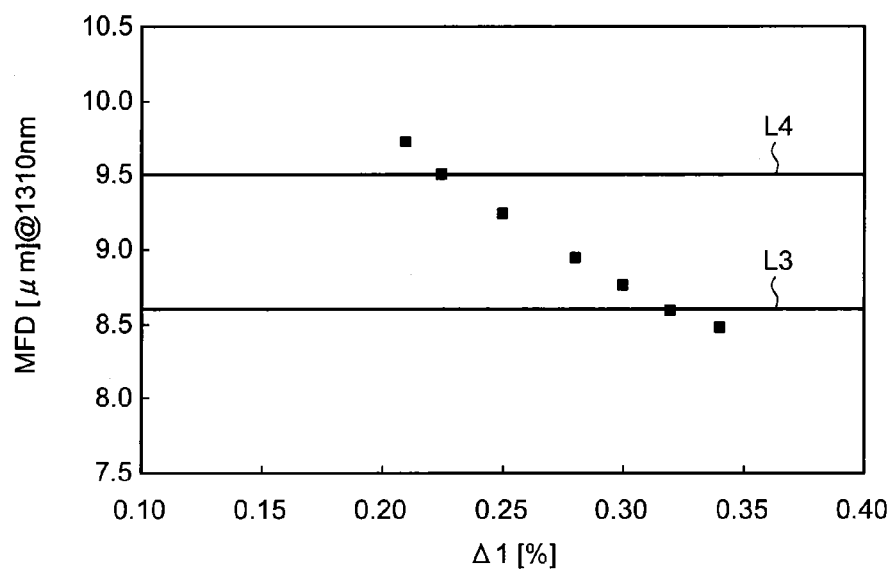
FIG. 23 is a view illustrating a relationship between the relative refractive index difference Δ1 and the MFD.

FIG. 23 is a view illustrating a relationship between the relative refractive index difference Δ1 and the MFD. Here, lines L3 and L4 indicate positions at which the MFDs are 8.6 μm and 9.5 μm, respectively. When data points illustrated in FIG. 23 are linearly approximated, it is possible to confirm that, when the relative refractive index difference Δ1 is in a range of 0.23% to 0.32%, the MFD can be set in a range of 8.6 μm to 9.5 μm, which is compliant with the ITU-T G.652.

Figure 24:
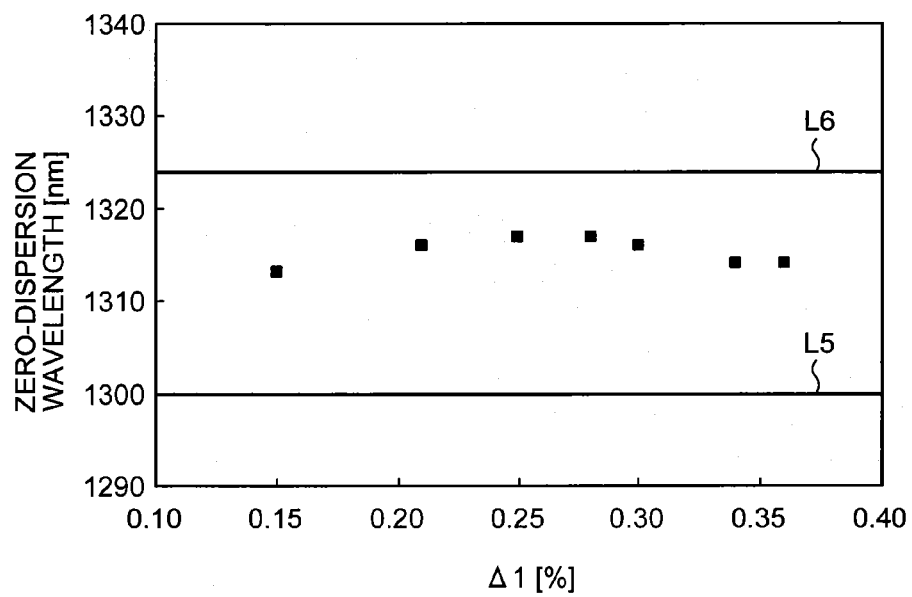
FIG. 24 is a view illustrating a relationship between the relative refractive index difference Δ1 and the zero-dispersion wavelength.

FIG. 24 is a view illustrating a relationship between the relative refractive index difference Δ1 and the zero-dispersion wavelength. Here, lines L5 and L6 indicate positions at which the zero-dispersion wavelengths are 1300 nm and 1324 nm, respectively. As illustrated in FIG. 24, the zero-dispersion wavelength hardly depends on the relative refractive index difference Δ1 and hence, for example, the relative refractive index difference Δ1 is set to equal to or less than 45% and the zero-dispersion wavelength can be set in a range of 1300 nm to 1324 nm, which is compliant with the ITU-T G.652.

Relationship between relative refractive index difference Δ2 and optical properties Next, relationships between the relative refractive index difference Δ2 and optical properties are explained. Here, with respect to the other design parameters, the hole occupancy rate S is fixedly set to 35.7%, the core diameter 2a is fixedly set to 8 μm, the inner cladding layer outside diameter 2b is fixedly set to 36 μm, and the relative refractive index difference Δ1 is fixedly set to 0.30%.

Figure 25:
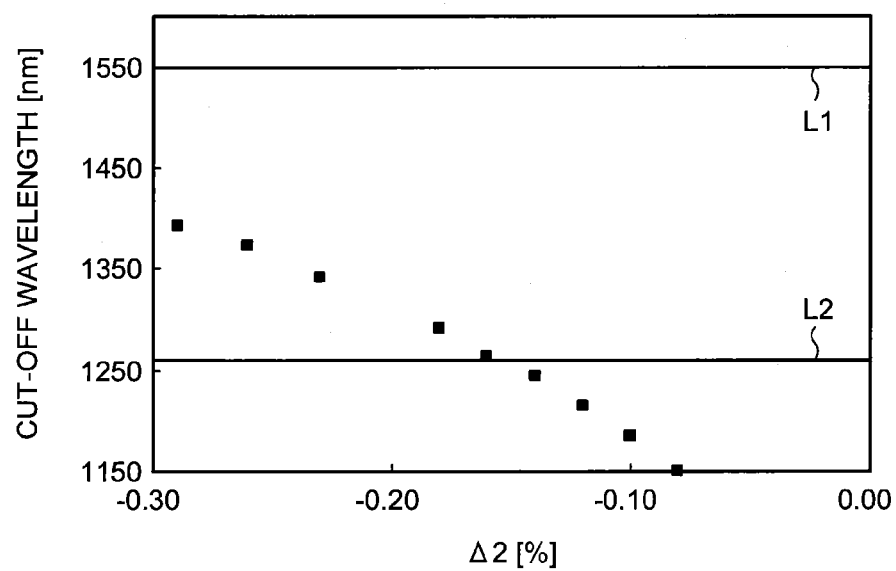
FIG. 25 is a view illustrating a relationship between a relative refractive index difference Δ2 and the cut-off wavelength.

FIG. 25 is a view illustrating a relationship between the relative refractive index difference Δ2 and the cut-off wavelength. Here, lines L1 and L2 indicate positions at which the cut-off wavelengths are 1550 nm and 1260 nm, respectively. As illustrated in FIG. 25, it is possible to confirm that, when the relative refractive index difference Δ2 is equal to or more than −0.3%, the cut-off wavelength can be set to equal to or less than 1550 nm, and when the relative refractive index difference Δ2 is equal to or more than −0.15%, the cut-off wavelength can be set to equal to or less than 1260 nm, which is compliant with the ITU-T G.652.

Figure 26:
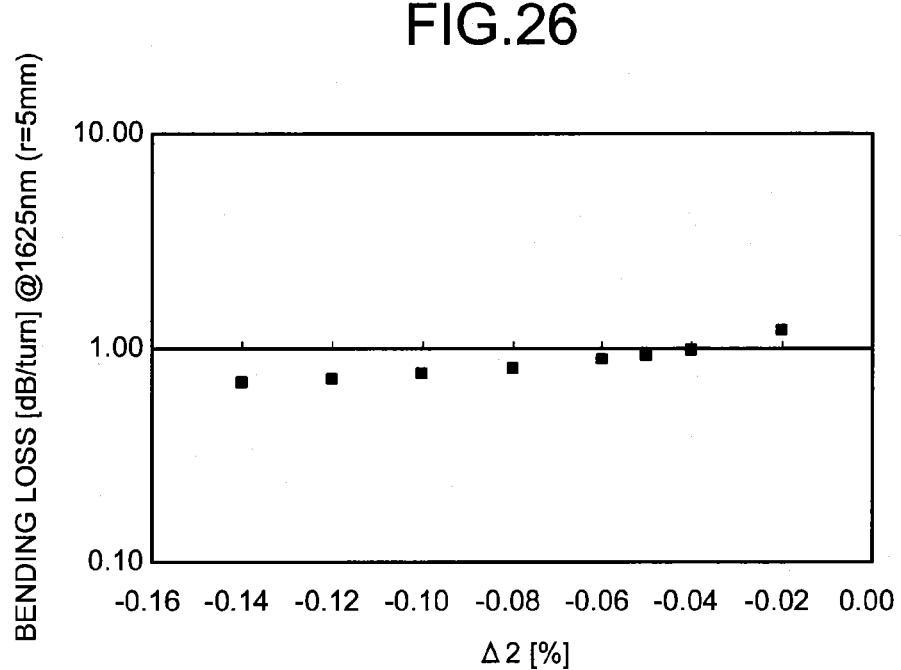
FIG. 26 is a view illustrating a relationship between the relative refractive index difference Δ2 and the bending loss.

FIG. 26 is a view illustrating a relationship between the relative refractive index difference Δ2 and the bending loss. As illustrated in FIG. 26, it is possible to confirm that, when the relative refractive index difference Δ2 is equal to or less than −0.04%, the bending loss can be set to equal to or less than 1 dB/turn.

Figure 27:
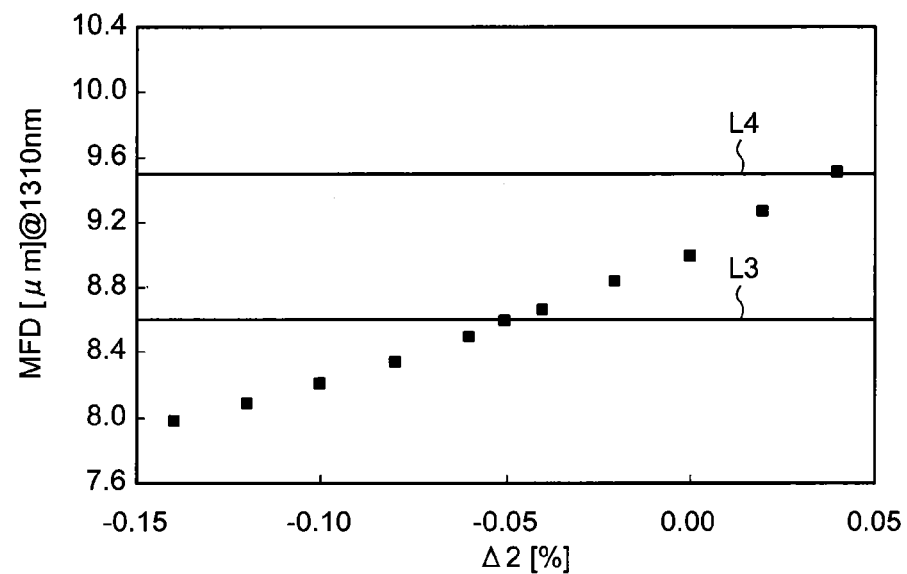
FIG. 27 is a view illustrating a relationship between the relative refractive index difference Δ2 and the MFD.

FIG. 27 is a view illustrating a relationship between the relative refractive index difference Δ2 and the MFD. Here, lines L3 and L4 indicate positions at which the MFDs are 8.6 μm and 9.5 μm, respectively. As illustrated in FIG. 27, it is possible to confirm that, when the relative refractive index difference Δ2 is in a range of −0.05% to 0.04%, the MFD can be set in a range of 8.6 μm to 9.5 μm, which is compliant with the ITU-T G.652.

Figure 28:
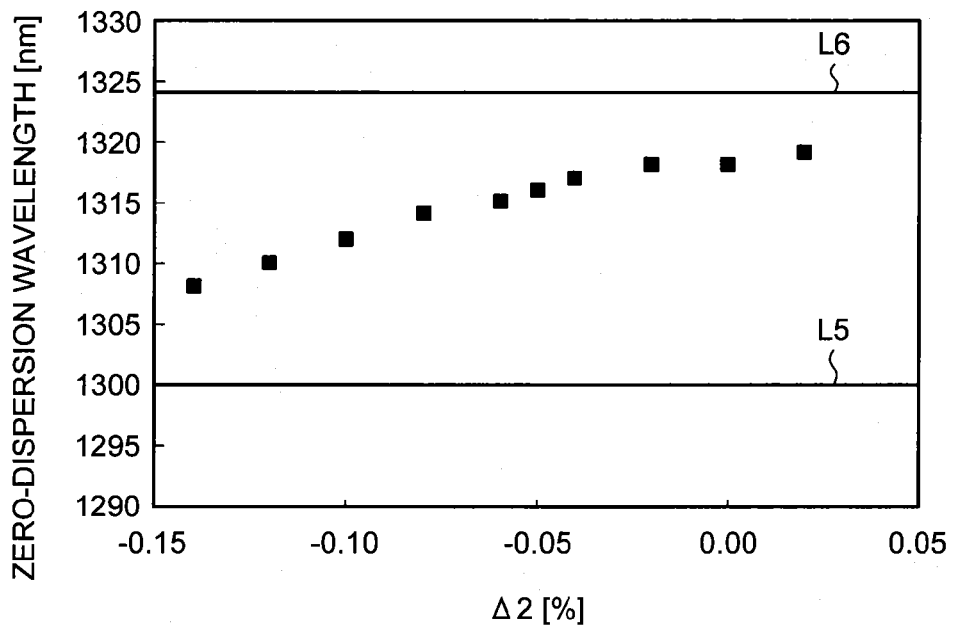
FIG. 28 is a view illustrating a relationship between the relative refractive index difference Δ2 and the zero-dispersion wavelength.

FIG. 28 is a view illustrating a relationship between the relative refractive index difference Δ2 and the zero-dispersion wavelength. Here, lines L5 and L6 indicate positions at which the zero-dispersion wavelengths are 1300 nm and 1324 nm, respectively. As illustrated in FIG. 28, it is possible to confirm that, when the relative refractive index difference Δ2 has a negative value equal to or more than −0.15%, the zero-dispersion wavelength can be set in a range of 1300 nm to 1324 nm, which is compliant with the ITU-T G.652.

Next, the case that only the hole occupancy rate S is changed to 35.7%, and the other design parameters are as follows without change; that is, the core diameter 2a, the inner cladding layer outside diameter 2b, and the relative refractive index difference Δ1 are fixedly set to 8 μm, 36 μm, and 0.30% respectively is explained.

Figure 29:
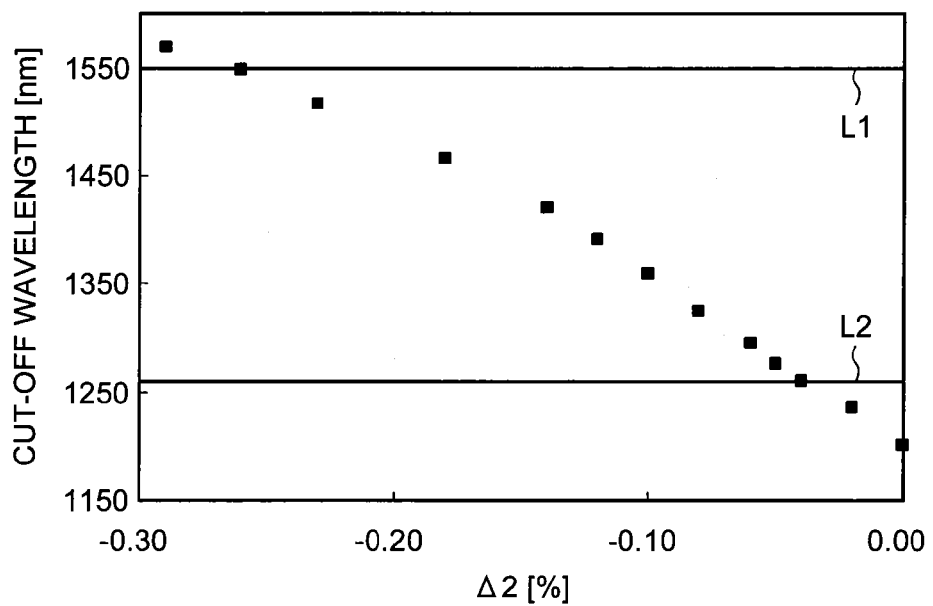
FIG. 29 is a view illustrating a relationship between the relative refractive index difference Δ2 and the cut-off wavelength.

FIG. 29 is a view illustrating a relationship between the relative refractive index difference Δ2 and the cut-off wavelength. Here, lines L1 and L2 indicate positions at which the cut-off wavelengths are 1550 nm and 1260 nm, respectively. As illustrated in FIG. 29, it is possible to confirm that, when the relative refractive index difference Δ2 is equal to or more than −0.26%, the cut-off wavelength can be set to equal to or less than 1550 nm, and when the relative refractive index difference Δ2 is equal to or more than −0.04%, the cut-off wavelength can be set to equal to or less than 1260 nm, which is compliant with the ITU-T G.652.

Figure 30:
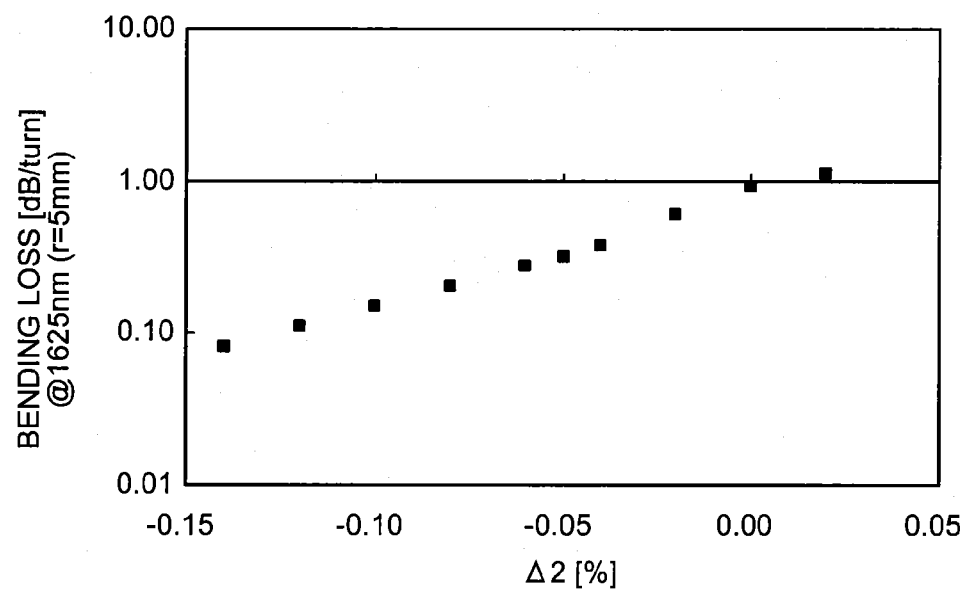
FIG. 30 is a view illustrating a relationship between the relative refractive index difference Δ2 and the bending loss.

FIG. 30 is a view illustrating a relationship between the relative refractive index difference Δ2 and the bending loss. As illustrated in FIG. 30, it is possible to confirm that, when the relative refractive index difference Δ2 is equal to or less than 0%, the bending loss can be set to equal to or less than 1 dB/turn.

Figure 31:
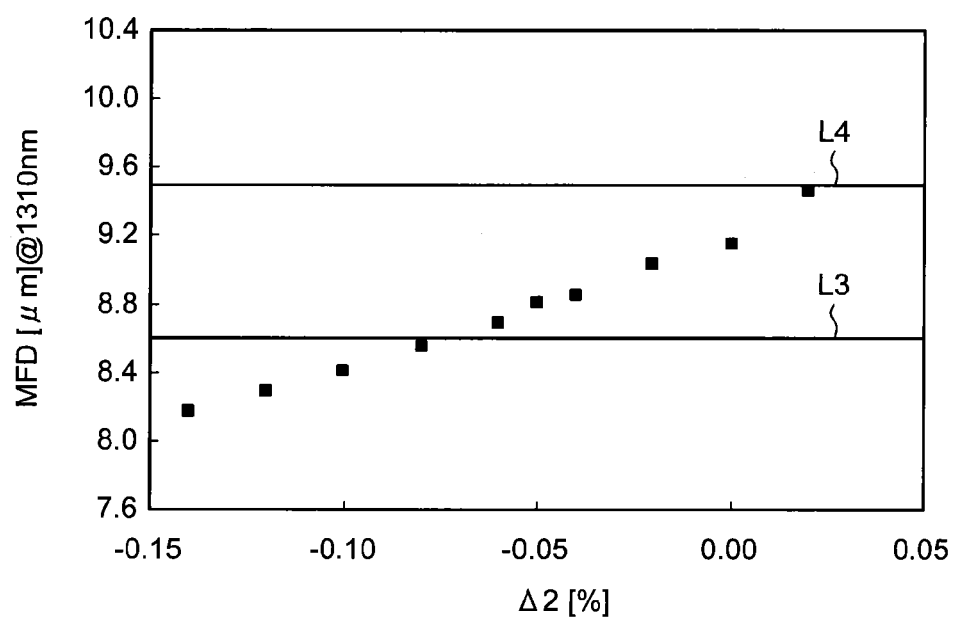
FIG. 31 is a view illustrating a relationship between the relative refractive index difference Δ2 and the MFD.

FIG. 31 is a view illustrating a relationship between the relative refractive index difference Δ2 and the MFD. Here, lines L3 and L4 indicate positions at which the MFDs are 8.6 μm and 9.5 μm, respectively. As illustrated in FIG. 31, it is possible to confirm that, when the relative refractive index difference Δ2 is in a range of −0.07% 0.02%, the MFD can be set in a range of 8.6 μm to 9.5 μm, which is compliant with the ITU-T G.652.

Figure 32:
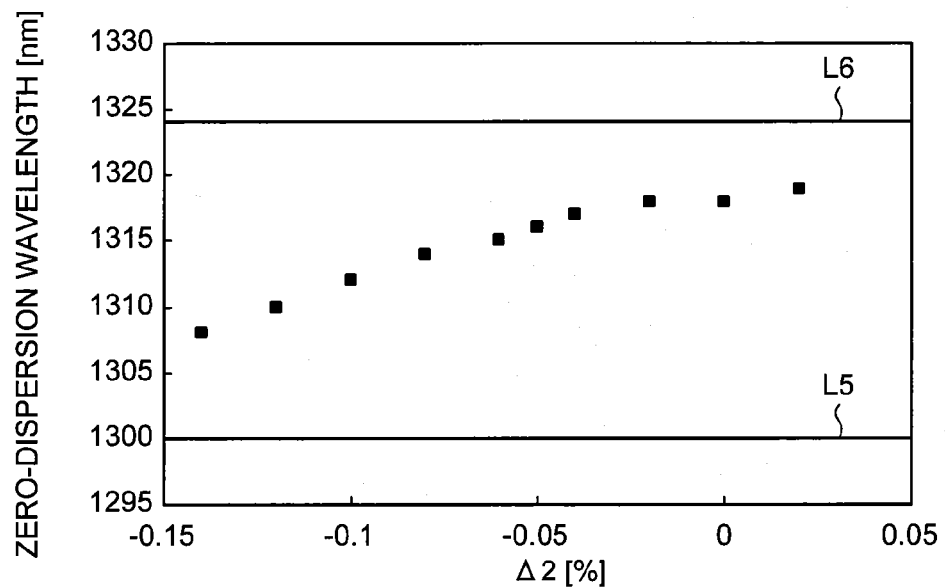
FIG. 32 is a view illustrating a relationship between the relative refractive index difference Δ2 and the zero-dispersion wavelength.

FIG. 32 is a view illustrating a relationship between the relative refractive index difference Δ2 and the zero-dispersion wavelength. Here, lines L5 and L6 indicate positions at which the zero-dispersion wavelengths are 1300 nm and 1324 nm, respectively. As illustrated in FIG. 32, it is possible to confirm that, when the relative refractive index difference Δ2 has a negative value equal to or more than −0.15%, the zero-dispersion wavelength can be set in a range of 1300 nm to 1324 nm, which is compliant with the ITU-T G.652.

Relationship between inner cladding layer outside diameter 2b and optical properties Next, relationships between the inner cladding layer outside diameter 2b and optical properties are explained. Here, with respect to the other design parameters, the hole occupancy rate S is set to 30.1%, 35.7%, 39.9%, or 44.2%, the core diameter 2a is set to 7 μm, 8 μm, or 9 μm, the relative refractive index difference Δ1 is set to 0.30%, and the relative refractive index difference Δ2 is set to −0.05%.

Figure 33:
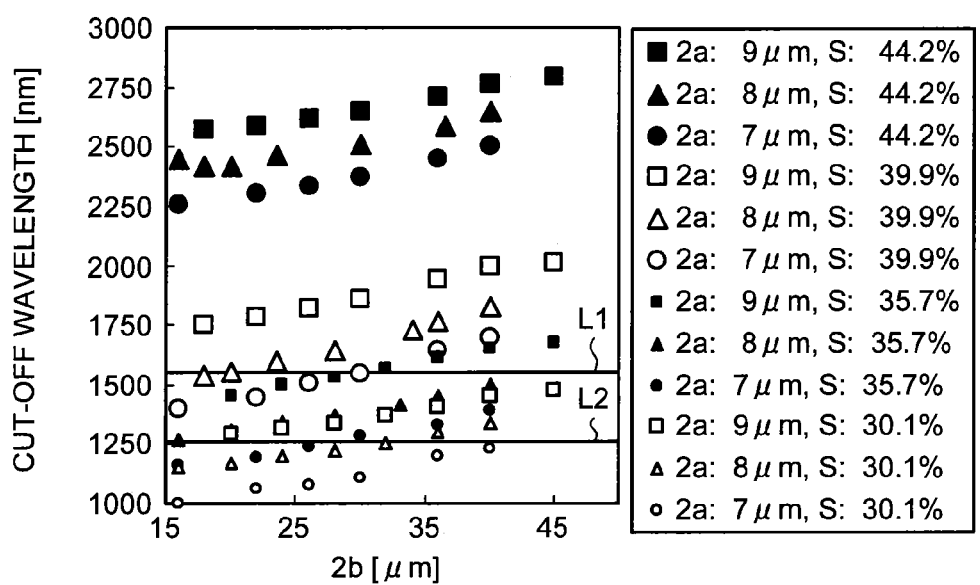
FIG. 33 is a view illustrating a relationship between the inner cladding layer outside diameter 2b and the cut-off wavelength.

FIG. 33 is a view illustrating a relationship between the inner cladding layer outside diameter 2b and the cut-off wavelength. Here, lines L1 and L2 indicate positions at which the cut-off wavelengths are 1550 nm and 1260 nm, respectively. As illustrated in FIG. 33, the cut-off wavelength becomes larger along with the increases of the hole occupancy rate S, the core diameter 2a, and the inner cladding layer outside diameter 2b. Furthermore, if data points illustrated in FIG. 33 are approximated by a quadratic polynomial to be extrapolated, when the hole occupancy rate S is 30.1% and the core diameter 2a is 8 μm, it is possible to confirm that, when the inner cladding layer outside diameter 2b is in a range of 8 μm that is the core diameter 2a to 50 μm, the cut-off wavelength can be set to equal to or less than 1550 nm, and when the inner cladding layer outside diameter 2b is equal to or less than 32 μm, the cut-off wavelength can be set to equal to or less than 1260 nm, which is compliant with the ITU-T G.652. Furthermore, when the hole occupancy rate S is 35.7% and the core diameter 2a is 8 μm, it is possible to confirm that, when the inner cladding layer outside diameter 2b is in a range of 8 μm to 42 μm, the cut-off wavelength can be set to equal to or less than 1550 nm, and when the inner cladding layer outside diameter 2b is equal to or less than 10 μm, the cut-off wavelength can be set to equal to or less than 1260 nm.

Figure 34:
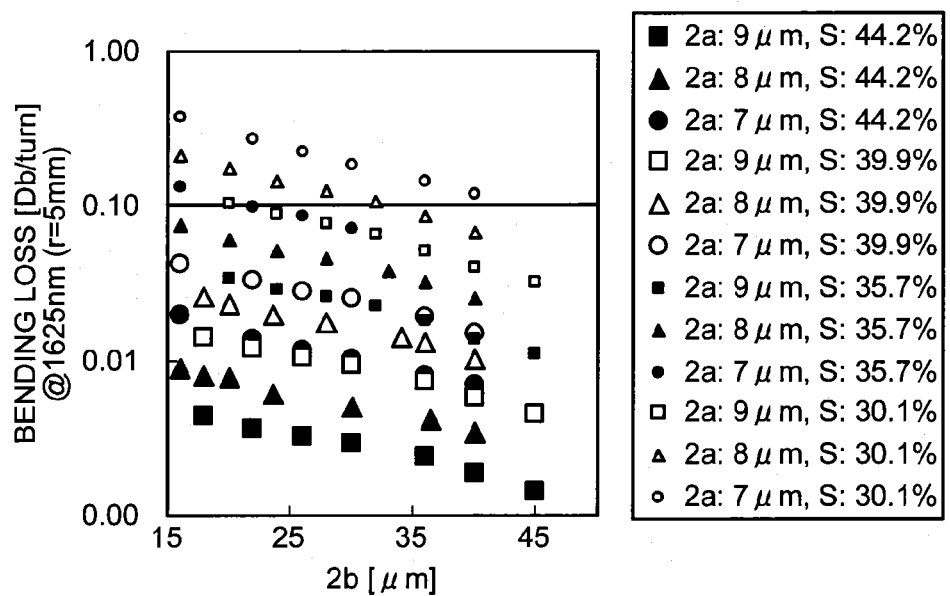
FIG. 34 is a view illustrating a relationship between the inner cladding layer outside diameter 2b and the bending loss.

FIG. 34 is a view illustrating a relationship between the inner cladding layer outside diameter 2b and the bending loss. As illustrated in FIG. 34, the bending loss becomes lower along with the increases of the hole occupancy rate S, the core diameter 2a, and the inner cladding layer outside diameter 2b. Furthermore, when data points illustrated in FIG. 34 are approximated by an exponential curve to be extrapolated, in each case where the hole occupancy rate S is 30.1% or 35.7%, it is possible to confirm that, when the inner cladding layer outside diameter 2b is equal to or more than 8 μm, the bending loss can be set to equal to or less than 1 dB/turn.

Figure 35:
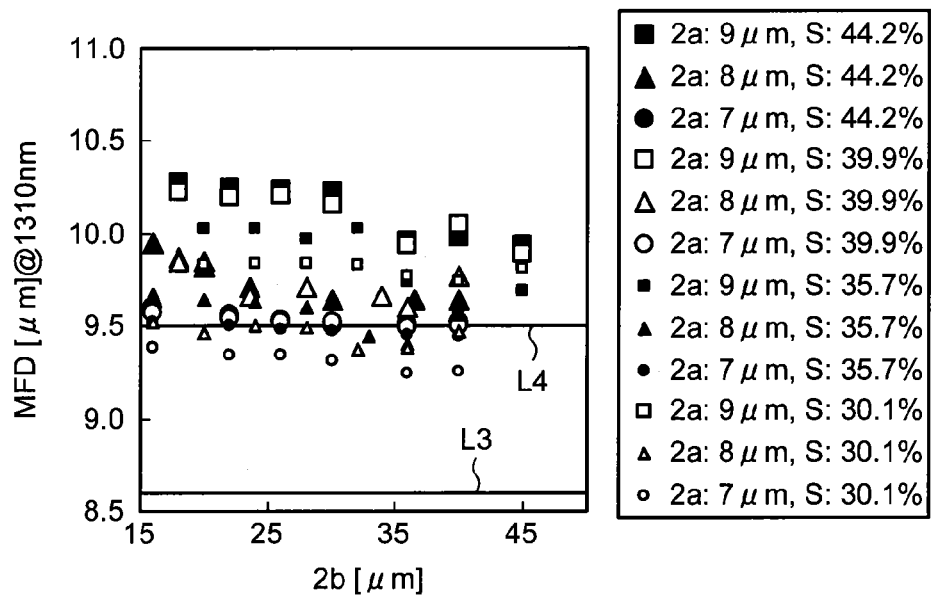
FIG. 35 is a view illustrating a relationship between the inner cladding layer outside diameter 2b and the MFD.

FIG. 35 is a view illustrating a relationship between the inner cladding layer outside diameter 2b and the MFD. Here, lines L3 and L4 indicate positions at which the MFDs are 8.6 μm and 9.5 μm. As illustrated in FIG. 35, the MFD hardly depends on the inner cladding layer outside diameter 2b. Furthermore, for example, when the hole occupancy rate S is 30.1%, it is possible to confirm that, when the inner cladding layer outside diameter 2b has a value ranging from 20 μm to 40 μm, the MFD can be set in a range of 8.6 μm to 9.5 μm, which is compliant with the ITU-T G.652.

Figure 36:
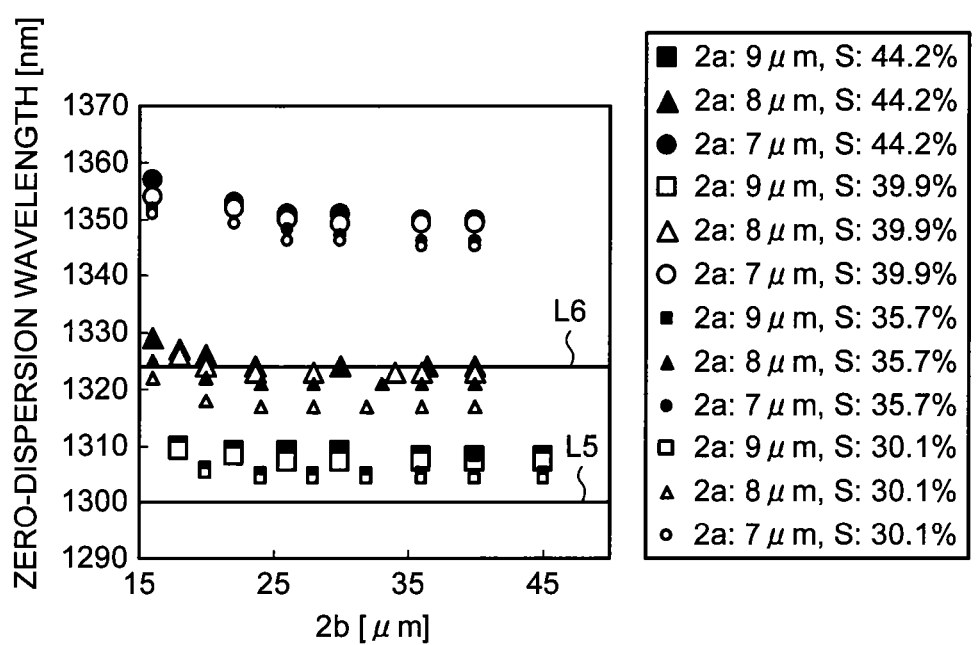
FIG. 36 is a view illustrating a relationship between the inner cladding layer outside diameter 2b and the zero-dispersion wavelength.

FIG. 36 is a view illustrating a relationship between the inner cladding layer outside diameter 2b and the zero-dispersion wavelength. Here, lines L5 and L6 indicate positions at which the zero-dispersion wavelengths are 1300 nm and 1324 nm, respectively. As illustrated in FIG. 36, the zero-dispersion wavelength hardly depends on the inner cladding layer outside diameter 2b. For example, when the hole occupancy rate S is 39.9% and the core diameter 2a is 9 μm, it is possible to confirm that, when the inner cladding layer outside diameter 2b is larger than 9 μm and not more than 50 μm, the zero-dispersion wavelength can be set in a range of 1300 nm to 1324 nm, which is compliant with the ITU-T G.652.

Relationship among hole diameter d, core diameter 2a, and optical properties

Next, a relationship between a hole diameter d, a core diameter 2a, and optical properties is explained. Hereinafter, first, under the condition that a hole occupancy rate S and the hole diameter d are fixedly set to specific values, the range of the core diameter 2a that satisfies desired optical properties is explained. Next, under the condition that the hole occupancy rate S and the core diameter 2a are fixedly set to specific values, the range of the hole diameter d that satisfies desired optical properties is explained. Here, with respect to the other design parameters, the core diameter 2a, the inner cladding layer outside diameter 2b, the relative refractive index difference Δ1, and the relative refractive index difference Δ2 are fixedly set to 8 μm, 36 μm, 0.30%, and −0.05%, respectively.

Figure 37A:
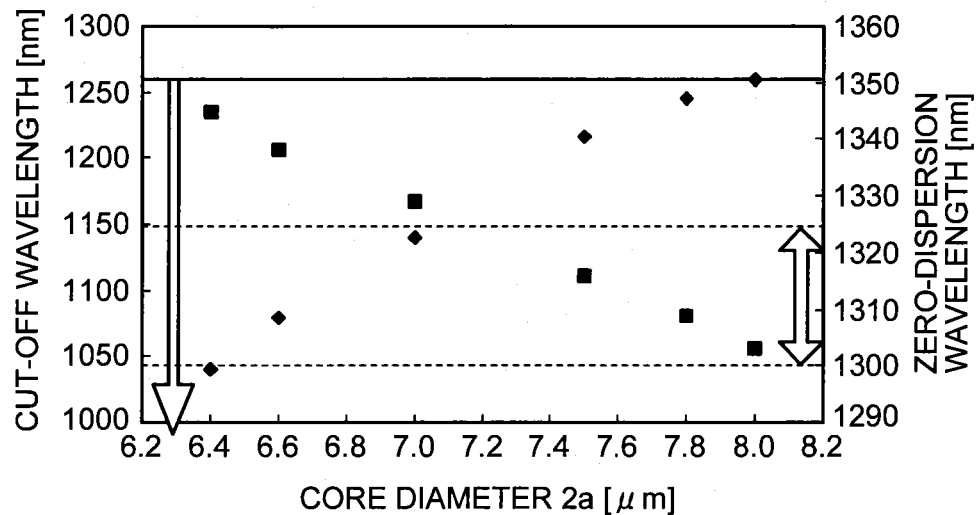
FIG. 37A is a view illustrating a relationship between the core diameter 2a and optical properties when the hole occupancy rate S is 30.1% and a hole diameter d is 2.9 μm.
Figure 37B:
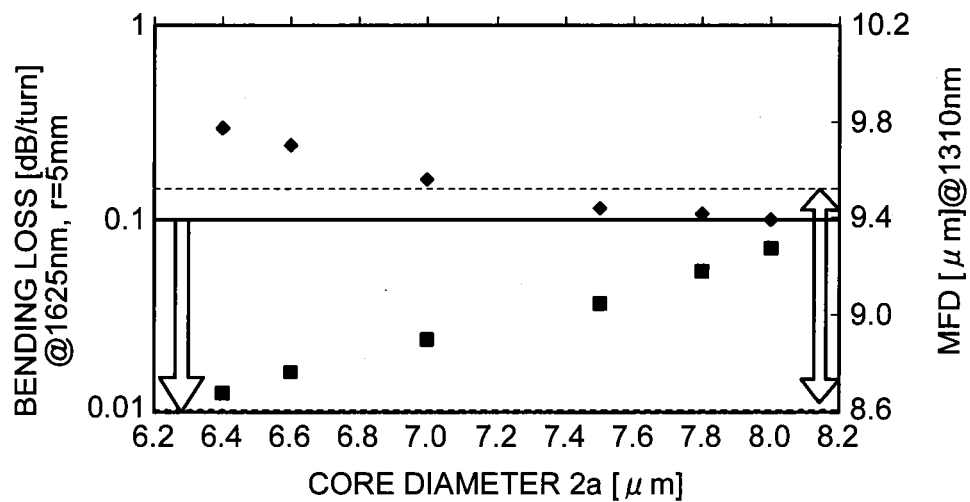
FIG. 37B is a view illustrating a relationship between the core diameter 2a and optical properties when the hole occupancy rate S is 30.1% and the hole diameter d is 2.9 μm.

First of all, the hole occupancy rate S is set to 30.1%. FIGS. 37A and 37B are views each illustrating a relationship between the core diameter 2a and the optical properties when the hole occupancy rate S is 30.1% and the hole diameter d is 2.9 μm. Here, FIG. 37A illustrates a cut-off wavelength and a zero-dispersion wavelength, a square symbol and a diamond symbol in the drawing indicate the zero-dispersion wavelength and the cut-off wavelength, respectively, and a continuous line and a dashed line in the drawing indicate a position at which the cut-off wavelength is 1260 nm and positions at which the zero-dispersion wavelengths are 1300 nm and 1324 nm, respectively. Furthermore, FIG. 37B illustrates a bending loss and an MFD, a black square symbol and a black diamond symbol in the drawing indicate the MFD and the bending loss, respectively, and a continuous line and a dashed line in the drawing indicate a position at which the bending loss is 0.1 dB/turn and positions at which the MFDs are 8.6 μm and 9.5 μm, respectively. Here, in FIG. 38A to FIG. 54A and FIG. 38B to FIG. 54B explained below also, a square symbol, a diamond symbol, a continuous line, and a dashed line each has the same meaning as above. As illustrated in FIGS. 37A and 37B, if the hole diameter d is 2.9 μm, when the core diameter 2a is in a range of 7.8 μm to 8.0 μm, a bending loss of equal to or less than 0.1 dB/turn, a cut-off wavelength of equal to or less than 1260 nm, an MFD of in a range of 8.6 μm to 9.5 μm at a wavelength of 1310 nm, and a zero-dispersion wavelength of in a range of 1300 nm to 1324 nm can be realized.

Figure 38A:
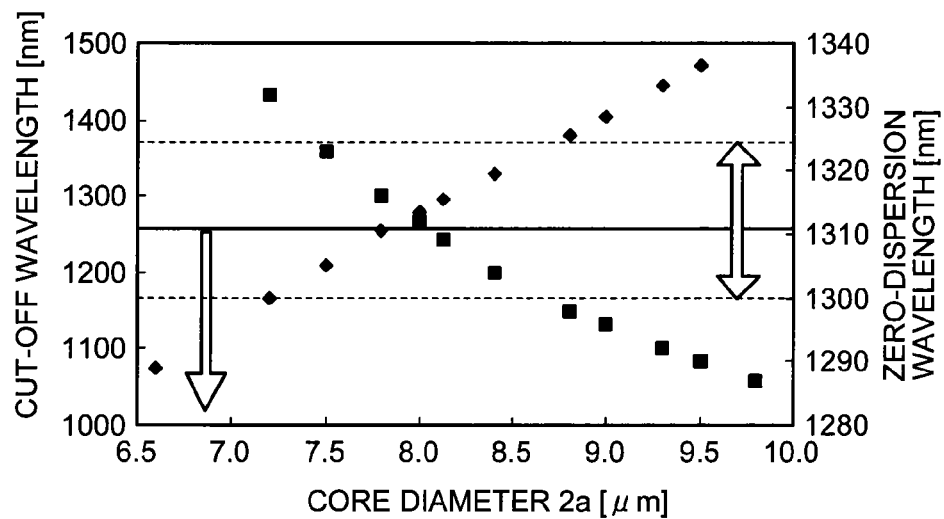
FIG. 38A is a view illustrating a relationship between the core diameter 2a and optical the properties when the hole occupancy rate S is 30.1% and the hole diameter d is 3.3 μm.
Figure 38B:
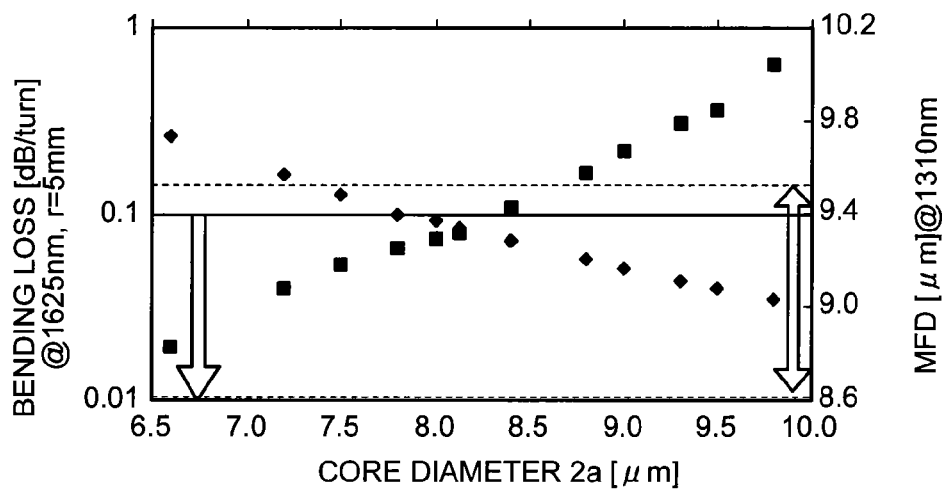
FIG. 38B is a view illustrating a relationship between the core diameter 2a and the optical properties when the hole occupancy rate S is 30.1% and the hole diameter d is 3.3 μm.

FIGS. 38A and 38B are views each illustrating a relationship between the core diameter 2a and the optical properties when the hole occupancy rate S is 30.1% and the hole diameter d is 3.3 μm. Here, FIG. 38A illustrates the cut-off wavelength and the zero-dispersion wavelength, and FIG. 38B illustrates the bending loss and the MFD. As illustrated in FIGS. 38A and 38B, if the hole diameter d is 3.3 μm, when the core diameter 2a is in a range of 7.8 μm to 8.4 μm, a bending loss of equal to or less than 0.1 dB/turn, a cut-off wavelength of equal to or less than 1260 nm, an MFD of in a range of 8.6 μm to 9.5 μm at a wavelength of 1310 nm, and a zero-dispersion wavelength of in a range of 1300 nm to 1324 nm can be realized.

Figure 39A:
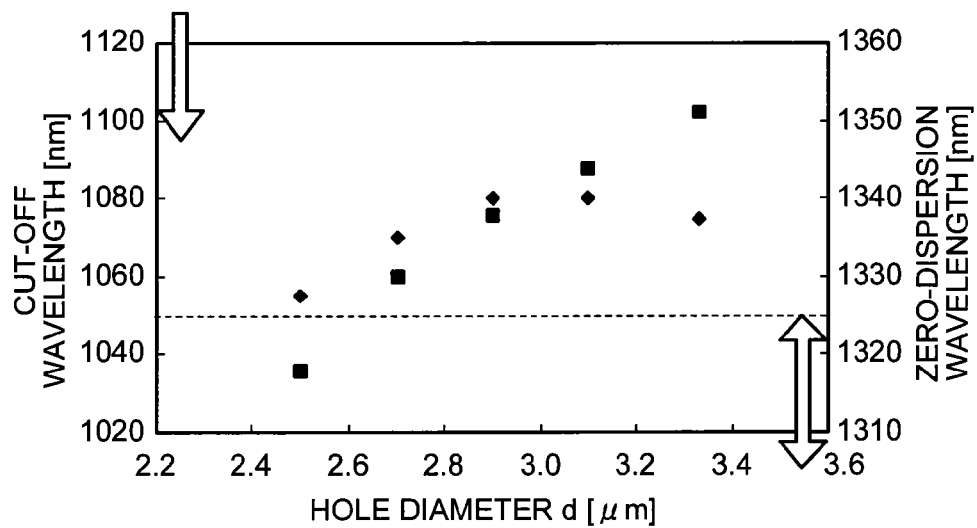
FIG. 39A is a view illustrating a relationship between the hole diameter d and the optical properties when the hole occupancy rate S is 30.1% and the core diameter 2a is 6.6 μm.
Figure 39B:
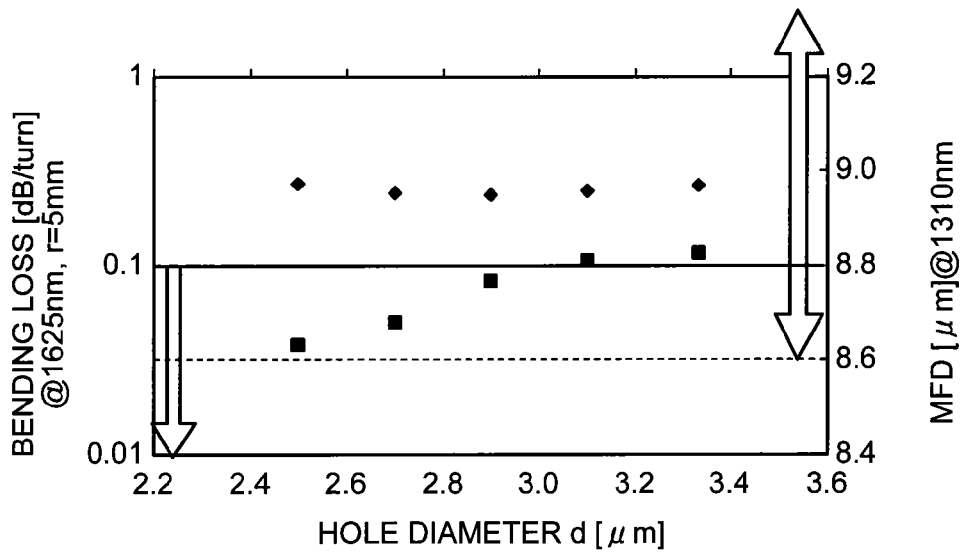
FIG. 39B is a view illustrating a relationship between the hole diameter d and the optical properties when the hole occupancy rate S is 30.1% and the core diameter 2a is 6.6 μm.

FIGS. 39A and 39B are views each illustrating a relationship between the hole diameter d and the optical properties when the hole occupancy rate S is 30.1% and the core diameter 2a is 6.6 μm. Here, FIG. 39A illustrates the cut-off wavelength and the zero-dispersion wavelength, and FIG. 39B illustrates the bending loss and the MFD. As illustrated in FIGS. 39A and 39B, when the core diameter 2a is 6.6 μm, there exists no range of the hole diameter d in which a bending loss of equal to or less than 0.1 dB/turn, a cut-off wavelength of equal to or less than 1260 nm, an MFD of in a range of 8.6 µm to 9.5 µm at a wavelength of 1310 nm, and a zero-dispersion wavelength of in a range of 1300 nm to 1324 nm can be realized.

Figure 40A:
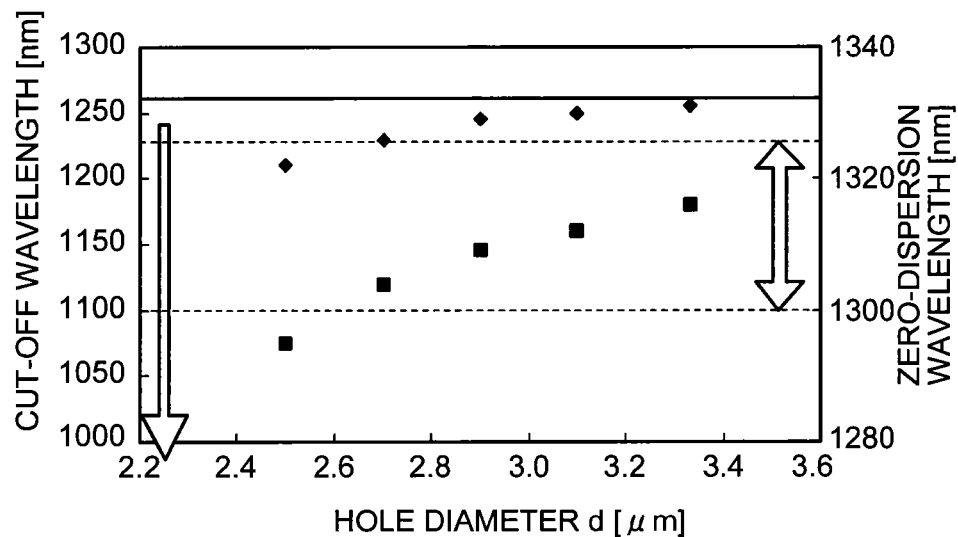
FIG. 40A is a view illustrating a relationship between the hole diameter d and the optical properties when the hole occupancy rate S is 30.1% and the core diameter 2a is 7.8 μm.
Figure 40B:
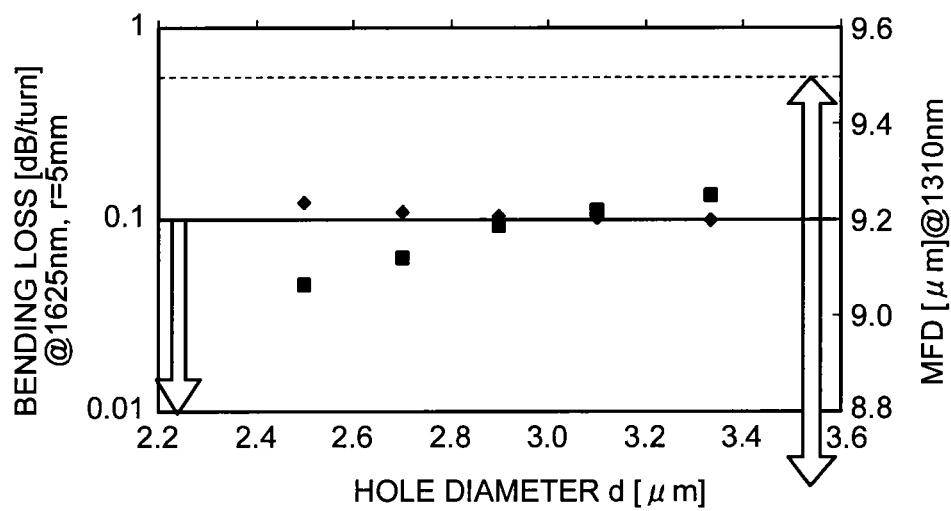
FIG. 40B is a view illustrating a relationship between the hole diameter d and the optical properties when the hole occupancy rate S is 30.1% and the core diameter 2a is 7.8 μm.

FIGS. 40A and 40B are views each illustrating a relationship between the hole diameter d and the optical properties when the hole occupancy rate S is 30.1% and the core diameter 2a is 7.8 µm. Here, FIG. 40A illustrates the cut-off wavelength and the zero-dispersion wavelength, and FIG. 40B illustrates the bending loss and the MFD. As illustrated in FIGS. 40A and 40B, if the core diameter 2a is 7.8 µm, when the hole diameter d is in a range of 2.9 µm to 3.4 µm, a bending loss of equal to or less than 0.1 dB/turn, a cut-off wavelength of equal to or less than 1260 nm, an MFD of in a range of 8.6 µm to 9.5 µm at a wavelength of 1310 nm, and a zero-dispersion wavelength of in a range of 1300 nm to 1324 nm can be realized.

As a result illustrated in FIGS. 37A and 37B to FIGS. 40A and 40B, if the hole occupancy rate S is 30.1%, when the core diameter 2a is in a range of 7.8 µm to 8.4 µm and the hole diameter d is in a range of 2.9 µm to 3.4 µm, a bending loss of equal to or less than 0.1 dB/turn, a cut-off wavelength of equal to or less than 1260 nm, an MFD of in a range of 8.6 µm to 9.5 µm at a wavelength of 1310 nm, and a zero-dispersion wavelength of in a range of 1300 nm to 1324 nm can be realized.

Figure 41A:
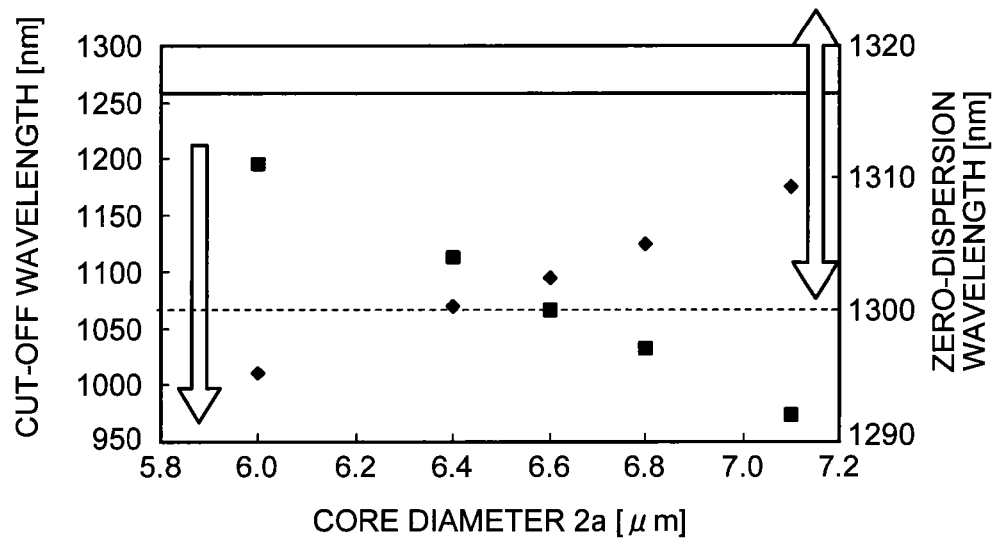
FIG. 41A is a view illustrating a relationship between the core diameter 2a and the optical properties when the hole occupancy rate S is 35.7% and the hole diameter d is 2.6 μm.
Figure 41B:
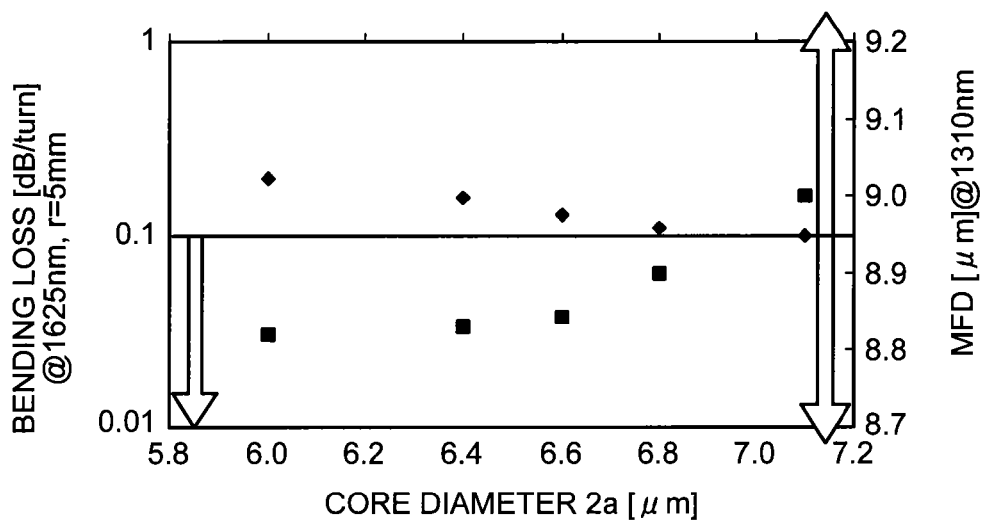
FIG. 41B is a view illustrating a relationship between the core diameter 2a and the optical properties when the hole occupancy rate S is 35.7% and the hole diameter d is 2.6 μm.

Next, the hole occupancy rate S is fixedly set to 35.7%. FIGS. 41A and 41B are views each illustrating a relationship between the core diameter 2a and the optical properties when the hole occupancy rate S is 35.7% and the hole diameter d is 2.6 µm. Here, FIG. 41A illustrates the cut-off wavelength and the zero-dispersion wavelength, and FIG. 41B illustrates the bending loss and the MFD. As illustrated in FIGS. 41A and 41B, when the hole diameter d is 2.6 µm, there exists no range of the core diameter 2a in which a bending loss of equal to or less than 0.1 dB/turn, a cut-off wavelength of equal to or less than 1260 nm, an MFD of in a range of 8.6 µm to 9.5 µm at a wavelength of 1310 nm, and a zero-dispersion wavelength of in a range of 1300 nm to 1324 nm can be realized.

Figure 42A:
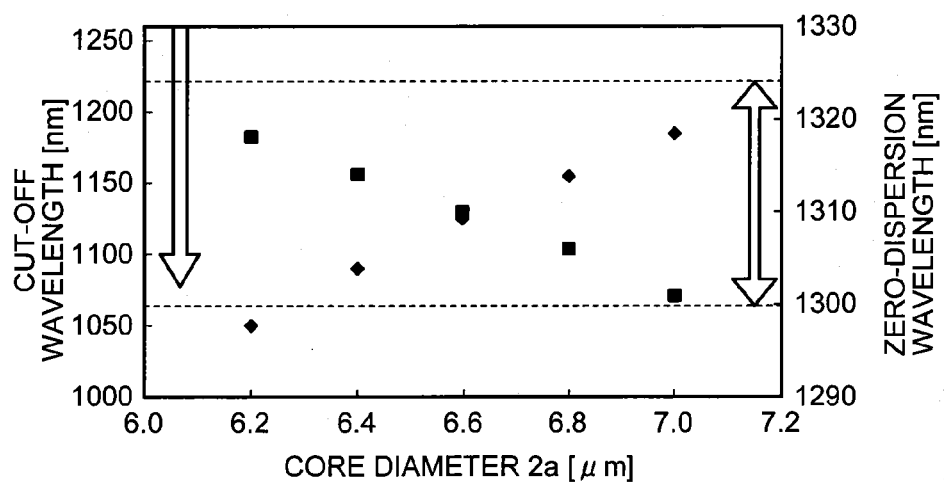
FIG. 42A is a view illustrating a relationship between the core diameter 2a and the optical properties when the hole occupancy rate S is 35.7% and the hole diameter d is 2.7 μm.
Figure 42B:
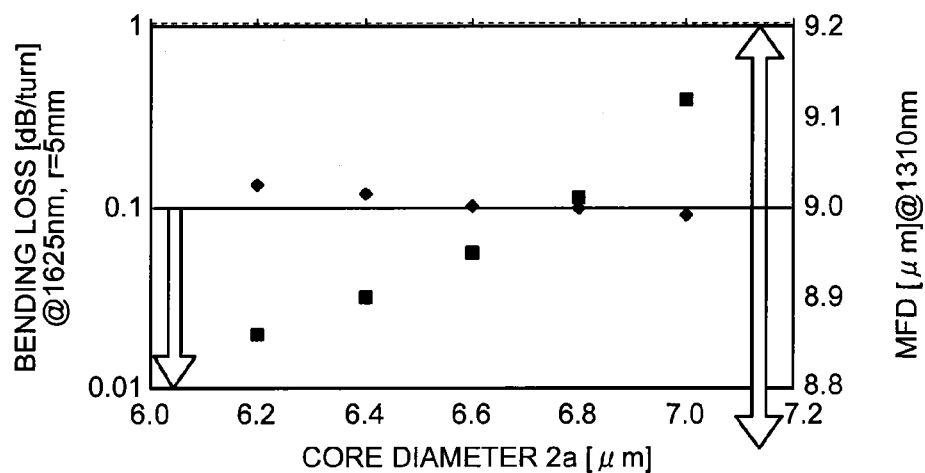
FIG. 42B is a view illustrating a relationship between the core diameter 2a and the optical properties when the hole occupancy rate S is 35.7% and the hole diameter d is 2.7 μm.

FIGS. 42A and 42B are views each illustrating a relationship between the core diameter 2a and the optical properties when the hole occupancy rate S is 35.7% and the hole diameter d is 2.7 µm. Here, FIG. 42A illustrates the cut-off wavelength and the zero-dispersion wavelength, and FIG. 42B illustrates the bending loss and the MFD. As illustrated in FIGS. 42A and 42B, if the hole diameter d is 2.7 µm, when the core diameter 2a is in a range of 6.6 µm to 7.2 µm, a bending loss of equal to or less than 0.1 dB/turn, a cut-off wavelength of equal to or less than 1260 nm, an MFD of in a range of 8.6 µm to 9.5 µm at a wavelength of 1310 nm, and a zero-dispersion wavelength of in a range of 1300 nm to 1324 nm can be realized.

Figure 43A:
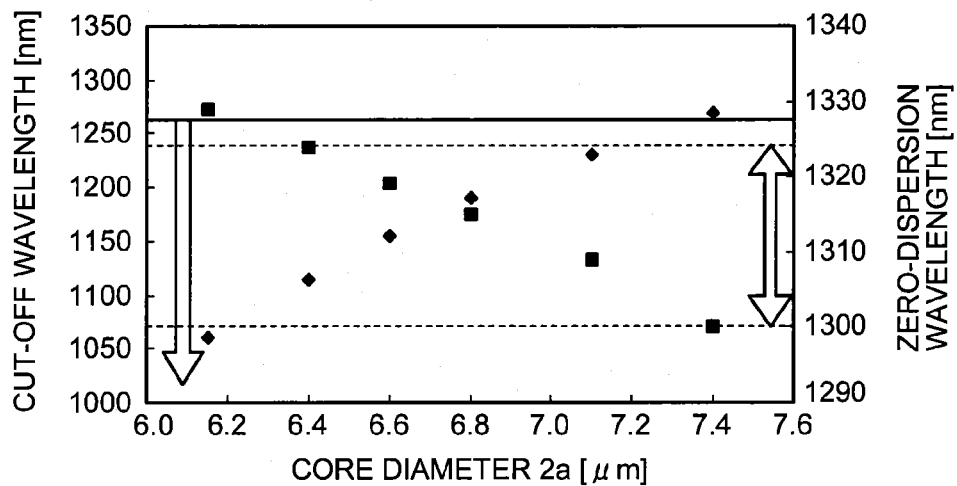
FIG. 43A is a view illustrating a relationship between the core diameter 2a and the optical properties when the hole occupancy rate S is 35.7% and the hole diameter d is 2.9 μm.
Figure 43B:
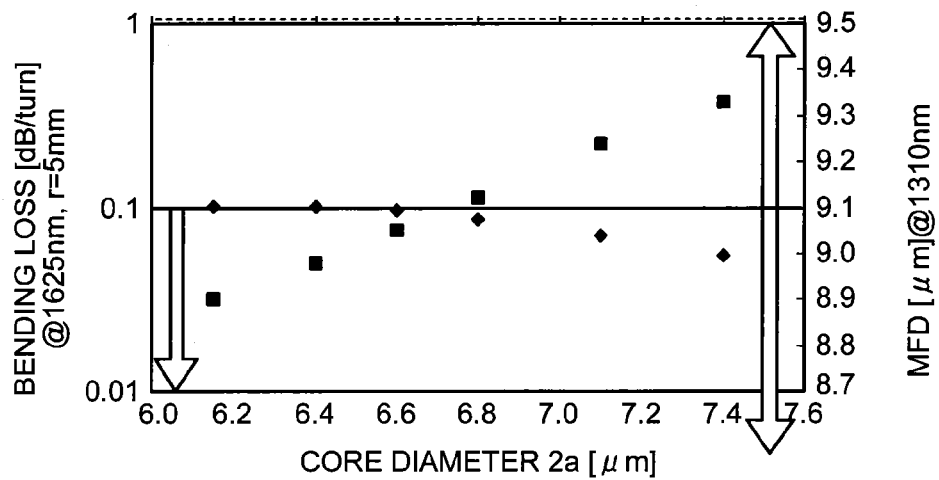
FIG. 43B is a view illustrating a relationship between the core diameter 2a and the optical properties when the hole occupancy rate S is 35.7% and the hole diameter d is 2.9 μm.

FIGS. 43A and 43B are views each illustrating a relationship between the core diameter 2a and the optical properties when the hole occupancy rate S is 35.7% and the hole diameter d is 2.9 µm. Here, FIG. 43A illustrates the cut-off wavelength and the zero-dispersion wavelength, and FIG. 43B illustrates the bending loss and the MFD. As illustrated in FIGS. 43A and 43B, if the hole diameter d is 2.9 µm, when the core diameter 2a is in a range of 6.4 µm to 7.4 µm, a bending loss of equal to or less than 0.1 dB/turn, a cut-off wavelength of equal to or less than 1260 nm, an MFD of in a range of 8.6 µm to 9.5 µm at a wavelength of 1310 nm, and a zero-dispersion wavelength of in a range of 1300 nm to 1324 nm can be realized.

Figure 44A:
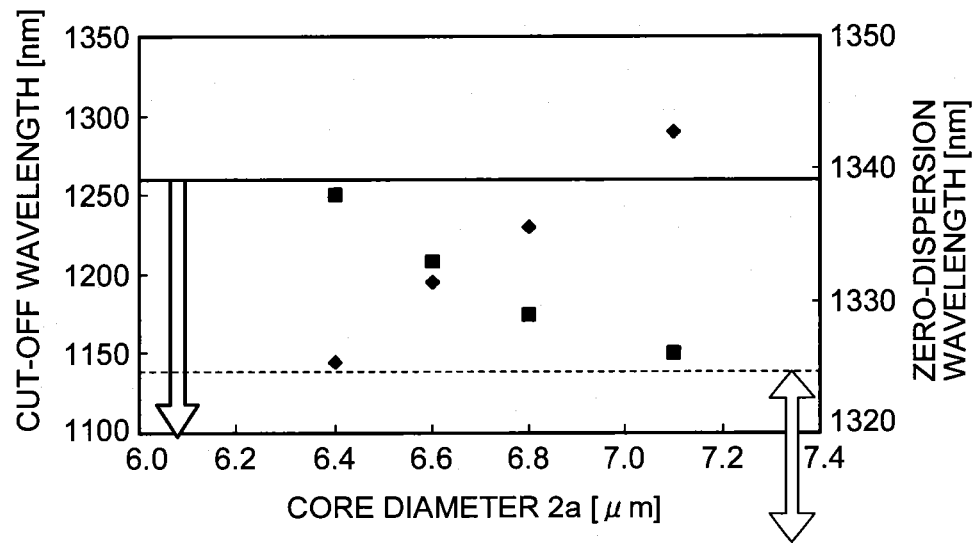
FIG. 44A is a view illustrating a relationship between the core diameter 2a and the optical properties when the hole occupancy rate S is 35.7% and the hole diameter d is 3.3 μm.
Figure 44B:
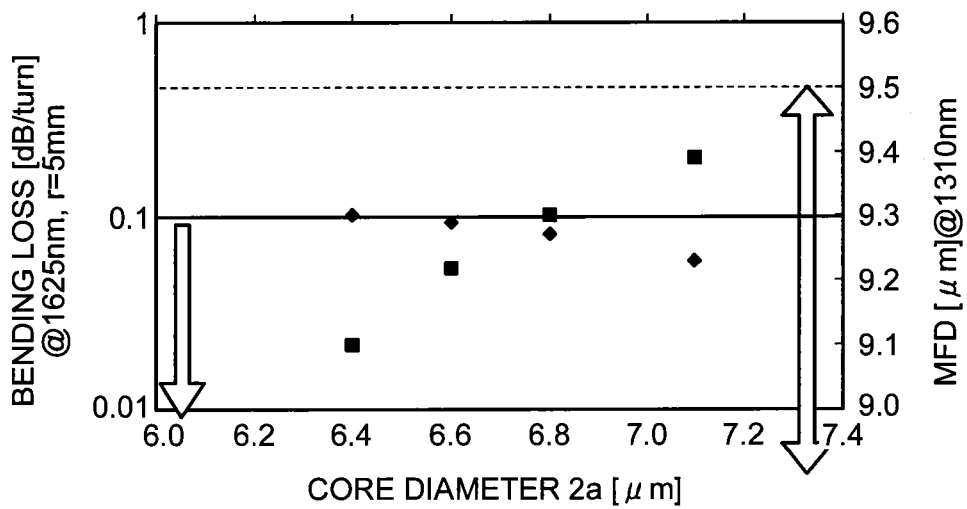
FIG. 44B is a view illustrating a relationship between the core diameter 2a and the optical properties when the hole occupancy rate S is 35.7% and the hole diameter d is 3.3 μm.

FIGS. 44A and 44B are views each illustrating a relationship between the core diameter 2a and the optical properties when the hole occupancy rate S is 35.7% and the hole diameter d is 3.3 µm. Here, FIG. 44A illustrates the cut-off wavelength and the zero-dispersion wavelength, and FIG. 44B illustrates the bending loss and the MFD. As illustrated in FIGS. 44A and 44B, when the hole diameter d is 3.3 µm, there exists no range of the core diameter 2a in which a bending loss of equal to or less than 0.1 dB/turn, a cut-off wavelength of equal to or less than 1260 nm, an MFD of in a range of 8.6 µm to 9.5 µm at a wavelength of 1310 nm, and a zero-dispersion wavelength of in a range of 1300 nm to 1324 nm can be realized.

Figure 45A:
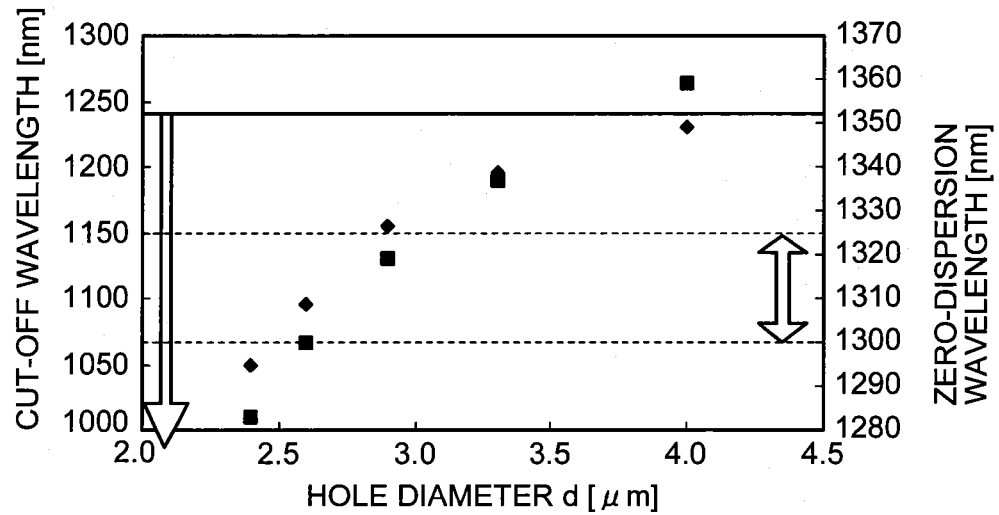
FIG. 45A is a view illustrating a relationship between the hole diameter d and the optical properties when the hole occupancy rate S is 35.7% and the core diameter 2a is 6.6 μm.
Figure 45B:
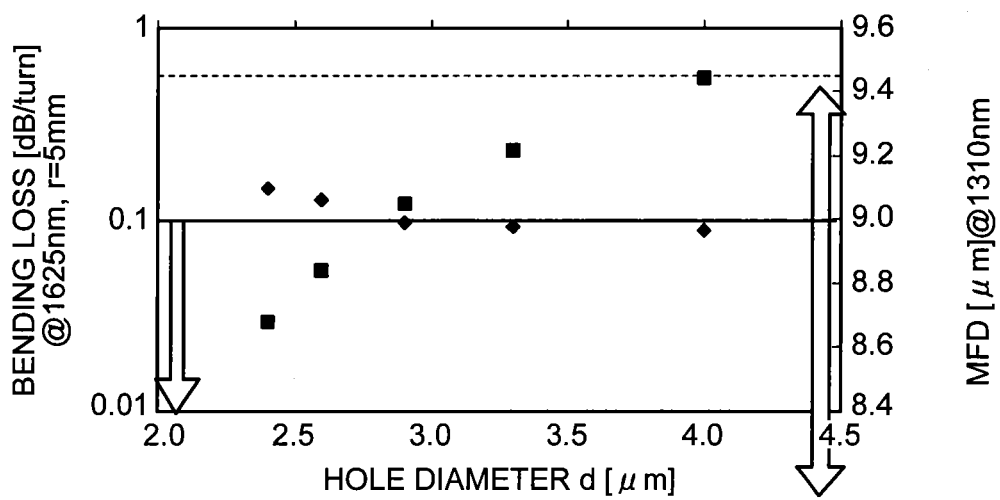
FIG. 45B is a view illustrating a relationship between the hole diameter d and the optical properties when the hole occupancy rate S is 35.7% and the core diameter 2a is 6.6 μm.

FIGS. 45A and 45B are views each illustrating a relationship between the hole diameter d and the optical properties when the hole occupancy rate S is 35.7% and the core diameter 2a is 6.6 µm. Here, FIG. 45A illustrates the cut-off wavelength and the zero-dispersion wavelength, and FIG. 45B illustrates the bending loss and the MFD. As illustrated in FIGS. 45A and 45B, if the core diameter 2a is 6.6 µm, when the hole diameter d is in a range of 2.7 µm to 3.1 µm, a bending loss of equal to or less than 0.1 dB/turn, a cut-off wavelength of equal to or less than 1260 nm, an MFD of in a range of 8.6 µm to 9.5 µm at a wavelength of 1310 nm, and a zero-dispersion wavelength of in a range of 1300 nm to 1324 nm can be realized. Furthermore, when the hole diameter d is in a range of 2.4 µm to 4.0 µm, a bending loss of equal to or less than 1 dB/turn and a cut-off wavelength of equal to or less than 1550 nm can be realized.

Figure 46A:
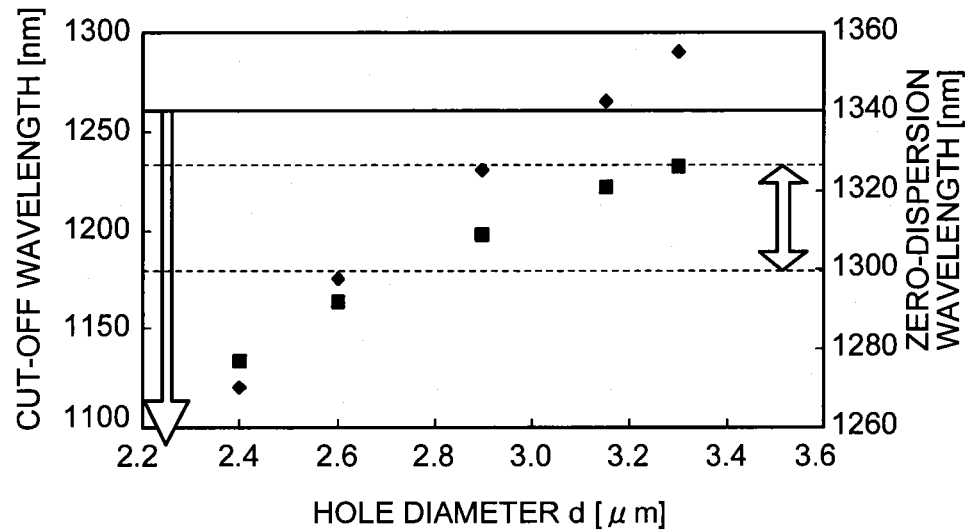
FIG. 46A is a view illustrating a relationship between the hole diameter d and the optical properties when the hole occupancy rate S is 35.7% and the core diameter 2a is 7.1 μm.
Figure 46B:
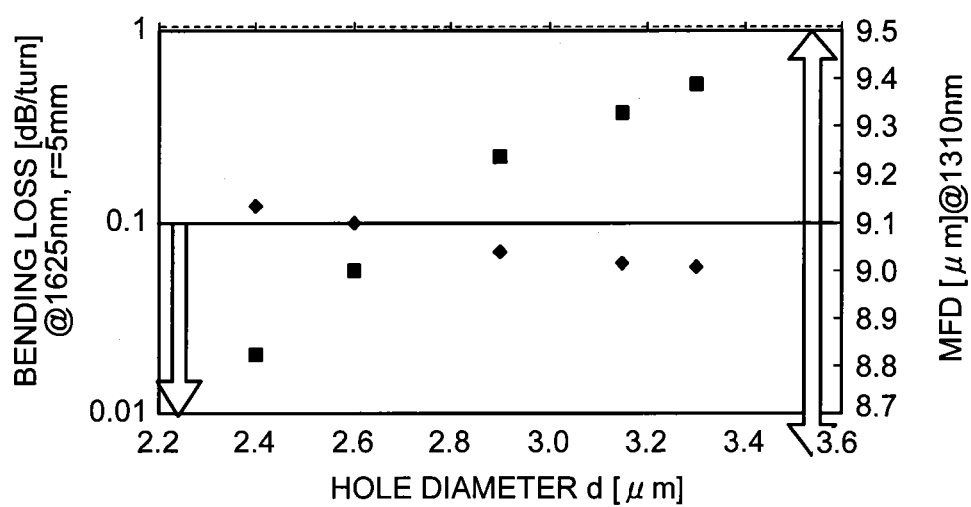
FIG. 46B is a view illustrating a relationship between the hole diameter d and the optical properties when the hole occupancy rate S is 35.7% and the core diameter 2a is 7.1 μm.

FIGS. 46A and 46B are views each illustrating a relationship between the hole diameter d and the optical properties when the hole occupancy rate S is 35.7% and the core diameter 2a is 7.1 µm. Here, FIG. 46A illustrates the cut-off wavelength and the zero-dispersion wavelength, and FIG. 46B illustrates the bending loss and the MFD. As illustrated in FIGS. 46A and 46B, if the core diameter 2a is 7.1 µm, when the hole diameter d is in a range of 2.8 µm to 3.1 µm, a bending loss of equal to or less than 0.1 dB/turn, a cut-off wavelength of equal to or less than 1260 nm, an MFD of in a range of 8.6 µm to 9.5 µm at a wavelength of 1310 nm, and a zero-dispersion wavelength of in a range of 1300 nm to 1324 nm can be realized.

As a result illustrated in FIGS. 41A and 41B to FIGS. 46A and 46B, if the hole occupancy rate S is 36%, when the core diameter 2a is in a range of 6.4 µm to 7.4 µm and the hole diameter d is in a range of 2.7 µm to 3.2 µm, a bending loss of equal to or less than 0.1 dB/turn, a cut-off wavelength of equal to or less than 1260 nm, an MFD of in a range of 8.6 µm to 9.5 µm at a wavelength of 1310 nm, and a zero-dispersion wavelength of in a range of 1300 nm to 1324 nm can be realized. Furthermore, when the hole diameter d is in a range of 2.7 µm to 4.0 µm, a bending loss of equal to or less than 1 dB/turn and a cut-off wavelength of equal to or less than 1550 nm can be realized.

Figure 47A:
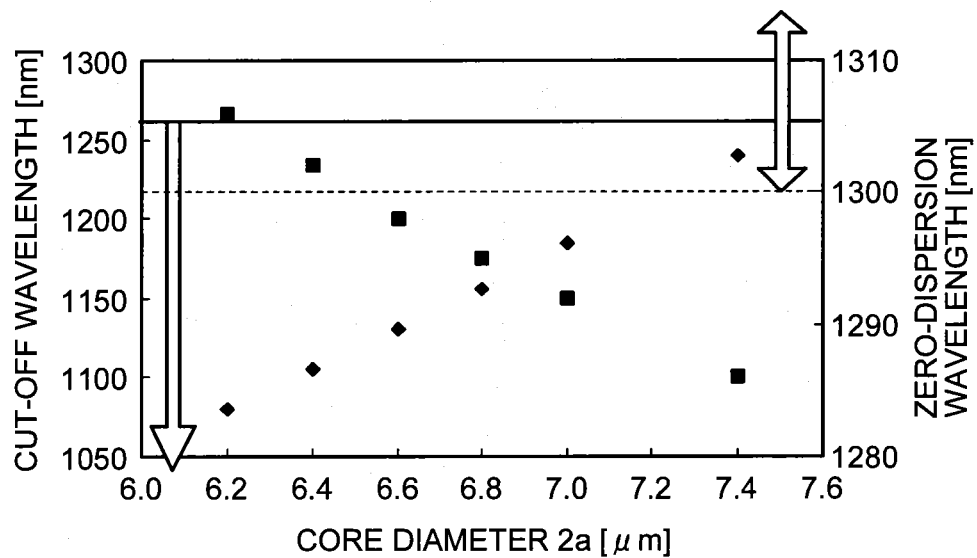
FIG. 47A is a view illustrating a relationship between the core diameter 2a and the optical properties when the hole occupancy rate S is 38.0% and the hole diameter d is 2.7 μm.
Figure 47B:
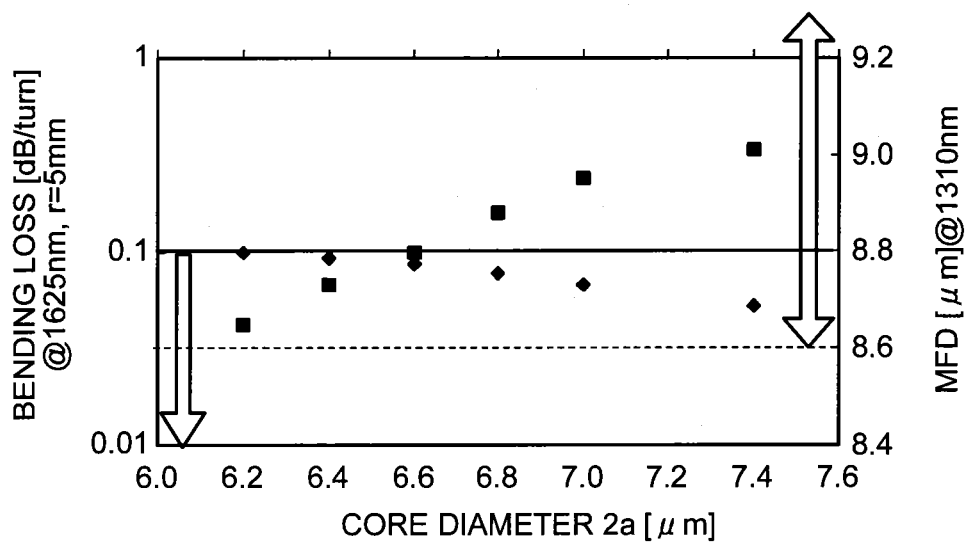
FIG. 47B is a view illustrating a relationship between the core diameter 2a and the optical properties when the hole occupancy rate S is 38.0% and the hole diameter d is 2.7 μm.

Next, the hole occupancy rate S is fixedly set to 38.0%. FIGS. 47A and 47B are views each illustrating a relationship between the core diameter 2a and the optical properties when the hole occupancy rate S is 38.0% and the hole diameter d is 2.7 µm. Here, FIG. 47A illustrates the cut-off wavelength and the zero-dispersion wavelength, and FIG. 47B illustrates the bending loss and the MFD. As illustrated in FIGS. 47A and 47B, if the hole diameter d is 2.7 µm, when the core diameter 2a is in a range of 6.2 µm to 6.5 µm, a bending loss of equal to or less than 0.1 dB/turn, a cut-off wavelength of equal to or less than 1260 nm, an MFD of in a range of 8.6 µm to 9.5 µm at a wavelength of 1310 nm, and a zero-dispersion wavelength of in a range of 1300 nm to 1324 nm can be realized.

Figure 48A:
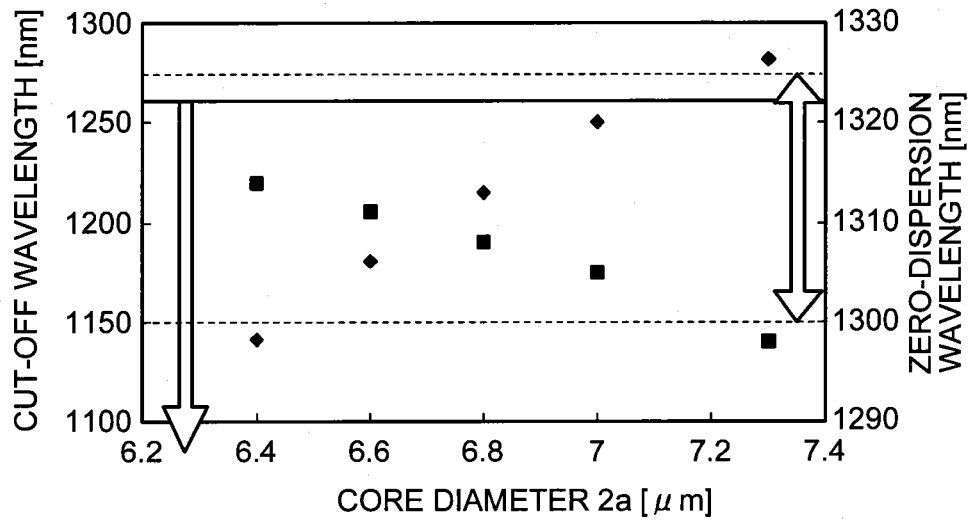
FIG. 48A is a view illustrating a relationship between the core diameter 2a and the optical properties when the hole occupancy rate S is 38.0% and the hole diameter d is 2.9 μm.
Figure 48B:
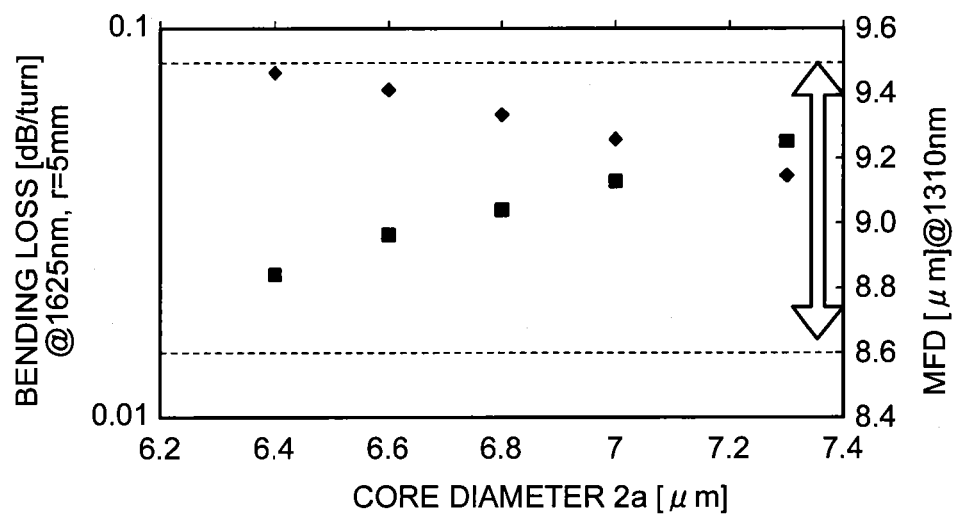
FIG. 48B is a view illustrating a relationship between the core diameter 2a and the optical properties when the hole occupancy rate S is 38.0% and the hole diameter d is 2.9 μm.

FIGS. 48A and 48B are views each illustrating a relationship between the core diameter 2a and the optical properties when the hole occupancy rate S is 38.0% and the hole diameter d is 2.9 μm. Here, FIG. 48A illustrates the cut-off wavelength and the zero-dispersion wavelength, and FIG. 48B illustrates the bending loss and the MFD. As illustrated in FIGS. 48A and 48B, if the hole diameter d is 2.9 μm, when the core diameter 2a is in a range of 6.2 μm to 7.1 μm, a bending loss of equal to or less than 0.1 dB/turn, a cut-off wavelength of equal to or less than 1260 nm, an MFD of in a range of 8.6 μm to 9.5 μm at a wavelength of 1310 nm, and a zero-dispersion wavelength of in a range of 1300 nm to 1324 nm can be realized.

Figure 49A:
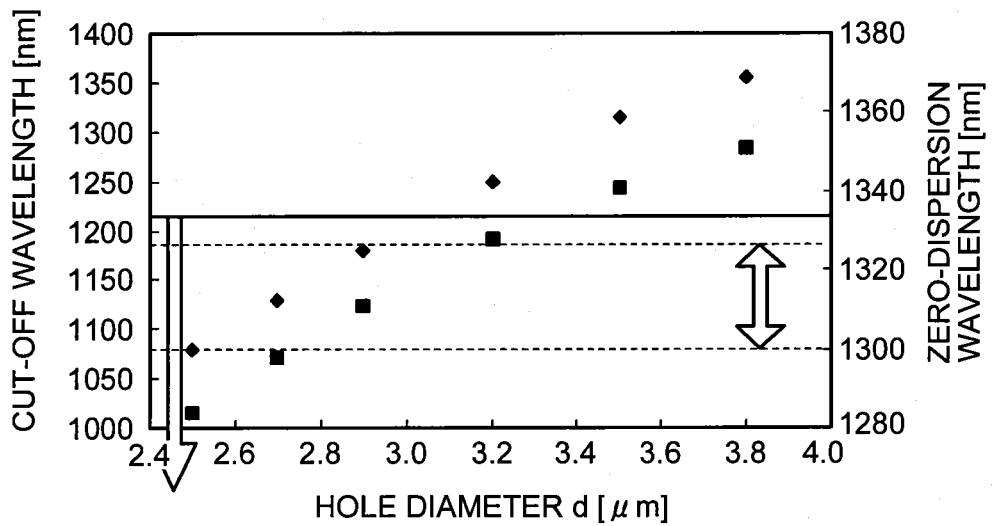
FIG. 49A is a view illustrating a relationship between the hole diameter d and the optical properties when the hole occupancy rate S is 38.0% and the core diameter 2a is 6.6 μm.
Figure 49B:
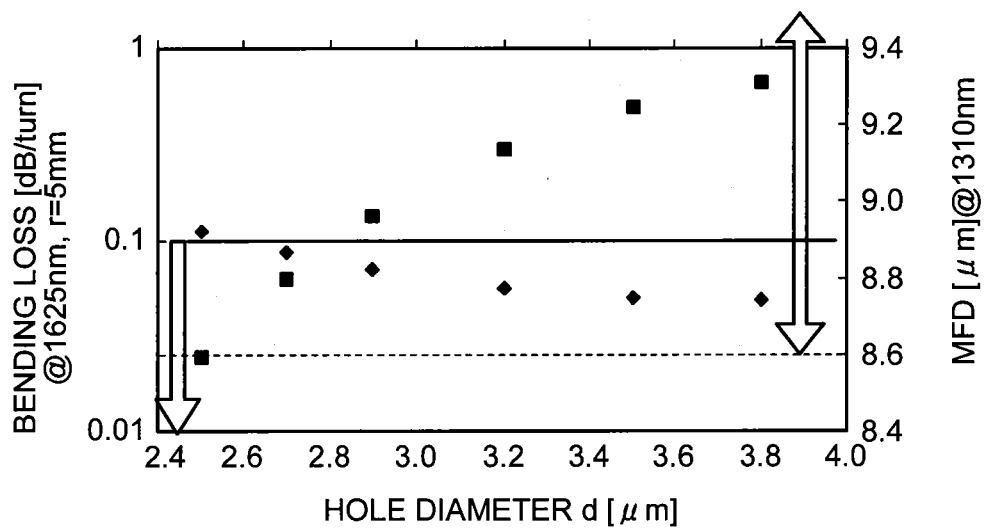
FIG. 49B is a view illustrating a relationship between the hole diameter d and the optical properties when the hole occupancy rate S is 38.0% and the core diameter 2a is 6.6 μm.

FIGS. 49A and 49B are views each illustrating a relationship between the hole diameter d and the optical properties when the hole occupancy rate S is 38.0% and the core diameter 2a is 6.6 μm. Here, FIG. 49A illustrates the cut-off wavelength and the zero-dispersion wavelength, and FIG. 49B illustrates the bending loss and the MFD. As illustrated in FIGS. 49A and 49B, if the core diameter 2a is 6.6 μm, when the hole diameter d is in a range of 2.8 μm to 3.1 μm, a bending loss of equal to or less than 0.1 dB/turn, a cut-off wavelength of equal to or less than 1260 nm, an MFD of in a range of 8.6 μm to 9.5 μm at a wavelength of 1310 nm, and a zero-dispersion wavelength of in a range of 1300 nm to 1324 nm can be realized. Furthermore, when the hole diameter d is in a range of 2.4 μm to 4.0 μm, a bending loss of equal to or less than 1 dB/turn and a cut-off wavelength of equal to or less than 1550 nm can be realized.

Figure 50A:
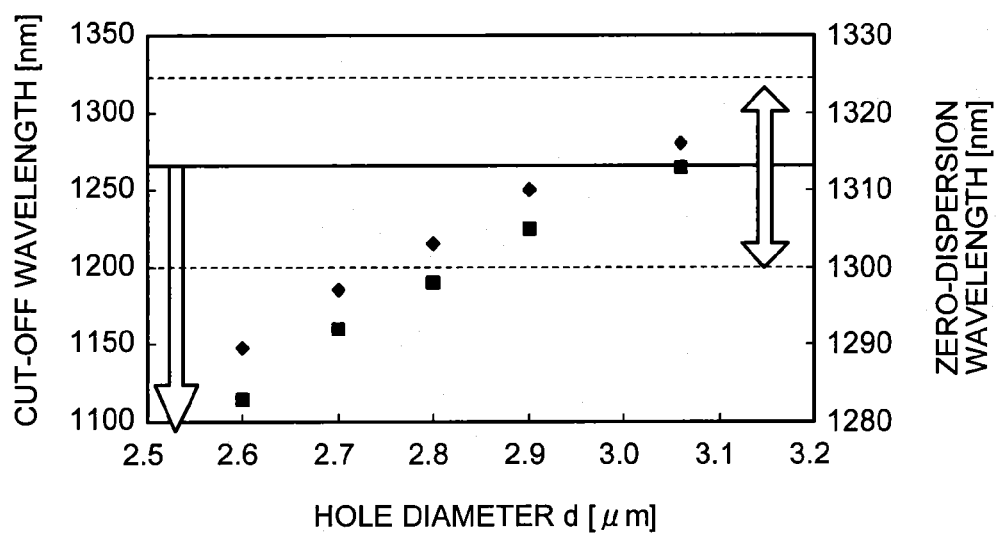
FIG. 50A is a view illustrating a relationship between the hole diameter d and the optical properties when the hole occupancy rate S is 38.0% and the core diameter 2a is 7.0 μm.
Figure 50B:
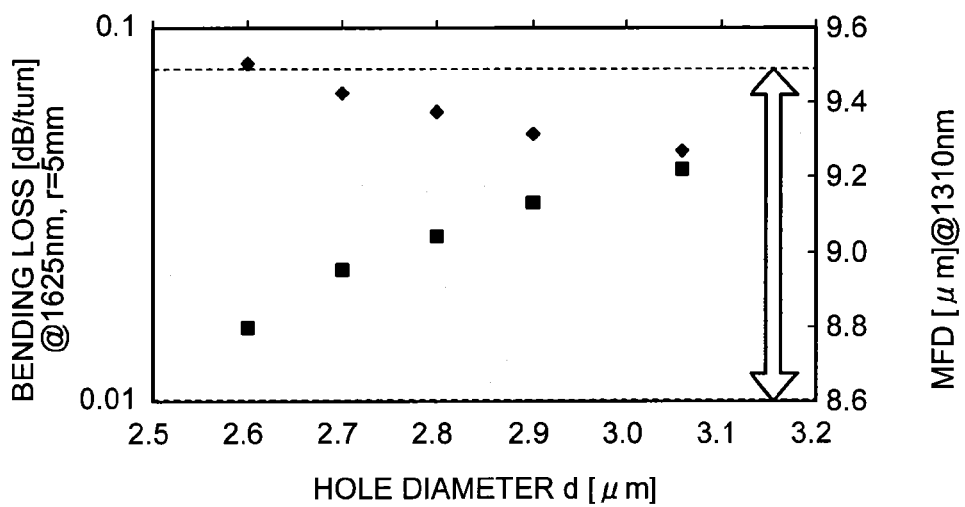
FIG. 50B is a view illustrating a relationship between the hole diameter d and the optical properties when the hole occupancy rate S is 38.0% and the core diameter 2a is 7.0 μm.

FIGS. 50A and 50B are views each illustrating a relationship between the hole diameter d and the optical properties when the hole occupancy rate S is 38.0% and the core diameter 2a is 7.0 μm. Here, FIG. 50A illustrates the cut-off wavelength and the zero-dispersion wavelength, and FIG. 50B illustrates the bending loss and the MFD. As illustrated in FIGS. 50A and 50B, if the core diameter 2a is 7.0 μm, when the hole diameter d is in a range of 2.9 μm to 3.0 μm, a bending loss of equal to or less than 0.1 dB/turn, a cut-off wavelength of equal to or less than 1260 nm, an MFD of in a range of 8.6 μm to 9.5 μm at a wavelength of 1310 nm, and a zero-dispersion wavelength of in a range of 1300 nm to 1324 nm can be realized. Furthermore, when the hole diameter d is in a range of 2.7 μm to 4.0 μm, a bending loss of equal to or less than 1 dB/turn and a cut-off wavelength of equal to or less than 1550 nm can be realized.

As a result illustrated in FIGS. 47A and 47B to FIGS. 50A and 50B, if the hole occupancy rate S is 38.0%, when the core diameter 2a is in a range of 6.2 μm to 7.5 μm and the hole diameter d is in a range of 2.7 μm to 3.1 μm, a bending loss of equal to or less than 0.1 dB/turn, a cut-off wavelength of equal to or less than 1260 nm, an MFD of in a range of 8.6 μm to 9.5 μm at a wavelength of 1310 nm, and a zero-dispersion wavelength of in a range of 1300 nm to 1324 nm can be realized. Furthermore, when the hole diameter d is in a range of 2.7 μm to 4.0 μm, a bending loss of equal to or less than 1 dB/turn and a cut-off wavelength of equal to or less than 1550 nm can be realized.

Figure 51A:
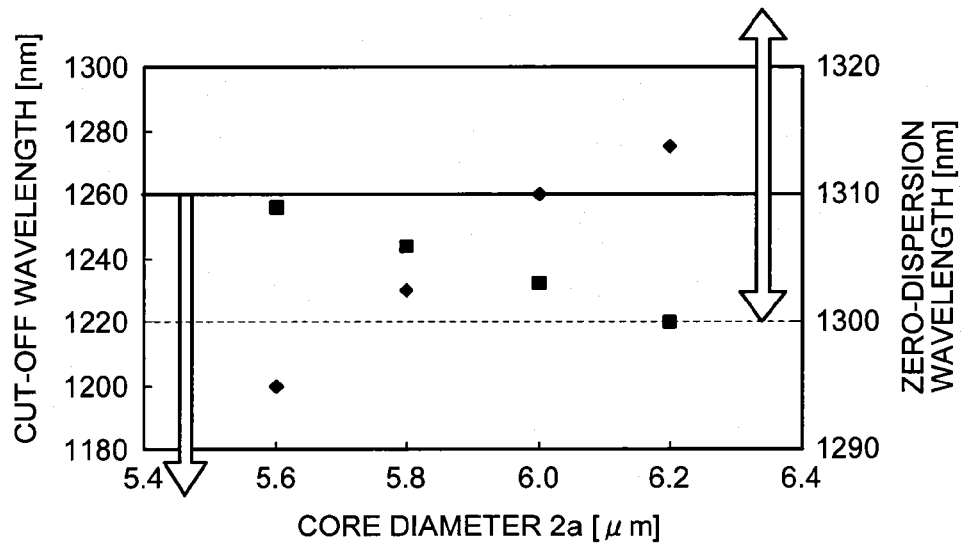
FIG. 51A is a view illustrating a relationship between the core diameter 2a and the optical properties when the hole occupancy rate S is 42.0% and the hole diameter d is 2.9 μm.
Figure 51B:
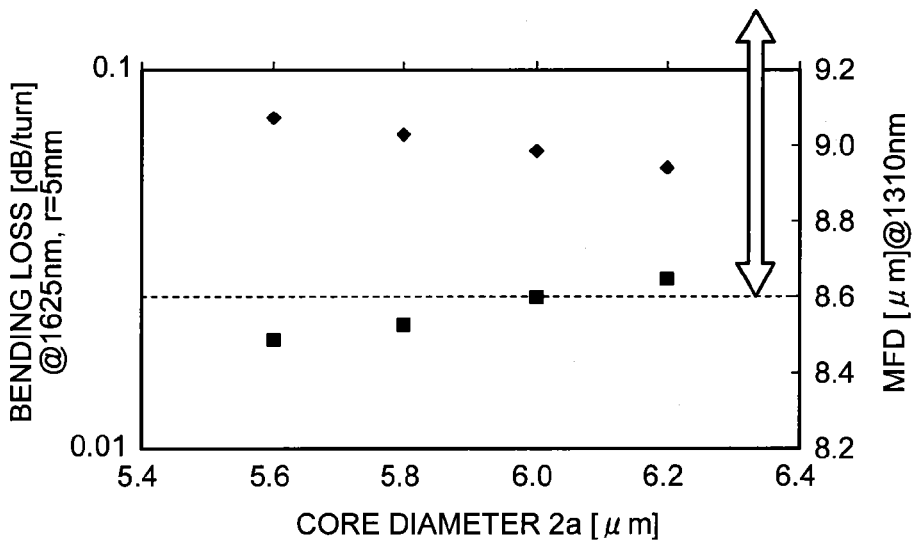
FIG. 51B is a view illustrating a relationship between the core diameter 2a and the optical properties when the hole occupancy rate S is 42.0% and the hole diameter d is 2.9 μm.

Next, the hole occupancy rate S is fixedly set to 42.0%. FIGS. 51A and 51B are views each illustrating a relationship between the core diameter 2a and the optical properties when the hole occupancy rate S is 42.0% and the hole diameter d is 2.9 μm. Here, FIG. 51A illustrates the cut-off wavelength and the zero-dispersion wavelength, and FIG. 51B illustrates the bending loss and the MFD. As illustrated in FIGS. 51A and 51B, if the hole diameter d is 2.9 μm, when the core diameter 2a is 6.0 μm, a bending loss of equal to or less than 0.1 dB/turn, a cut-off wavelength of equal to or less than 1260 nm, an MFD of in a range of 8.6 μm to 9.5 μm at a wavelength of 1310 nm, and a zero-dispersion wavelength of in a range of 1300 nm to 1324 nm can be realized.

Figure 52A:
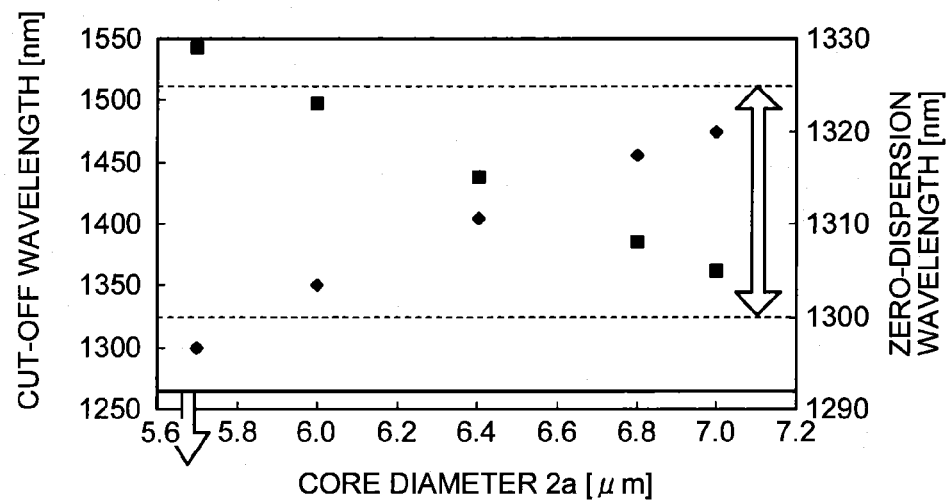
FIG. 52A is a view illustrating a relationship between the core diameter 2a and the optical properties when the hole occupancy rate S is 42.0% and the hole diameter d is 3.2 μm.
Figure 52B:
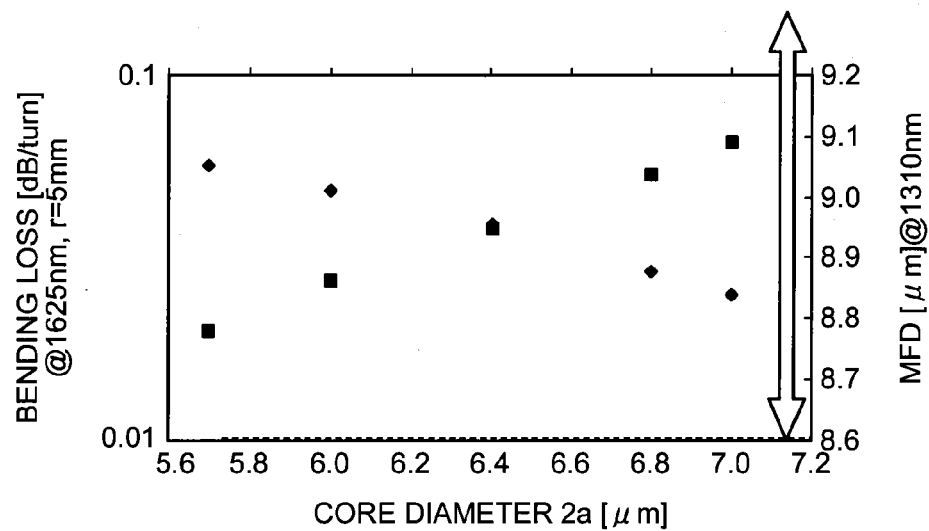
FIG. 52B is a view illustrating a relationship between the core diameter 2a and the optical properties when the hole occupancy rate S is 42.0% and the hole diameter d is 3.2 μm.

FIGS. 52A and 52B are views each illustrating a relationship between the core diameter 2a and the optical properties when the hole occupancy rate S is 42.0% and the hole diameter d is 3.2 μm. Here, FIG. 52A illustrates the cut-off wavelength and the zero-dispersion wavelength, and FIG. 52B illustrates the bending loss and the MFD. As illustrated in FIGS. 52A and 52B, when the hole diameter d is 3.2 μm, there exists no range of the core diameter 2a in which a bending loss of equal to or less than 0.1 dB/turn, a cut-off wavelength of equal to or less than 1260 nm, an MFD of in a range of 8.6 μm to 9.5 μm at a wavelength of 1310 nm, and a zero-dispersion wavelength of in a range of 1300 nm to 1324 nm can be realized.

Figure 53A:
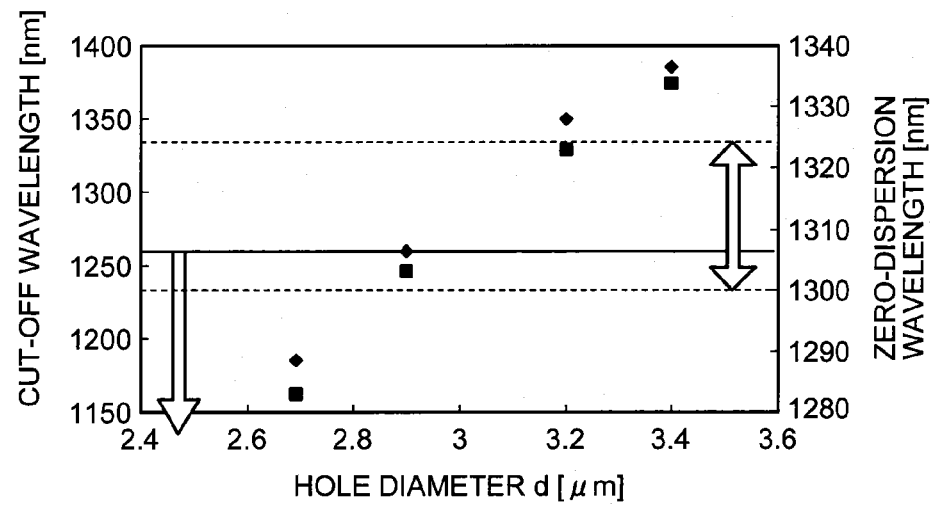
FIG. 53A is a view illustrating a relationship between the hole diameter d and the optical properties when the hole occupancy rate S is 42.0% and the core diameter 2a is 6.0 μm.
Figure 53B:
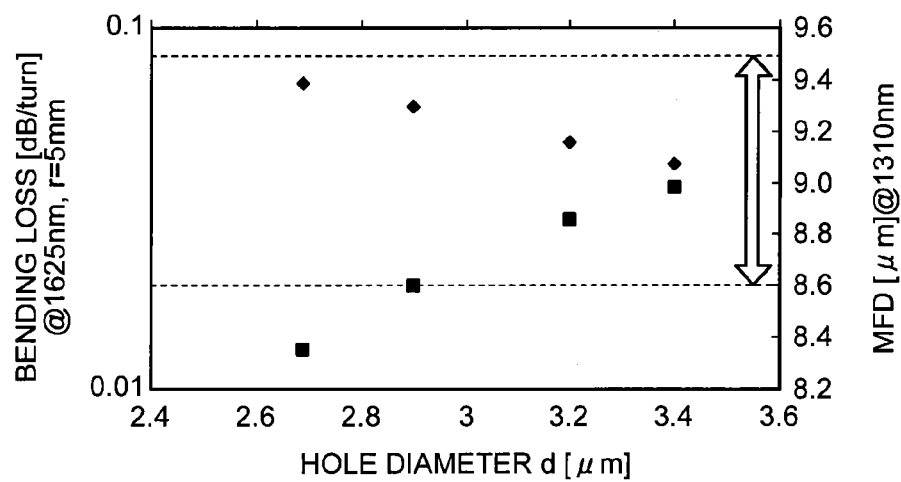
FIG. 53B is a view illustrating a relationship between the hole diameter d and the optical properties when the hole occupancy rate S is 42.0% and the core diameter 2a is 6.0 μm.

FIGS. 53A and 53B are views each illustrating a relationship between the hole diameter d and the optical properties when the hole occupancy rate S is 42.0% and the core diameter 2a is 6.0 μm. Here, FIG. 53A illustrates the cut-off wavelength and the zero-dispersion wavelength, and FIG. 53B illustrates the bending loss and the MFD. As illustrated in FIGS. 53A and 53B, if the core diameter 2a is 6.0 μm, when the hole diameter d is 2.9 μm, a bending loss of equal to or less than 0.1 dB/turn, a cut-off wavelength of equal to or less than 1260 nm, an MFD of in a range of 8.6 μm to 9.5 μm at a wavelength of 1310 nm, and a zero-dispersion wavelength of in a range of 1300 nm to 1324 nm can be realized.

Figure 54A:
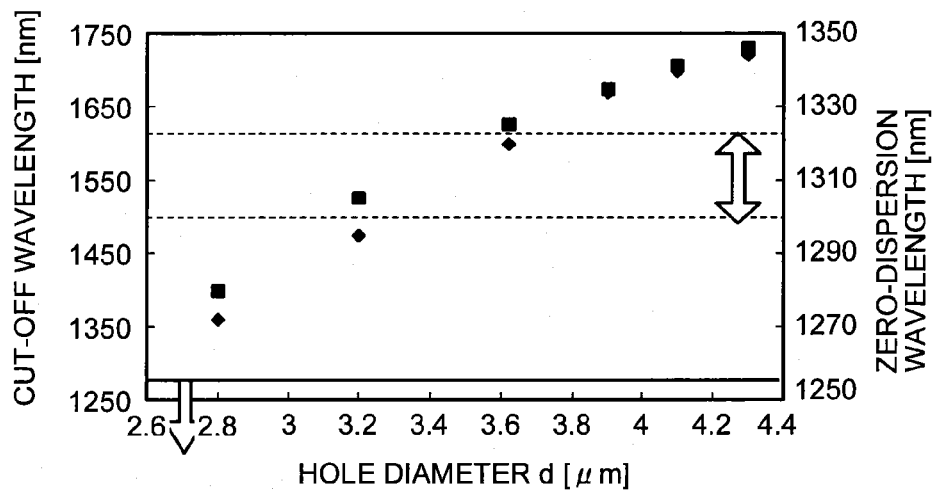
FIG. 54A is a view illustrating a relationship between the hole diameter d and the optical properties when the hole occupancy rate S is 42.0% and the core diameter 2a is 7.0 μm.
Figure 54B:
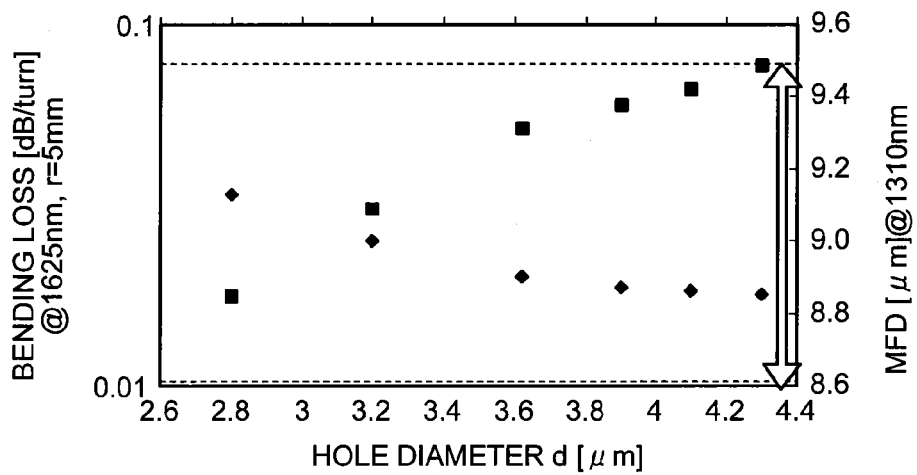
FIG. 54B is a view illustrating a relationship between the hole diameter d and the optical properties when the hole occupancy rate S is 42.0% and the core diameter 2a is 7.0 μm.

FIGS. 54A and 54B are views each illustrating a relationship between the hole diameter d and the optical properties when the hole occupancy rate S is 42.0% and the core diameter 2a is 7.0 μm. Here, FIG. 54A illustrates the cut-off wavelength and the zero-dispersion wavelength, and FIG. 54B illustrates the bending loss and the MFD. As illustrated in FIGS. 54A and 54B, when the core diameter 2a is 7.0 μm, a bending loss of equal to or less than 0.1 dB/turn, a cut-off wavelength of equal to or less than 1260 nm, an MFD of in a range of 8.6 μm to 9.5 μm at a wavelength of 1310 nm, and a zero-dispersion wavelength of in a range of 1300 nm to 1324 nm can be realized. Furthermore, when the hole diameter d is in a range of 2.7 μm to 4.0 μm, there exists no range of the hole diameter d in which a bending loss of equal to or less than 1 dB/turn and a cut-off wavelength of equal to or less than 1550 nm can be realized.

As a result illustrated in FIGS. 51A and 51B to FIGS. 54A and 54B, if the hole occupancy rate S is 42.0%, when the core diameter 2a is 6.0 μm and the hole diameter d is 2.9 μm, a bending loss of equal to or less than 0.1 dB/turn, a cut-off wavelength of equal to or less than 1260 nm, an MFD of in a range of 8.6 μm to 9.5 μm at a wavelength of 1310 nm, and a zero-dispersion wavelength of in a range of 1300 nm to 1324 nm can be realized.

FIGS. 55A and 55B are views each illustrating a relationship between the combination of the structural parameters and the optical properties when the hole occupancy rate S is 30.1%, the structural parameters being illustrated in FIGS. 37A and 37B to 40A and 40B. FIGS. 55C and 55D are views each illustrating a relationship between the combination of the structural parameters and the optical properties when the hole occupancy rate S is 35.7%, the structural parameters being illustrated in FIGS. 41A and 41B to FIGS. 46A and 46B. FIGS. 55E and 55F are views each illustrating a relationship between the combination of the structural parameters and the optical properties when the hole occupancy rate S is 38.0%, the structural parameters being illustrated in FIGS. 47A and 47B to FIGS. 50A and 50B. FIGS. 55G and 55H are views each illustrating a relationship between the combination of the structural parameters and the optical properties when the hole occupancy rate S is 42.0%, the structural parameters being illustrated in FIGS. 51A and 51B to FIGS. 54A and 54B.

In the structural parameters illustrated in FIGS. 55A to 55H, the core diameter 2a is in a range of 6.0 μm to 8.4 μm, the relative refractive index difference Δ1 is in a range of 0.23% to 0.32%, the inner cladding layer outside diameter 2b is equal to or less than 50 μm, the relative refractive index difference Δ2 is equal to or more than −0.15%, the hole diameter d is in a range of 2.7 μm to 3.4 μm, and the hole occupancy rate S is equal to or less than 42%. The hole-assisted optical fiber having the above-mentioned structural parameters realizes a bending loss of equal to or less than 0.1 dB/turn, a cut-off wavelength of equal to or less than 1260 nm, an MFD of in a range of 8.6 μm to 9.5 μm at a wavelength of 1310 nm, and a zero-dispersion wavelength of in a range of 1300 nm to 1324 nm.

Furthermore, FIG. 56 is a view illustrating a relationship between the combination of the hole occupancy rate and the other structural parameters, and the optical properties of the hole-assisted optical fiber according to the first embodiment. In the structural parameters illustrated in FIG. 56, the core diameter 2a is in a range of 3 μm to 9.8 μm, the relative refractive index difference Δ1 is in a range of 0.11% to 0.45%, the inner cladding layer outside diameter 2b has a value larger than a core diameter and equal to or less than 53 μm, the relative refractive index difference Δ2 has a negative value more than −0.30%, the hole diameter d is in a range of 2.4 μm to 4.0 μm, and the hole occupancy rate S is in a range of 17% to 48%. The hole-assisted optical fiber having the above-mentioned structural parameters realizes such a bending loss of equal to or less than 1 dB/turn and a cut-off wavelength of equal to or less than 1550 nm as illustrated in FIG. 56.

Next, FIG. 57 is a view illustrating a relationship between another combination of the hole occupancy rate and the other structural parameters, and the optical properties of the hole-assisted optical fiber according to the first embodiment. In the structural parameters illustrated in FIG. 57, the core diameter 2a is in a range of 6.0 μm to 8.4 μm, the relative refractive index difference Δ1 is in a range of 0.23% to 0.32%, the inner cladding layer outside diameter 2b has a value larger than a core diameter 2a and equal to or less than 36 μm, the relative refractive index difference Δ2 has a negative value more than −0.15%, the hole diameter d is in a range of 2.5 μm to 3.4 μm, and the hole occupancy rate S is in a range of 17% to 42%. The hole-assisted optical fiber having the above-mentioned structural parameters realizes such a bending loss of equal to or less than 1 dB/turn, a cut-off wavelength of equal to or less than 1260 nm, an MFD of in a range of 8.6 μm to 9.5 μm at a wavelength of 1310 nm, and a zero-dispersion wavelength of in a range of 1300 nm to 1324 nm as illustrated in FIG. 57. Furthermore, the hole-assisted optical fiber also realizes a zero-dispersion slope of equal to or less than 0.092 ps/nm²/km thus realizing an optical fiber compliant with the ITU-T G.652.

Here, in the above-mentioned first embodiment, the number of holes is 10. However, the number of holes may be set to any value equal to or more than 4, and it is particularly preferable that the number of holes be set to an even value since the arrangement of the holes is high in symmetry. In this case, even when the number of holes is set to a value other than 10, a hole-assisted optical fiber having a hole occupancy rate S of a value same as that of the hole-assisted optical fiber according to the first embodiment has properties same as the case of the hole-assisted optical fiber according to the first embodiment.

In some embodiments, the hole-assisted optical fiber includes the inner cladding layer, thus achieving the hole-assisted optical fiber which is excellent in bending loss characteristics, suitable for use as an optical communication-use optical fiber, and high in productivity.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A hole-assisted optical fiber comprising:
   a core portion; and
   a cladding portion that includes an inner cladding layer formed around an outer periphery of the core portion and having a refractive index lower than that of the core portion, an outer cladding layer formed around an outer periphery of the inner cladding layer and having a refractive index higher than that of the inner cladding layer and lower than that of the core portion, and a plurality of holes formed around the core portion, wherein
   a diameter of the core portion is in a range of 3 μm to 9.8 μm, a relative refractive index difference of the core portion relative to the outer cladding layer is in a range of 0.11% to 0.45%, an outside diameter of the inner cladding layer is equal to or less than 53 μm, a relative refractive index difference of the inner cladding layer relative to the outer cladding layer is a negative value equal to or more than −0.30%, a diameter of each of the plurality of holes is in a range of 2.4 μm to 4.0 μm, a hole occupancy rate is in a range of 17% to 48%, a bending loss at a wavelength of 1625 nm when bent at a radius of 5 mm is equal to or less than 1 dB/turn, and a cut-off wavelength is equal to or less than 1550 nm, and
   the hole occupancy rate S (%) is defined by the following expression (1):

$$S = N\pi(d/2)^2 / [\pi(R+d)^2 - \pi R^2] \quad (1)$$

where N is the number of the plurality of holes, d (μm) is the diameter of each of the plurality of holes, and R (μm) is a radius of an inscribed circle which is brought into internal contact with each of the plurality of holes.

2. The hole-assisted optical fiber according to claim 1, wherein the diameter of the core portion is in a range of 6.0 μm to 8.4 μm, the relative refractive index difference of the core portion relative to the outer cladding layer is in a range of 0.23% to 0.32%, the outside diameter of the inner cladding layer is equal to or less than 50 μm, the relative refractive index difference of the inner cladding layer relative to the outer cladding layer is equal to or more than −0.15%, the diameter of each of the plurality of holes is in a range of 2.5 μm to 3.4 μm, the hole occupancy rate is equal to or less than 42%, the cut-off wavelength is equal to or less than 1260 nm, a mode field diameter at a wavelength of 1310 nm is in a range of 8.6 μm to 9.5 μm, and a zero-dispersion wavelength is in a range of 1300 nm to 1324 nm.

3. The hole-assisted optical fiber according to claim 2, wherein the diameter of the core portion is in a range of 6.0 μm to 8.4 μm, the relative refractive index difference of the core portion relative to the outer cladding layer is in a range of 0.23% to 0.32%, the outside diameter of the inner cladding layer is equal to or less than 50 μm, the relative refractive index difference of the inner cladding layer relative to the outer cladding layer is equal to or more than −0.15%, the diameter of each of the plurality of holes is in a range of 2.7 μm to 3.4 μm, the hole occupancy rate is equal to or less than 42%, the cut-off wavelength is equal to or less than 1260 nm, the mode field diameter at a wavelength of 1310 nm is in a range of 8.6 μm to 9.5 μm, the zero-dispersion wavelength is in a range of 1300 nm to 1324 nm, and the bending loss at a wavelength of 1625 nm when bent at a radius of 5 mm is equal to or less than 0.1 dB/turn.

* * * * *